United States Patent
Cirik et al.

(10) Patent No.: US 12,381,614 B2
(45) Date of Patent: *Aug. 5, 2025

(54) BEAM MANAGEMENT FOR CELLS IN WIRELESS COMMUNICATIONS

(71) Applicant: Ofinno, LLC, Reston, VA (US)

(72) Inventors: Ali Cirik, Chantilly, VA (US); Esmael Hejazi Dinan, McLean, VA (US); Hua Zhou, Vienna, VA (US); Alireza Babaei, Fairfax, VA (US); Hyoungsuk Jeon, Centreville, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,847

(22) Filed: May 22, 2024

(65) Prior Publication Data
US 2024/0314874 A1    Sep. 19, 2024

Related U.S. Application Data

(63) Continuation of application No. 16/670,225, filed on Oct. 31, 2019, now Pat. No. 12,035,404.

(60) Provisional application No. 62/753,288, filed on Oct. 31, 2018.

(51) Int. Cl.
*H04W 76/19* (2018.01)
*H04B 17/327* (2015.01)
*H04W 72/1268* (2023.01)
*H04W 72/23* (2023.01)

(52) U.S. Cl.
CPC .......... *H04W 76/19* (2018.02); *H04B 17/327* (2015.01); *H04W 72/1268* (2013.01); *H04W 72/23* (2023.01)

(58) Field of Classification Search
CPC . H04W 76/19; H04W 72/1268; H04W 72/23; H04B 17/327; H04B 7/063; H04B 7/0695
See application file for complete search history.

(56) References Cited

U.S. PATENT DOCUMENTS

| 11,006,441 B2 * | 5/2021 | Shih ................. H04W 74/0833 |
| 11,259,306 B2 | 2/2022 | Koskela et al. |
| 11,336,357 B2 | 5/2022 | Koskela et al. |

(Continued)

FOREIGN PATENT DOCUMENTS

WO    WO-2019119399 A1 *    6/2019    ........... H04B 7/0408

OTHER PUBLICATIONS

R2-1810008 3GPP TSG RAN WG2 AH-1807, Montreal, Canada, Jul. 2-6, 2018, Source: Sharp, Title: Remaining issues on DL BWP switching upon RACH procedure initiation.

(Continued)

*Primary Examiner* — Kibrom T Hailu
(74) *Attorney, Agent, or Firm* — Brett K. Gardner; Kavon Nasabzadeh; Jacob L. Mangan

(57) ABSTRACT

Wireless communications and beam failure recovery are described. A wireless device may send one or more messages associated with a beam failure recovery for one or more cells. The one or more message may comprise an indication that a candidate beam is not available. The one or more message may comprise at least one value to indicate information associated with a candidate beam.

40 Claims, 36 Drawing Sheets

(56) References Cited

U.S. PATENT DOCUMENTS

| | | | |
|---|---|---|---|
| 12,035,404 B2* | 7/2024 | Cirik | H04B 7/0695 |
| 12,041,594 B2 | 7/2024 | Koskela et al. | |
| 2018/0270700 A1 | 9/2018 | Babaei et al. | |
| 2018/0302889 A1 | 10/2018 | Guo et al. | |
| 2019/0274098 A1 | 9/2019 | Cheng et al. | |
| 2020/0169340 A1* | 5/2020 | Hwang | H04B 17/327 |
| 2020/0374960 A1 | 11/2020 | Deenoo et al. | |
| 2021/0021320 A1* | 1/2021 | Koskela | H04B 7/0626 |
| 2021/0058129 A1* | 2/2021 | Takeda | H04B 7/088 |
| 2021/0058133 A1* | 2/2021 | Takeda | H04W 72/23 |
| 2021/0234752 A1* | 7/2021 | Matsumura | H04B 7/0695 |
| 2021/0344405 A1* | 11/2021 | Yuan | H04W 74/0833 |
| 2022/0006690 A1* | 1/2022 | Matsumura | H04L 41/0672 |
| 2022/0061087 A1* | 2/2022 | Koskela | H04W 72/1268 |

OTHER PUBLICATIONS

R2-1810091 3GPP TSG RAN WG2 AH-1807, Montreal, Canada, Jul. 2-6, 2018, Source: Huawei, HiSilicon, Title: BWP switch for BFR.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-24, 2018, Source: LG Electronics Inc., Title: BWP operation for BFR RA.
Aug. 16, 2021—European Office Action—19206560.5.
R2-1807584 3GPP TSG-RAN WG2 #102, Busan, Korea, May 21-25, 2018, Source: vivo, Title: Discussion on the SCell BFR.
Feb. 12, 2020—European Extended Search Report—EP 19206560.5.
R1-1807796 3GPP TSG-RAN WG1 #93, Busan, Korea, May 21-25, 2018, Source: MediaTek Inc., Title: Summary 2 on Remaining issues on Beam Failure Recovery.
R2-1806822 3GPP TSG-RAN WG2 #102, Busan, Korea, May 21-25, 2018, Source: InterDigital Inc., Title: Corrections on BFR for SCell.
R2-1806831 3GPP TSG-RAN WG2 #102, Busan, Korea, May 21-25, 2018, Source: Samsung Electronics, Title: CSI RS Beam Reporting during CB BFR.
R1-1811472 3GPP TSG-RAN WG1 Meeting #94bis, Chengdu, PR China, Oct. 8-12, 2018, Source: ASUS TeK, Title: Discussion on enhancements on multi-beam operation.
R1-1811526 3GPP TSG-RAN WG1 Meeting #94bis, Chengdu, PR China, Oct. 8-12, 2018, Source: CEWiT, Title: On fast SRS precoder updation.
R1-1811635 3GPP TSG-RAN WG1 Meeting #94bis, Chengdu, PR China, Oct. 8-12, 2018, Source: OPPO, Title: Discussion on Multi-beam Operation Enhancements.
R2-1800049 3GPP TSG-RAN WG2 Meeting #AH-1801, Vancouver, Canada, Jan. 22-26, 2018, Source: ASUS Tek, Title: UE behaviours upon beam failure and recovery.
R2-1800632 3GPP TSG-RAN WG2 Meeting #AH-1801, Vancouver, Canada, Jan. 22-26, 2018, Source: Huawei, HiSilicon, Title: Remaining issue for beam failure recovery.
R2-1800895 3GPP TSG-RAN WG2 Meeting #AH-1801, Vancouver, Canada, Jan. 22-26, 2018, Source: vivo, Title: Discussion on the impact of beam failure recovery.
R2-1801009 3GPP TSG-RAN WG2 Meeting #AH-1801, Vancouver, Canada, Jan. 22-26, 2018, Source: Huawei, HiSilicon, Title: General consideration on RA procedure for beam failure recovery.
R2-1801049 3GPP TSG-RAN WG2 Meeting #AH-1801, Vancouver, Canada, Jan. 22-26, 2018, Source: Huawei, HiSilicon, Title: Non-contention based random access for beam failrue recovery in CA.
R2-1801814 3GPP TSG-RAN WG2 #101, Athens, Greece, Feb. 26-Mar. 2, 2018, Source: Huawei, HiSilicon, Title: Beam failure recovery for SCell.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CA.
R2-1803045 3GPP TSG-RAN WG2 #101, Athens, Greece, Feb. 26-Mar. 2, 2018, Source: Sharp, Title: Identification of Contention based random access for beam failure recovery.
R2-1803198 3GPP TSG-RAN WG2 #101, Athens, Greece, Feb. 26-Mar. 2, 2018, Source: Ericsson, Title: Contention based random access for beam failure recovery (revision of R2-1800340).
R2-1803229 3GPP TSG-RAN WG2 #101, Athens, Greece, Feb. 26-Mar. 2, 2018, Source: Nokia, Nokia Shanghail Bell, Title: BWP switch interaction with contention free BFR preamble (revision of R2-1800961).
R2-1804279 3GPP TSG-RAN WG2 Meeting #101, Sanya, China, Apr. 16-20, 2018, Source: ASUSTek, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804304 3GPP TSG-RAN WG2 Meeting #101, Sanya, China, Apr. 16-20, 2018, Source: Samsung, Title: Contention Based BFR Procedure: Reporting Candidate Beam.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, 2018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805005 3GPP TSG-RAN WG2 Meeting #101, Sanya, China, Apr. 16-20, 2018, Source: Intel Corporation, Title: On beam failure detection and recovery using random access.
R2-1805342 3GPP TSG-RAN WG2 Meeting #101, Sanya, China, Apr. 16-20, 2018, Source: Nokia, Nokia Shanghail Bell, Title: SCell Beam Failure Recovery.

(56) References Cited

OTHER PUBLICATIONS

R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806819 3GPP TSG-RAN WG2 Meeting #102, Busan, Korea, May 21-25, 2018, Source: Samsung, Title: MAC Impacts: Beam Failure Recovery for SCell.
R2-1806821 3GPP TSG-RAN WG2 Meeting #102, Busan, Korea, May 21-25, 2018, Source: InterDigital, Inc., Title: BFR on SCell.
R2-1806824 3GPP TSG-RAN WG2 Meeting #102, Busan, Korea, May 21-25, 2018, Source: Samsung, Title: Contention Based BFR Procedure: Reporting Candidate Beam.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title: BWP switch for BFR.
R2-1807961 3GPP TSG-RAN WG2 Meeting #102, Busan, Korea, May 21-25, 2018, Source: Huawei, HiSilicon, Title: Discussion on BFR-config for SCell BFR.
R2-1807975 3GPP TSG-RAN WG2 Meeting #102, Busan, Korea, May 21-25, 2018, Source: Huawei, HiSilicon, Title: Discussion on beam failure recovery for SCell.
R2-1808024 3GPP TSG RAN WG2 Meeting #102, Busan, Korea, May 21-25, 2018, Source: Nokia, Nokia Shanghai Bell, Title: SCell Beam Failure Recovery.
R2-1808658 3GPP TSG RAN WG2 Meeting #102, Busan, Korea, May 21-25, 2018, Source: ITL, Title: Beam failure recovery on SCell.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101bis, Sanya, China, Apr. 16-20, 2018, Source: Samsung, Title: Miscellaneous corrections.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R1-1810105 3GPP TSG-RAN WG1 Meeting #94bis, Chengdu, PR China, Oct. 8-12, 2018, Source: Huawei, HiSilicon, Title: Beam management enhancements for latency and overhead reduction.
R1-1810106 3GPP TSG-RAN WG1 Meeting #94bis, Chengdu, PR China, Oct. 8-12, 2018, Source: Huawei, HiSilicon, Title: Beam failure recovery for SCell.
R1-1810221 3GPP TSG-RAN WG1 Meeting #94bis, Chengdu, PR China, Oct. 8-12, 2018, Source: ZTE, Title: Enhancements on multi-beam operation.
R1-1810303 3GPP TSG-RAN WG1 Meeting #94bis, Chengdu, PR China, Oct. 8-12, 2018, Source: LG Electronics, Title: Discussion on multi-beam based operations and enhancements.
R1-1810403 3GPP TSG-RAN WG1 Meeting #94bis, Chengdu, PR China, Oct. 8-12, 2018, Source: vivo, Title: Discussion on Enhancements on Multi-Beam Operation.

(56) References Cited

OTHER PUBLICATIONS

R1-1810408 3GPP TSG-RAN WG1 Meeting #94bis, Chengdu, PR China, Oct. 8-12, 2018, Source: vivo, Title: Discussion on beam measurement and reporting.
R1-1810409 3GPP TSG-RAN WG1 Meeting #94bis, Chengdu, PR China, Oct. 8-12, 2018, Source: vivo, Title: Discussion on SCell BFR.
R1-1810410 3GPP TSG-RAN WG1 Meeting #94bis, Chengdu, PR China, Oct. 8-12, 2018, Source: vivo, Title: Discussion on UL multi-beam transmission.
R1-1810411 3GPP TSG-RAN WG1 Meeting #94bis, Chengdu, PR China, Oct. 8-12, 2018, Source: vivo, Title: Discussion on beam management latency and overhead reduction.
R1-1810435 3GPP TSG-RAN WG1 Meeting #94bis, Chengdu, PR China, Oct. 8-12, 2018, Source: MediaTek Inc., Title: Enhancements on multi-beam operation.
R1-1810556 3GPP TSG-RAN WG1 Meeting #94bis, Chengdu, PR China, Oct. 8-12, 2018, Source: CATT, Title: Consideration on multi-beam operation enhancements.
R1-1810572 3GPP TSG-RAN WG1 Meeting #94bis, Chengdu, PR China, Oct. 8-12, 2018, Source: Lenovo, Motorola Mobility, Title: Discussion of enhancements for multi-beam operation.
R1-1810598 3GPP TSG-RAN WG1 Meeting #94bis, Chengdu, PR China, Oct. 8-12, 2018, Source: Fujitsu, Title: Discussion on beam failure recovery for SCell.
R1-1810644 3GPP TSG-RAN WG1 Meeting #94bis, Chengdu, PR China, Oct. 8-12, 2018, Source: Sony, Title: Considerations on multi-beam operation.
R1-1810688 3GPP TSG-RAN WG1 Meeting #94bis, Chengdu, PR China, Oct. 8-12, 2018, Source: AT&T, Title: Enhancements on Multi-Beam Operation for NR.
R1-1810791 3GPP TSG-RAN WG1 Meeting #94bis, Chengdu, PR China, Oct. 8-12, 2018, Source: Intel Corporation, Title: On Beam Management Enhancement.
R1-1810805 3GPP TSG-RAN WG1 Meeting #94bis, Chengdu, PR China, Oct. 8-12, 2018, Source: NEC, Title: Discussion on Beam Failure Recovery.
R1-1810886 3GPP TSG-RAN WG1 Meeting #94bis, Chengdu, PR China, Oct. 8-12, 2018, Source: Samsung, Title: Enhancements on multi-beam operations.
R1-1810970 3GPP TSG-RAN WG1 Meeting #94bis, Chengdu, PR China, Oct. 8-12, 2018, Source: OPPO, Title: Discussion on Multi-beam Operation Enhancements.
R1-1811002 3GPP TSG-RAN WG1 Meeting #94bis, Chengdu, PR China, Oct. 8-12, 2018, Source: Spreadtrum Communications, Title: Discussion on multi-beam operation.
R1-1811086 3GPP TSG-RAN WG1 Meeting #94bis, Chengdu, PR China, Oct. 8-12, 2018, Source: Fraunhofer IIS, Fraunhofer HHI, Title: Discussion on signaling of beam correspondence.
R1-1811188 3GPP TSG-RAN WG1 Meeting #94bis, Chengdu, PR China, Oct. 8-12, 2018, Source: Ericsson, Title: Enhancements on Multi-beam Operation.
R1-1811189 3GPP TSG-RAN WG1 Meeting #94bis, Chengdu, PR China, Oct. 8-12, 2018, Source: Ericsson, Title: Link recovery on SCell.
R1-1811223 3GPP TSG-RAN WG1 Meeting #94bis, Chengdu, PR China, Oct. 8-12, 2018, Source: InterDigital Inc., Title: Discussion on Multi-Beam Operation Enhancements.
R1-1811278 3GPP TSG-RAN WG1 Meeting #94bis, Chengdu, PR China, Oct. 8-12, 2018, Source: Qualcomm Incorporated, Title: Enhancements on Multi-beam Operation.
R1-1811349 3GPP TSG-RAN WG1 Meeting #94bis, Chengdu, PR China, Oct. 8-12, 2018, Source: NTT DOCOMO, Inc., Title: Discussion on multi-beam enhancement.
R1-1811393 3GPP TSG-RAN WG1 Meeting #94bis, Chengdu, PR China, Oct. 8-12, 2018, Source: Xiaomi, Title: Enhancements on beam management.
R1-1811408 3GPP TSG-RAN WG1 Meeting #94bis, Chengdu, PR China, Oct. 8-12, 2018, Source: Nokia, Nokia Shanghai Bell, Title: Enhancements on Multi-beam Operation.
R1-1811470 3GPP TSG-RAN WG1 Meeting #94bis, Chengdu, PR China, Oct. 8-12, 2018, Source: Huawei, HiSilicon, Title: Enhancements on multi-beam operation.

* cited by examiner

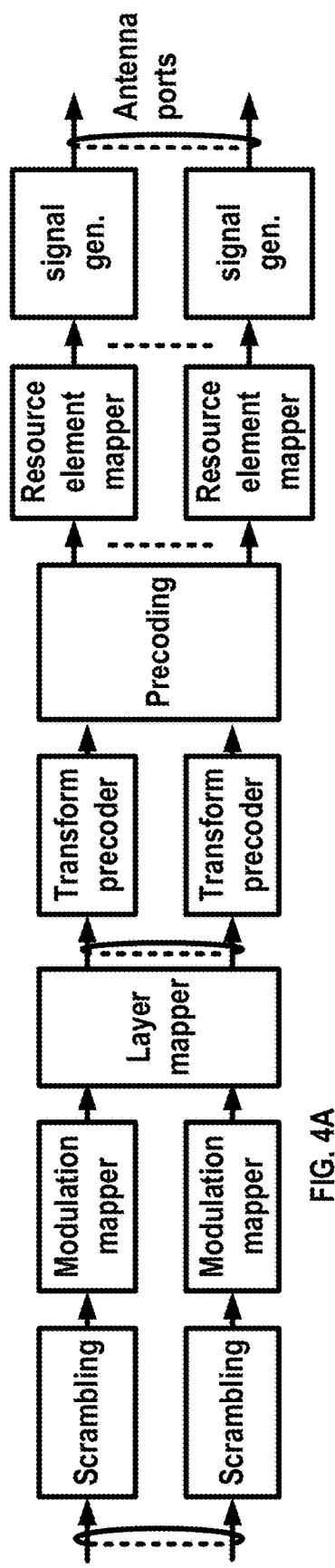
FIG. 4A
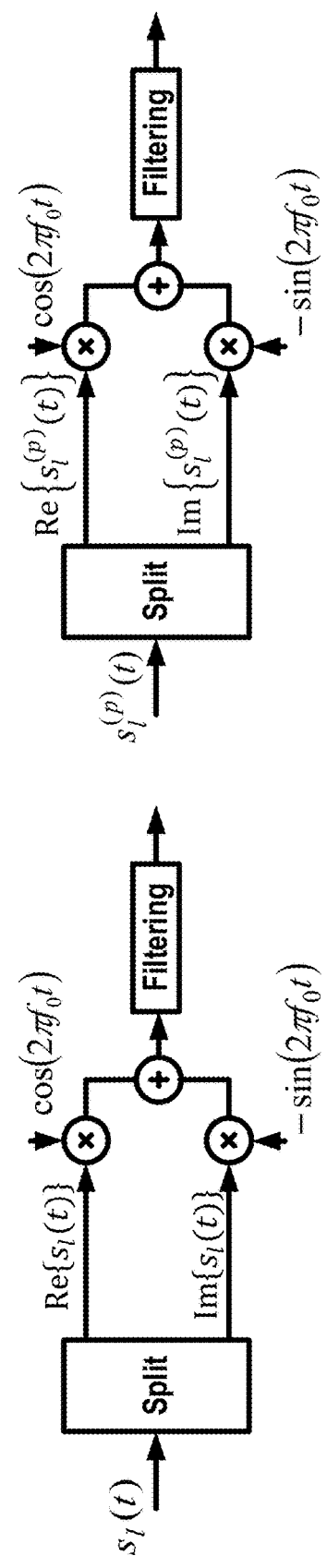
FIG. 4B
FIG. 4D
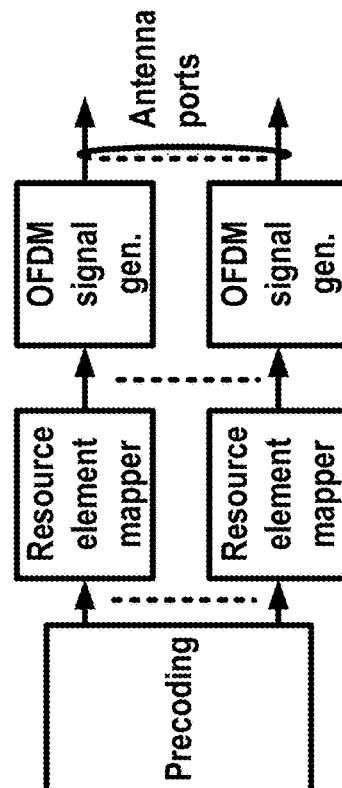
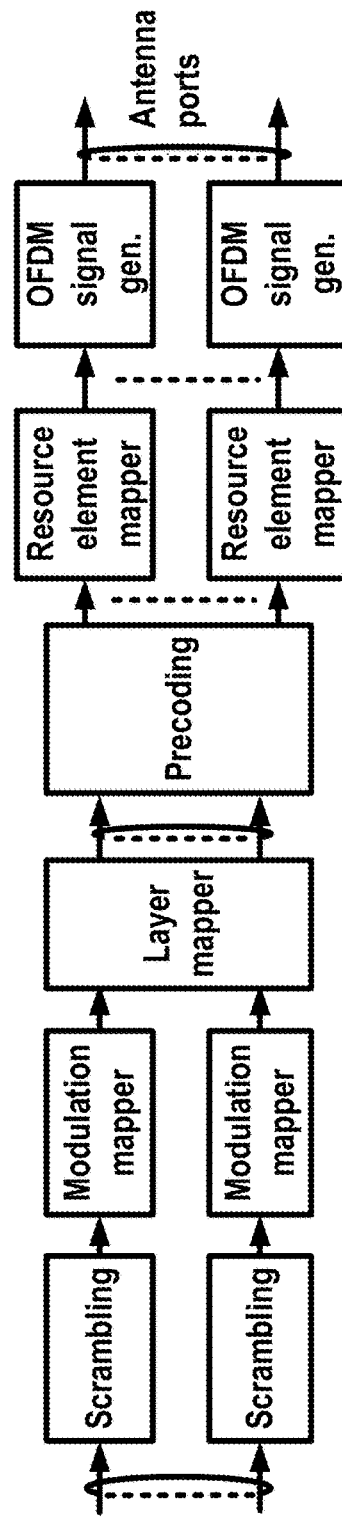
FIG. 4C

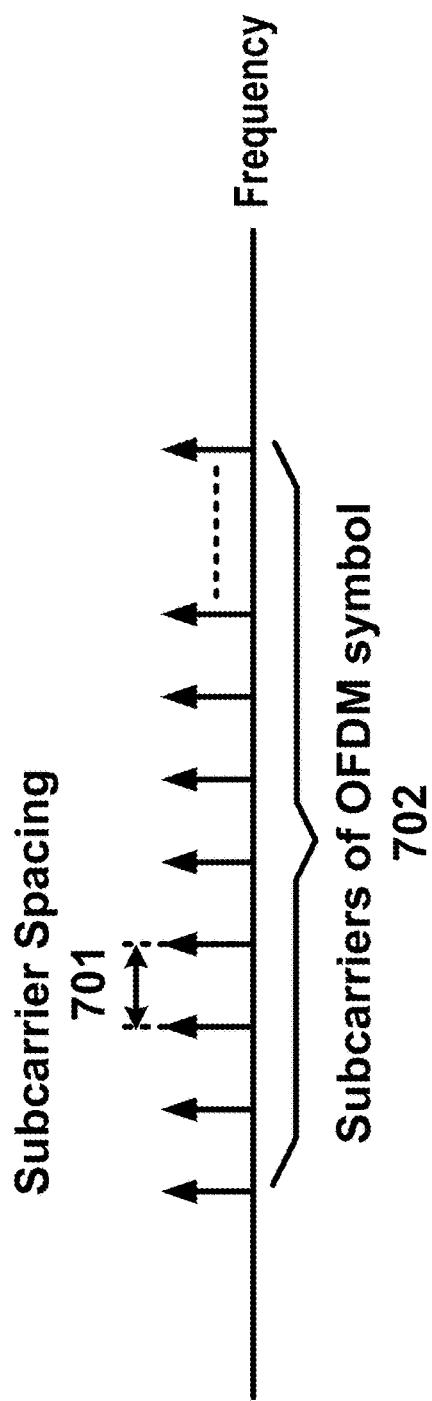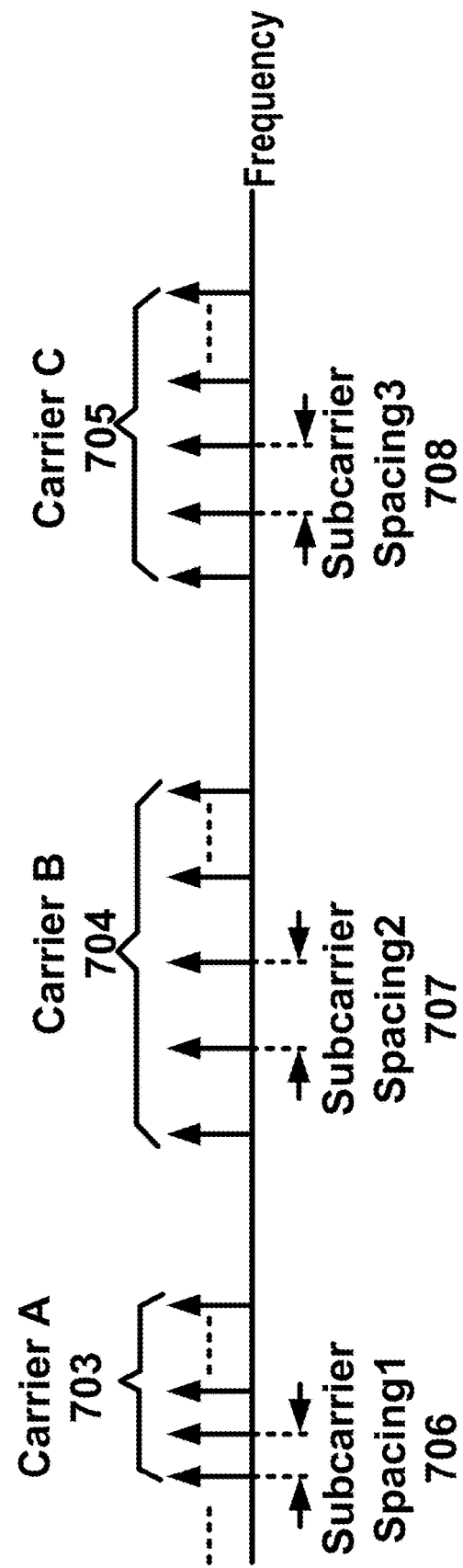
FIG. 7A
FIG. 7B

| Index | LCID values |
|---|---|
| 000000 | CCCH |
| 000001-100000 | Identity of a logical channel |
| 100001-110111 | Reserved |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18A

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 18B

BEAM MANAGEMENT FOR CELLS IN WIRELESS COMMUNICATIONS

CROSS-REFERENCE TO RELATED APPLICATIONS

This application is a continuation of U.S. application Ser. No. 16/670,225, filed Oct. 31, 2019, which claims the benefit of U.S. Provisional Application No. 62/753,288, filed Oct. 31, 2018. Each of the above-referenced applications are hereby incorporated by reference in their entirety.

BACKGROUND

Wireless communications may use multiple serving beams and/or other wireless resources. A base station and/or a wireless device may use one or more serving beams for one or more cells. A beam failure in one or more cells may occur. Beam failure recovery procedures for one or more cells may require consumption of resources (e.g., frequency resources, time resources, energy resources, etc.), that may be limited, and may lead to system inefficiencies.

SUMMARY

The following summary presents a simplified summary of certain features. The summary is not an extensive overview and is not intended to identify key or critical elements.

Communication devices (e.g., a wireless device, a base station, etc.) may perform a beam failure recovery (BFR) procedure. Beam failure recovery methods may be inefficient and may consume a lot of resources. For a BFR procedure and based on one or more criteria, communication devices may use different signals via different uplink/downlink resources, may indicate and/or acknowledge a candidate beam selection status, and/or may communicate one or more configuration parameters for the BFR procedure in an uplink resource and/or a downlink resource. System efficiencies and flexibility, such as resource allocation efficiencies and flexibility, power consumption efficiencies, avoiding latency, bandwidth parts linkage flexibility, beam failure managing flexibility, etc., may be improved.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 7A and FIG. 7B show example sets of orthogonal frequency division multiplexing (OFDM) subcarriers.

FIG. 18A and FIG. 18B are examples of LCIDs as per an aspect of an embodiment of the present disclosure.

DETAILED DESCRIPTION

Figure 1:
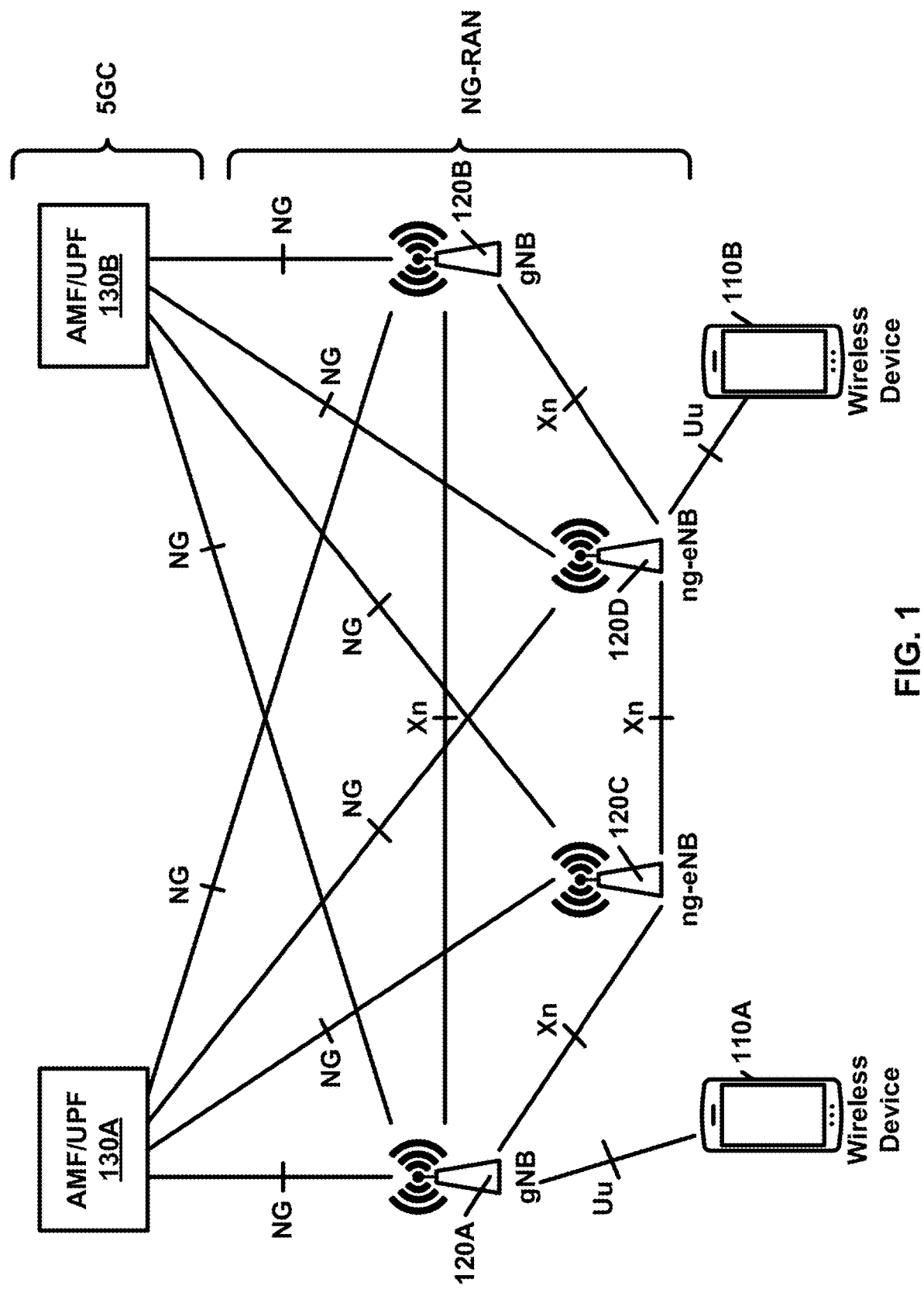
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to beam failure recovery procedures for wireless communications.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CE Control Element
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRI CSI-RS resource indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node j
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
URLLC Ultra-Reliable Low-Latency Communication
V2X Vehicle-to-everything
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
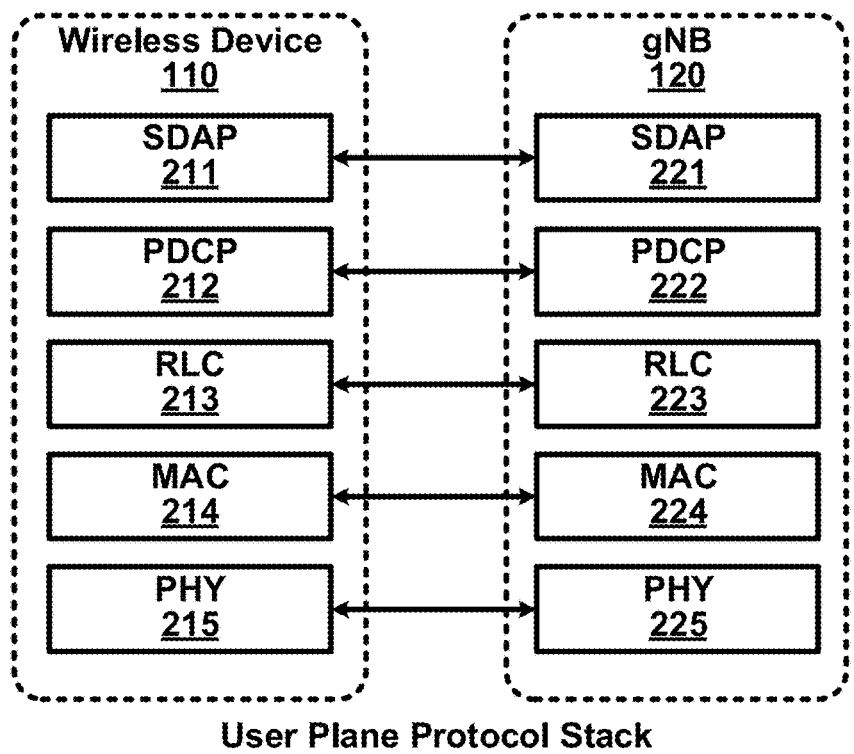
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
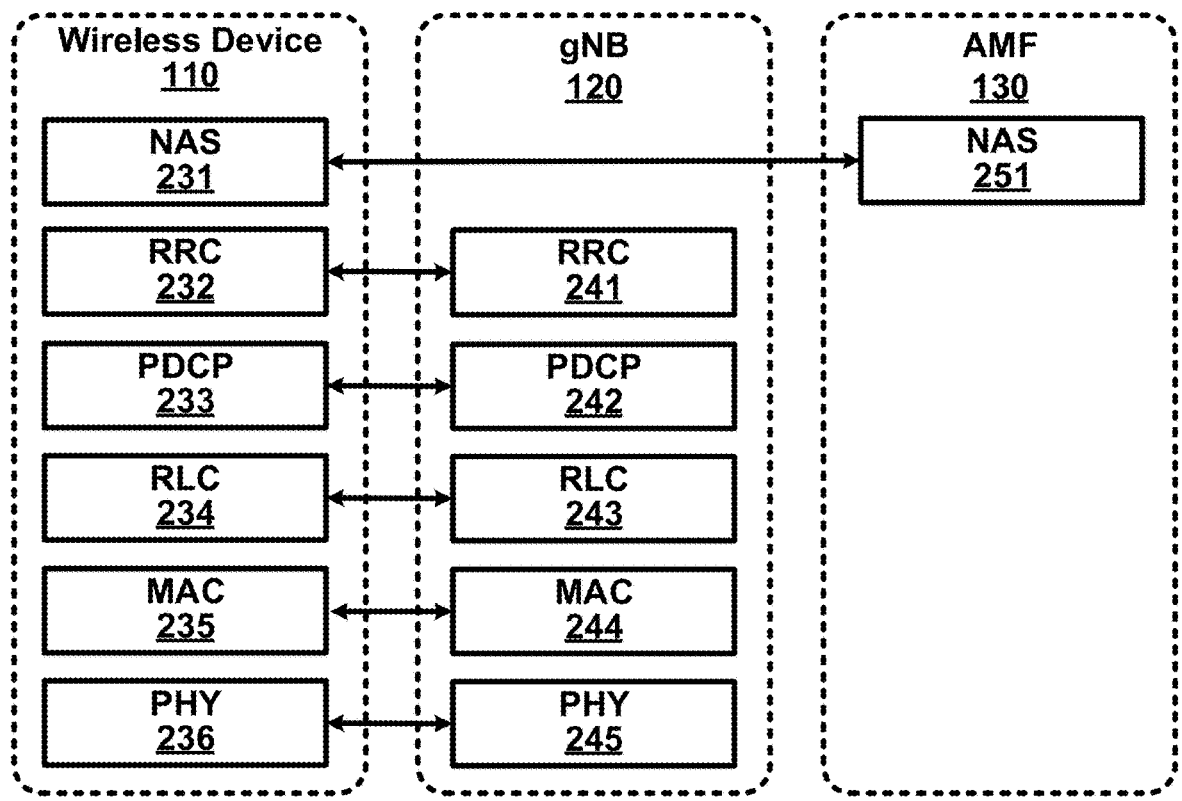
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements.

The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
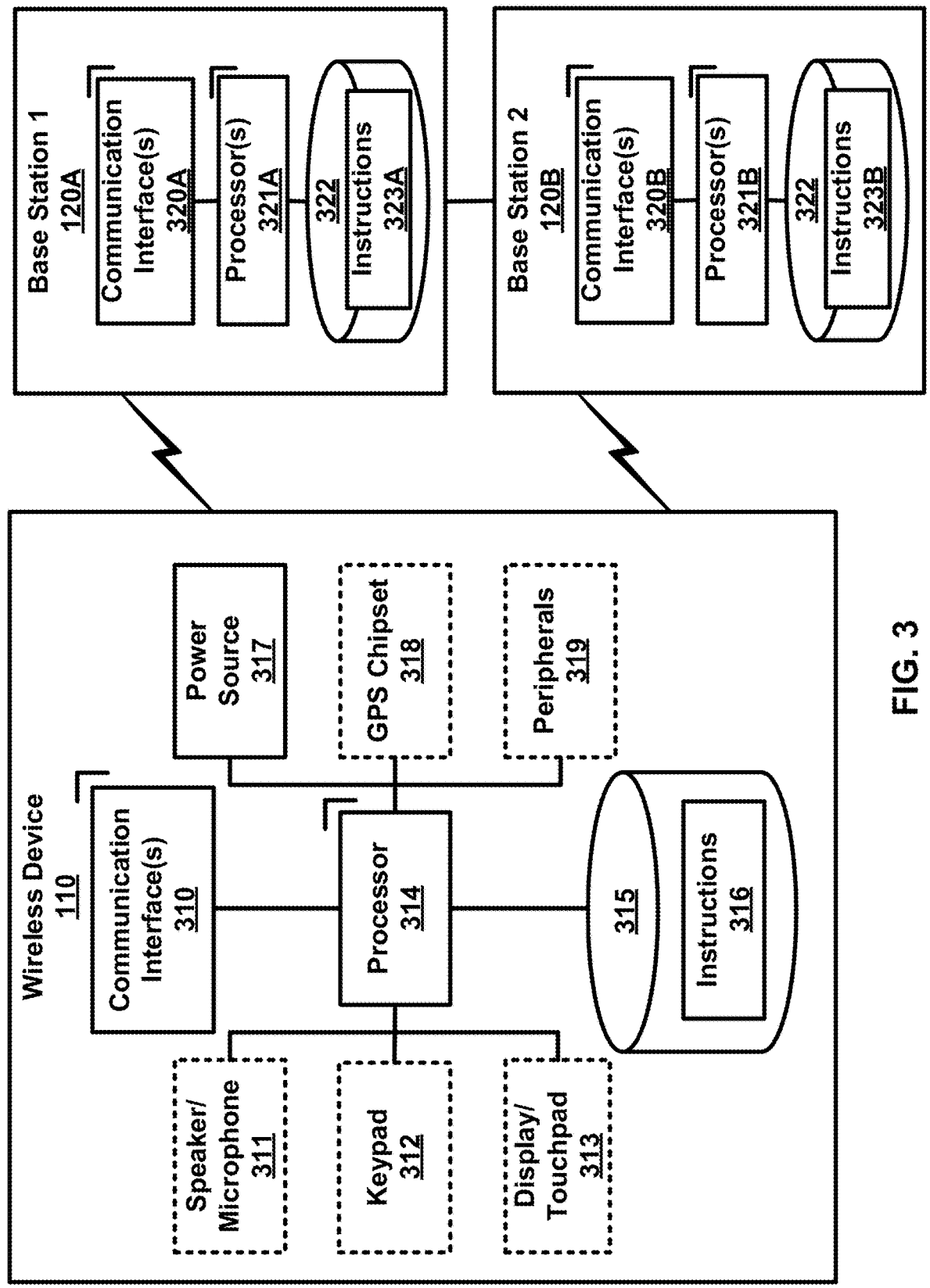
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
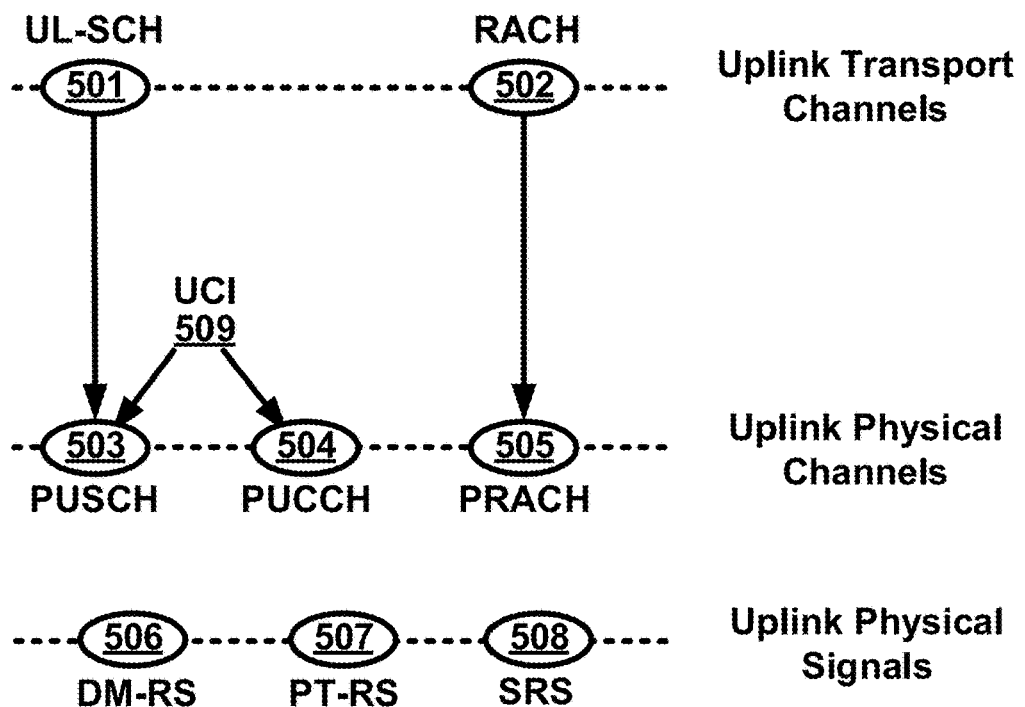
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
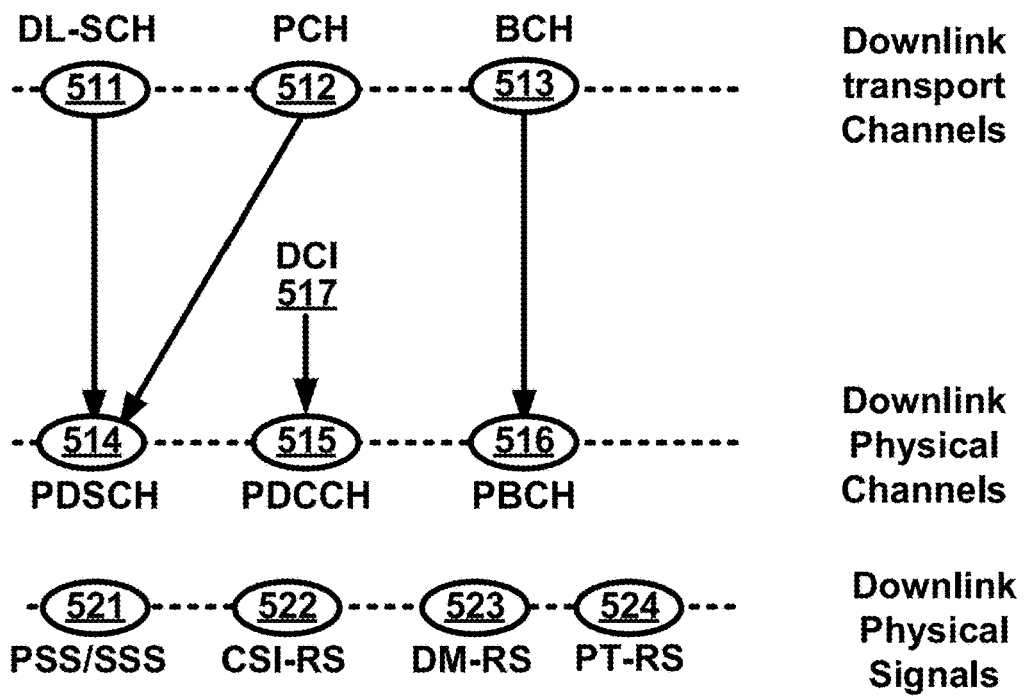
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
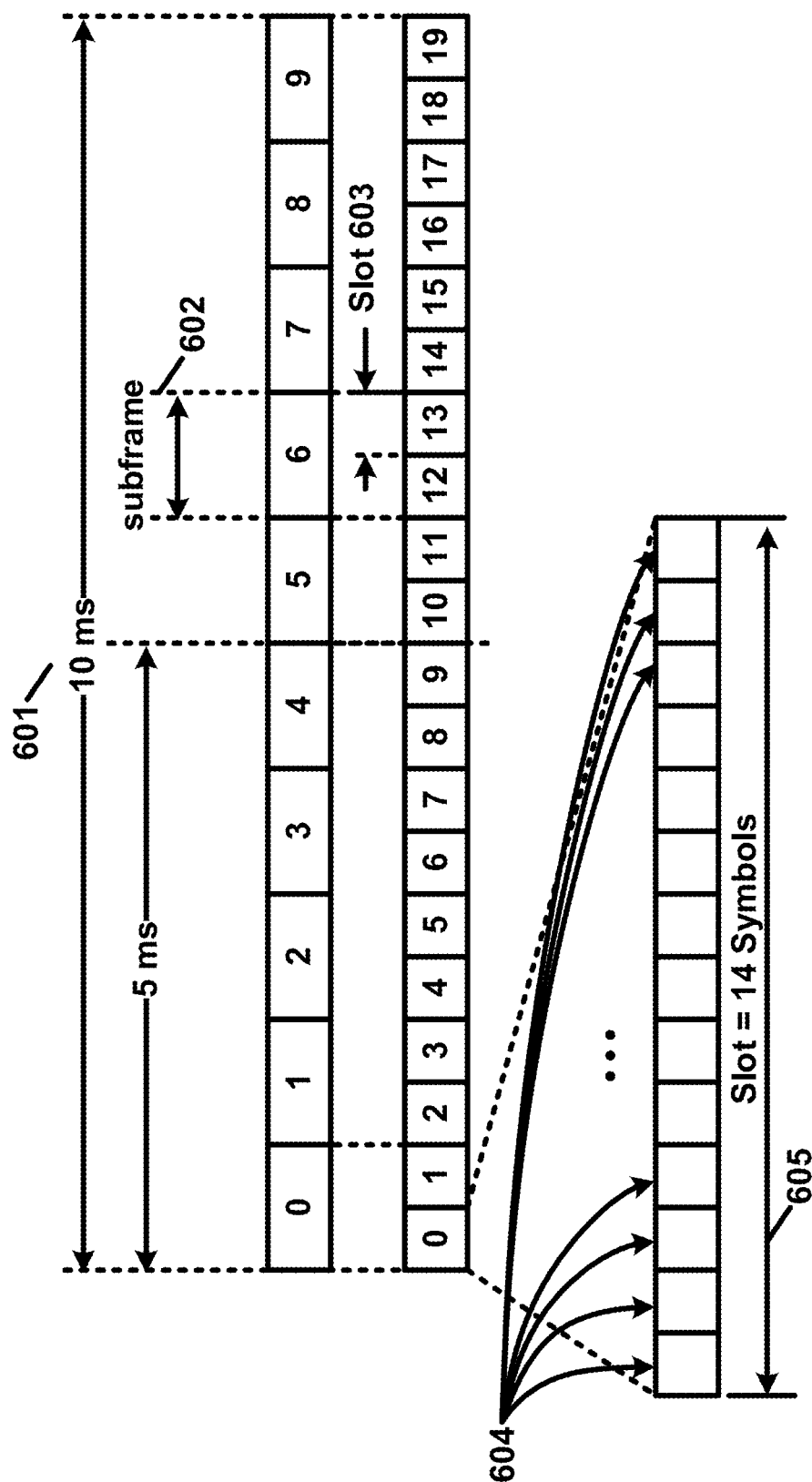
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may be based on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
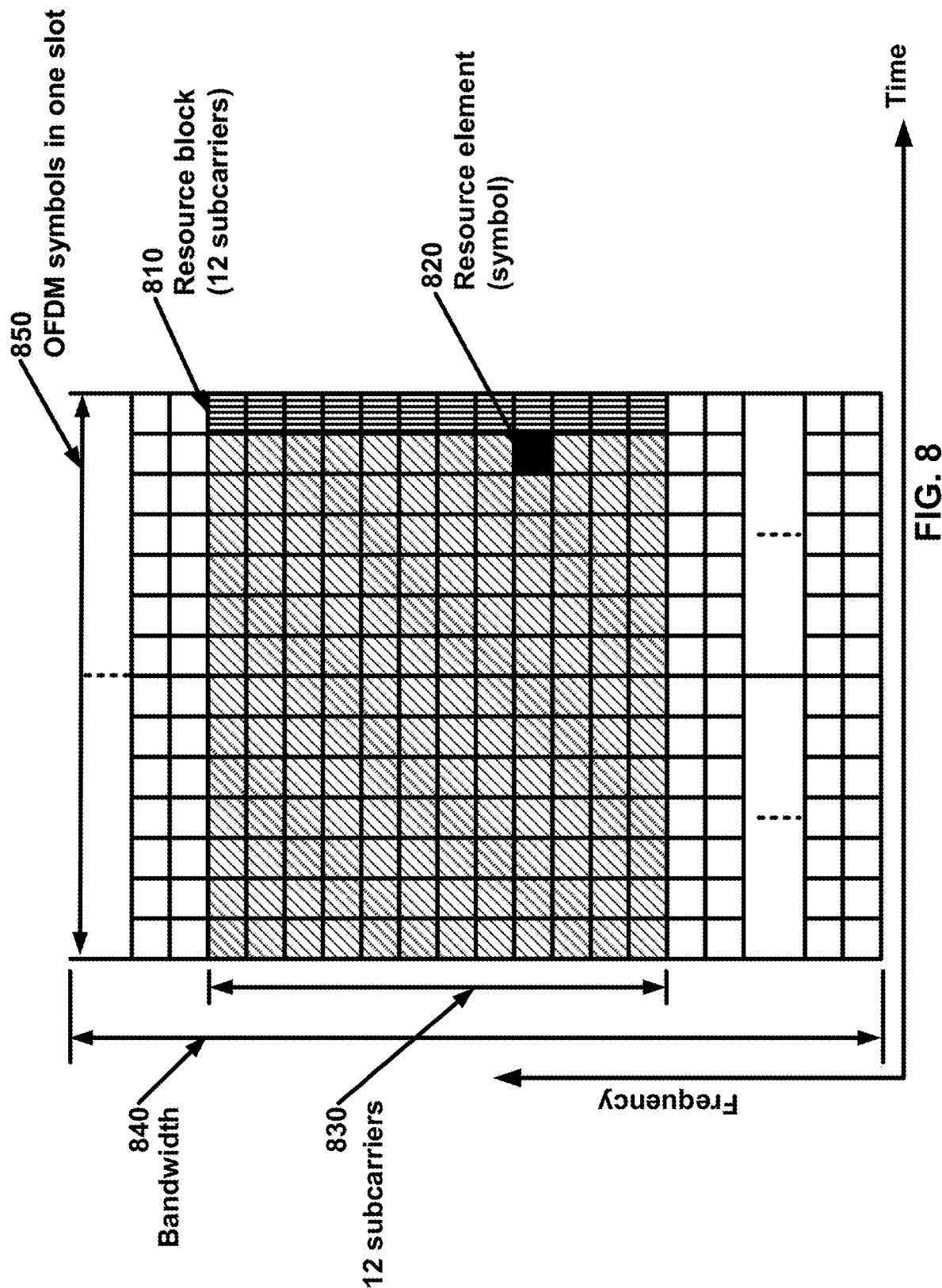
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
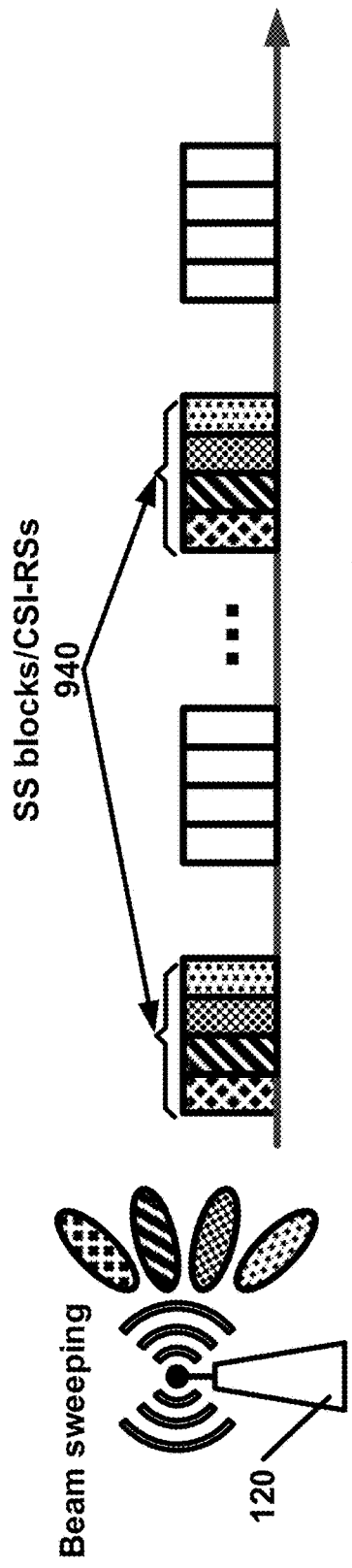
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
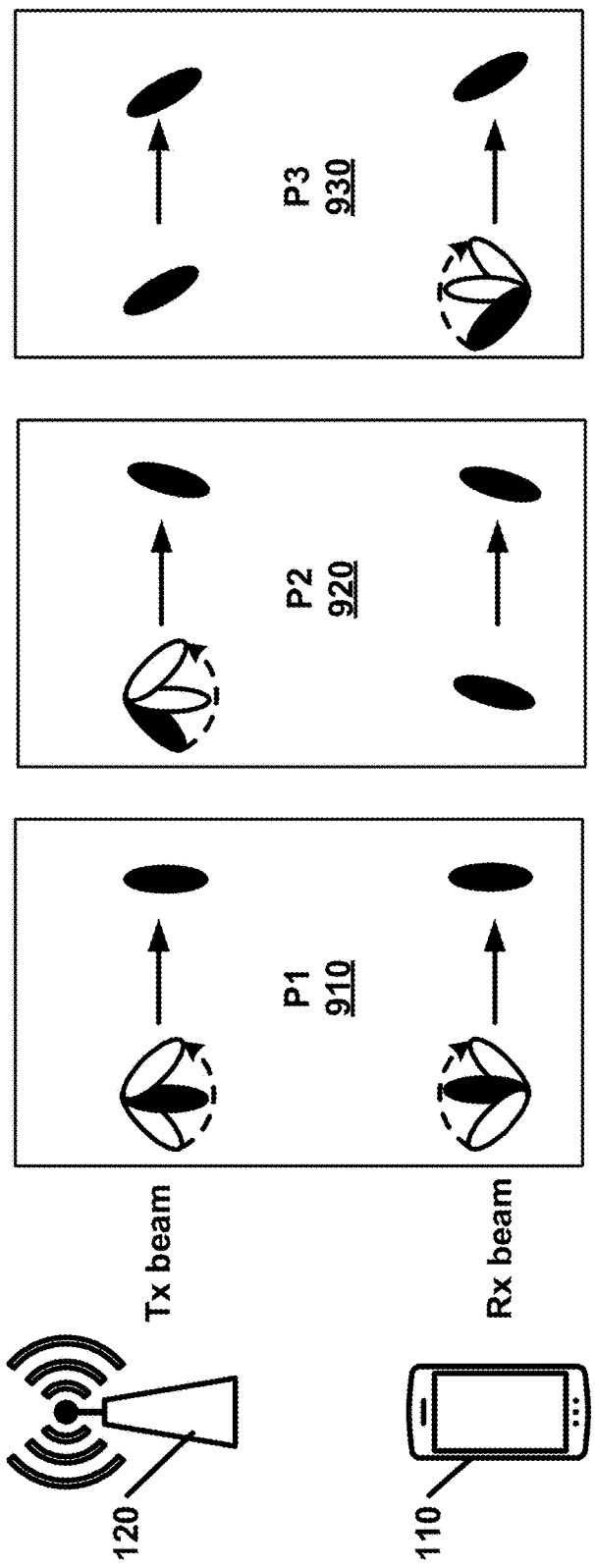
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
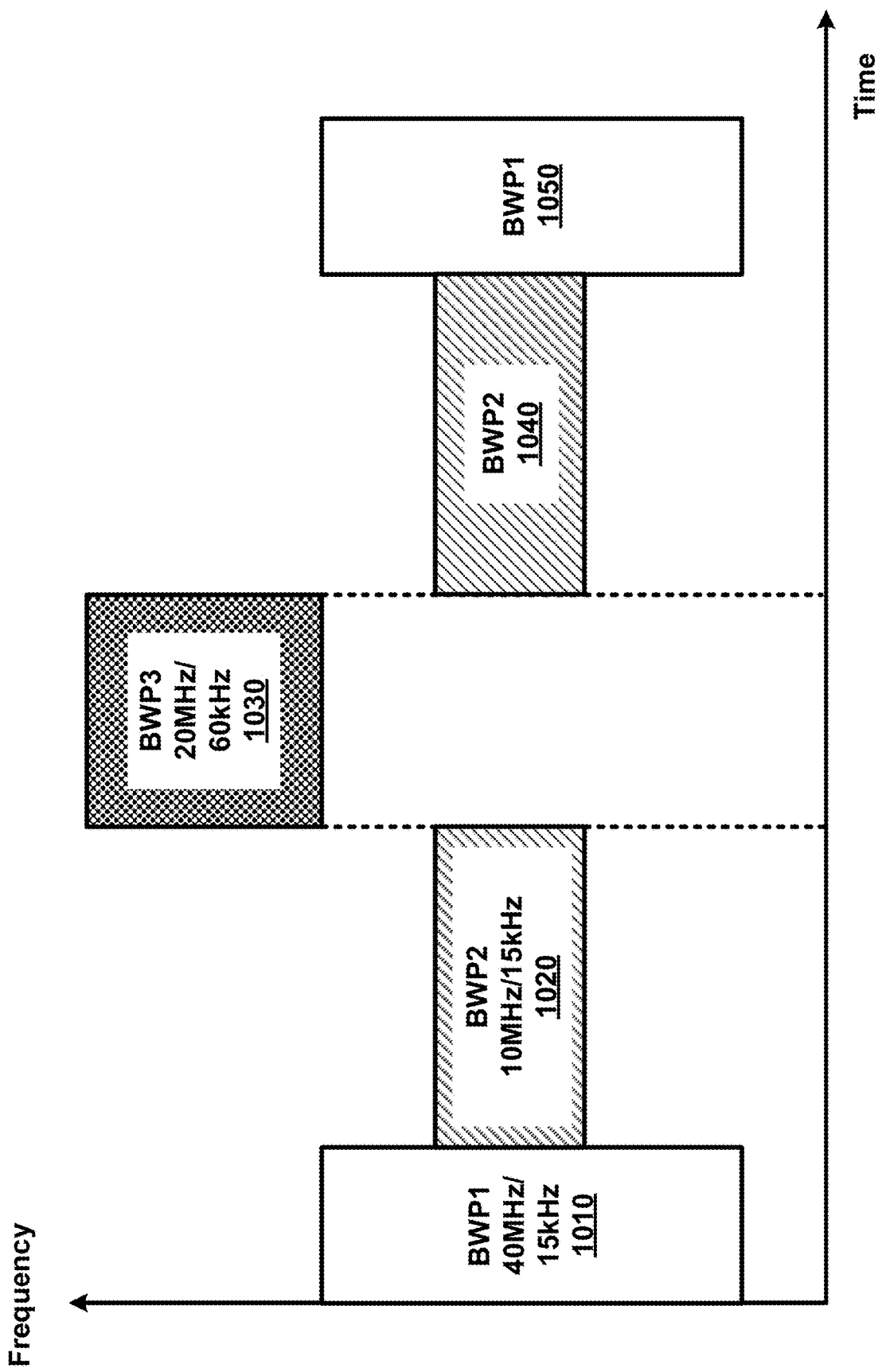
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively.

The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may refrain from configuring a wireless device without a common search space on a PCell, or on a PSCell, in an active DL BWP.

For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided with a default DL BWP, a default BWP may be an initial active DL BWP.

A default BWP may not be configured for one or more wireless devices. A first (or initial) BWP may serve as a default BWP, for example, if a default BWP is not configured.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
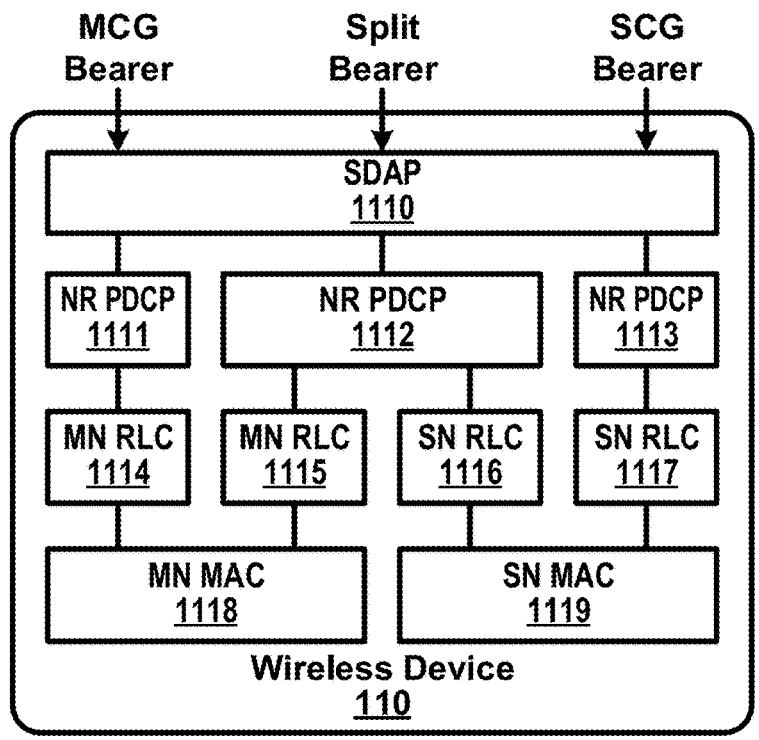
FIG. 11A and FIG. 11B show examples of multi connectivity.
Figure 11B:
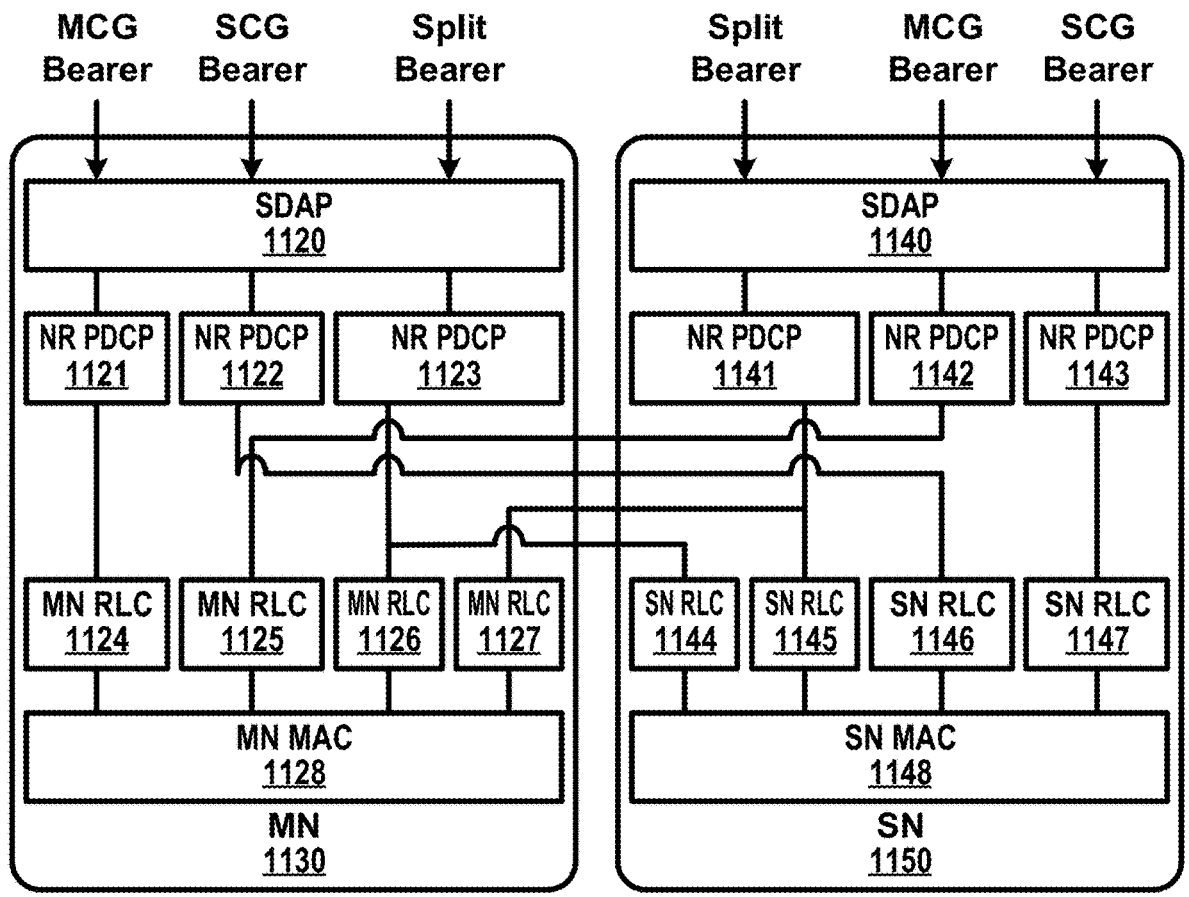

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain Radio Resource Management (RRM) measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
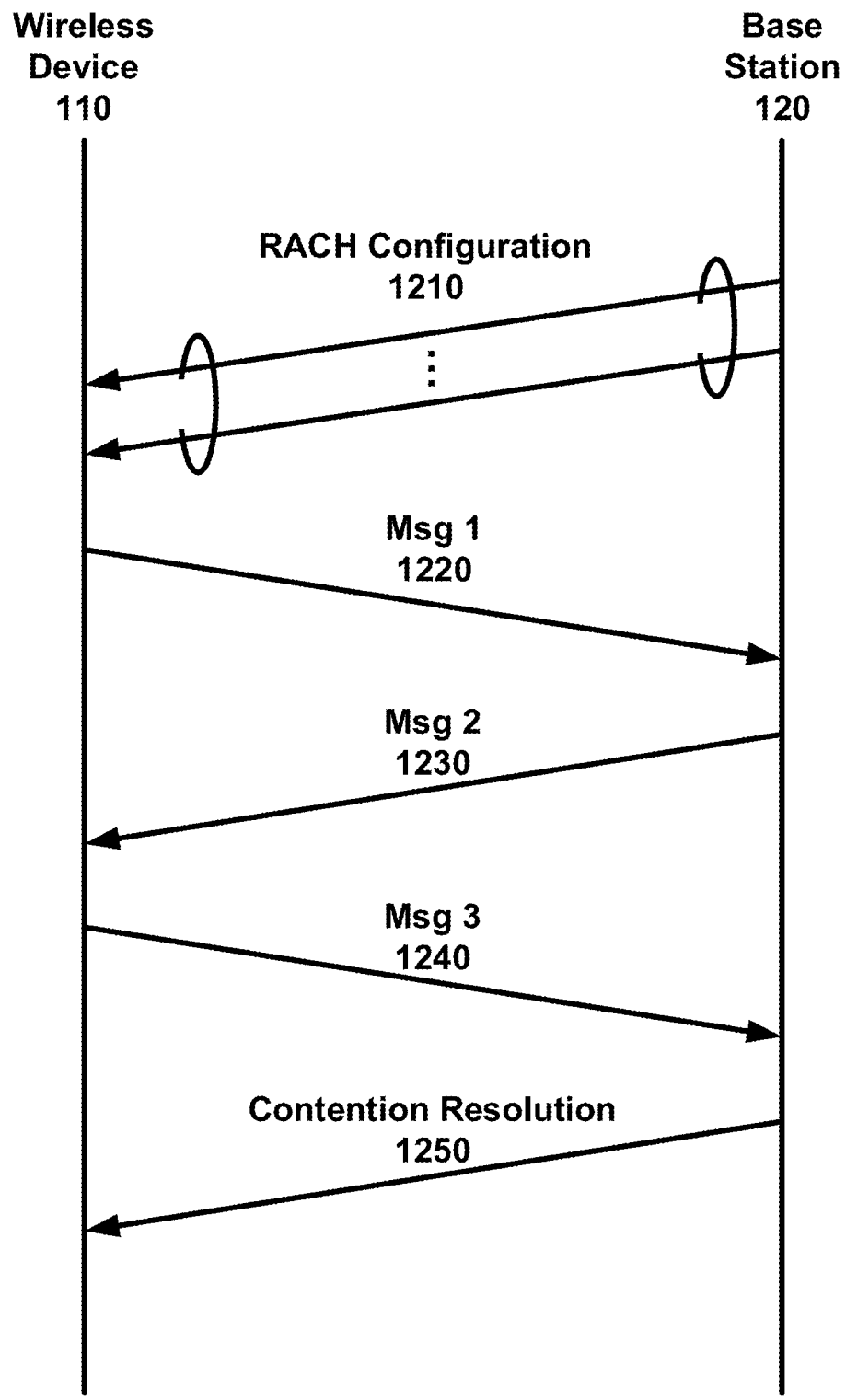
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
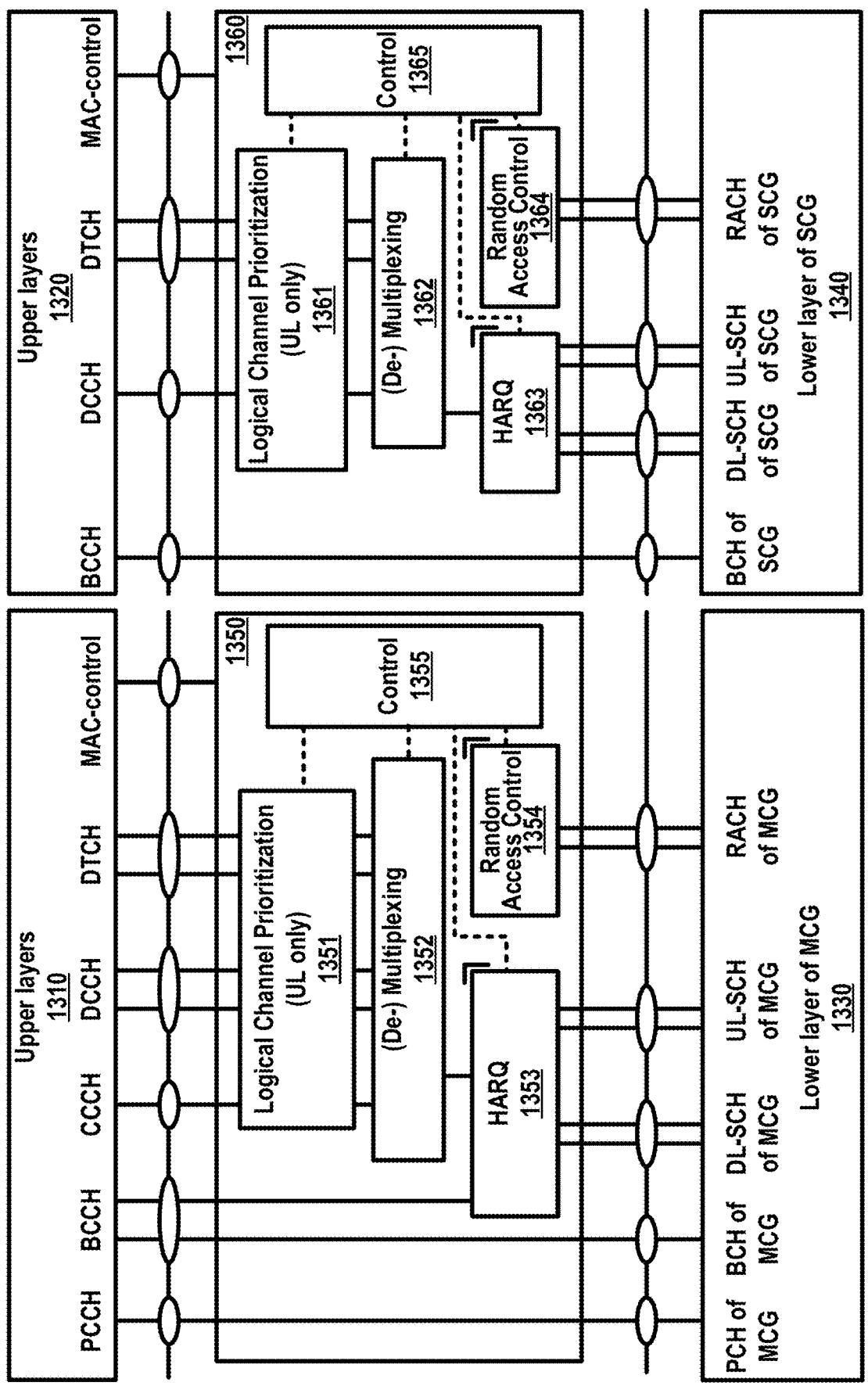
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
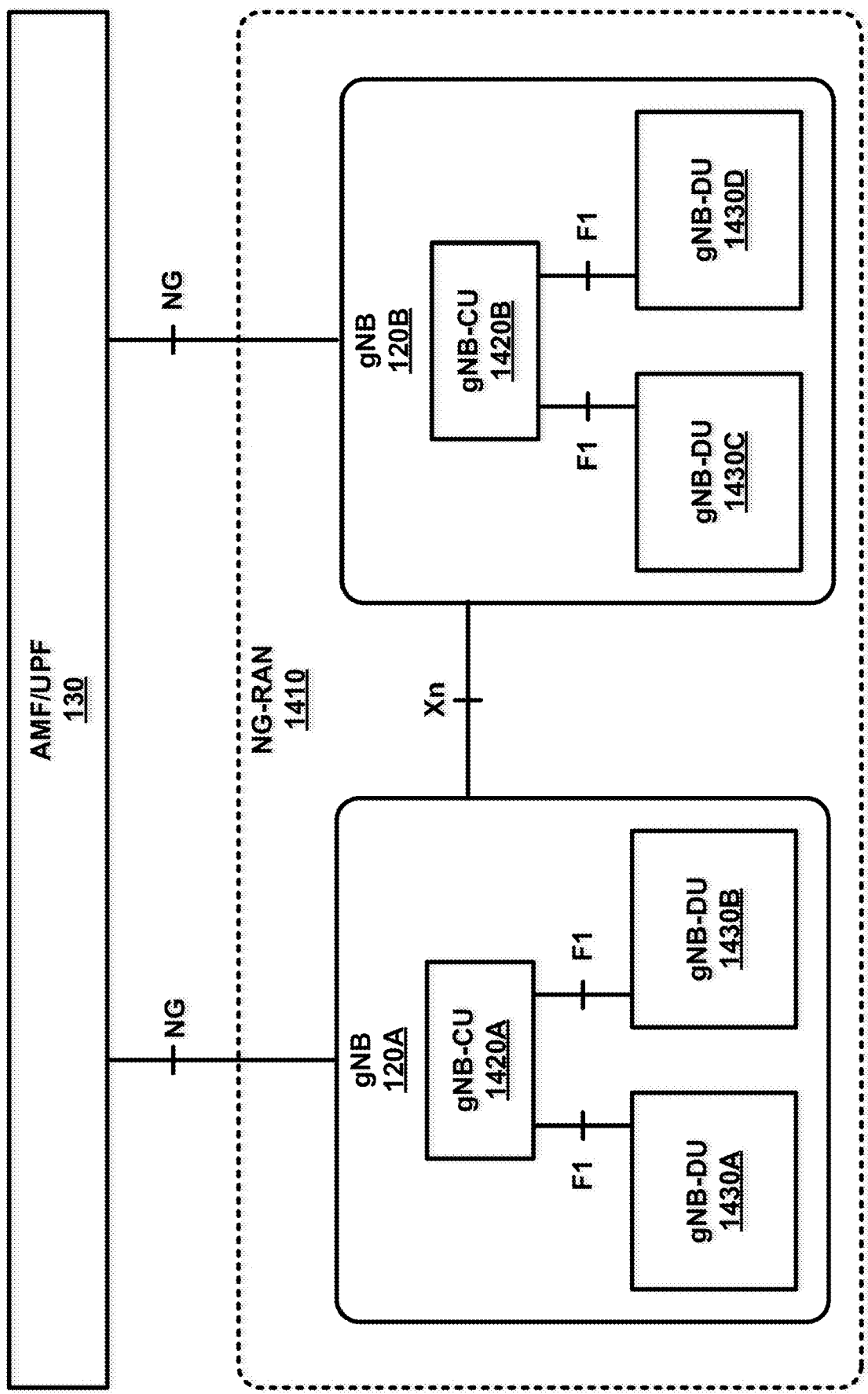
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
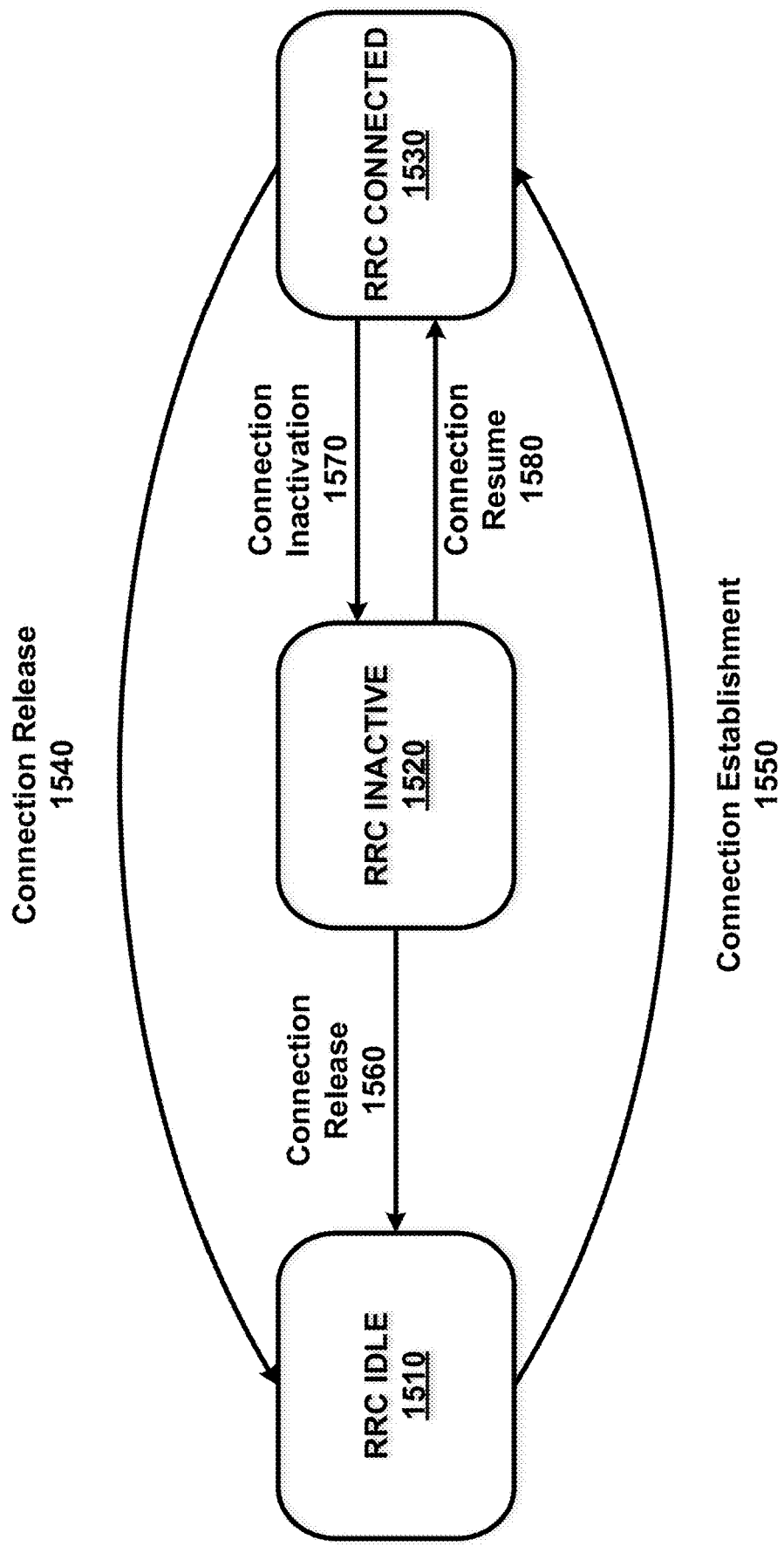
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/ MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased.

Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
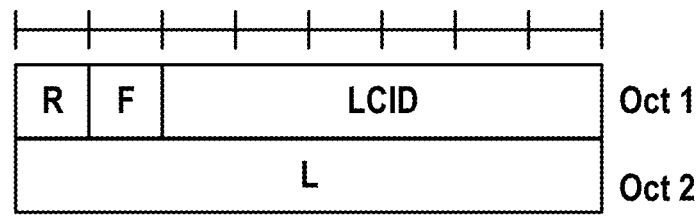
FIG. 16A, FIG. 16B and FIG. 16C show examples of MAC subheaders.

FIG. 16A shows an example of a MAC subheader comprising an eight-bit L field. The LCID field may have six bits in length. The L field may have eight bits in length.

Figure 16B:
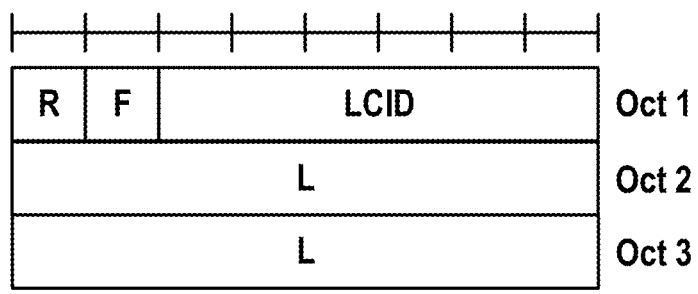

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
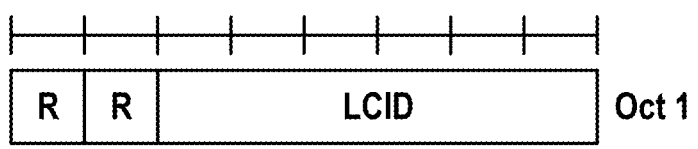

FIG. 16C shows an example of the MAC subheader. The LCID field may comprise six bits in length, and the R field may comprise two bits in length.

Figure 17A:
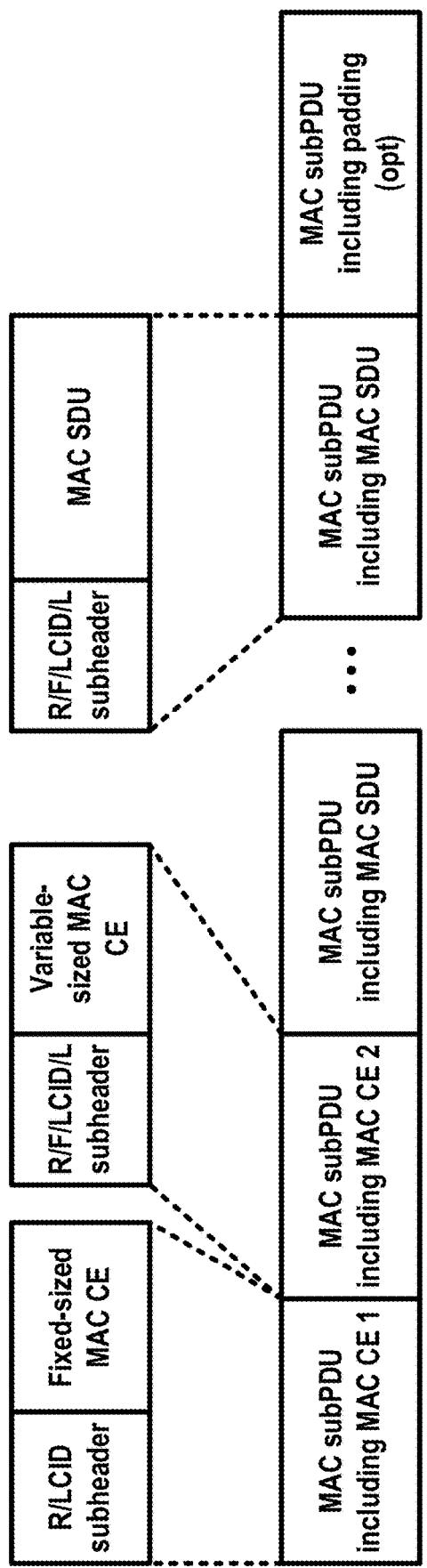
FIG. 17A and FIG. 17B show examples of MAC PDUs.

FIG. 17A shows an example of a DL MAC PDU. Multiple MAC CEs may be placed together.

A MAC subPDU comprising MAC CE may be placed before any MAC subPDU comprising a MAC SDU, and/or before a MAC subPDU comprising padding.

Figure 17B:
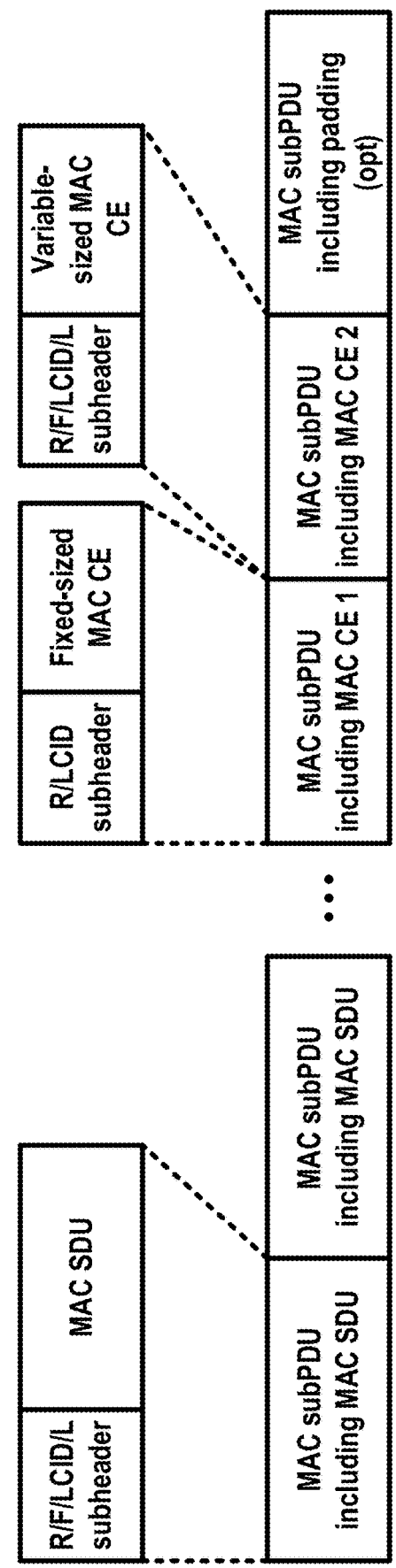

FIG. 17B shows an example of a UL MAC PDU. Multiple MAC CEs may be placed together.

A MAC subPDU comprising a MAC CE may be placed after all MAC subPDU comprising a MAC SDU. The MAC subPDU may be placed before a MAC subPDU comprising padding.

FIG. 18A shows first examples of LCIDs. FIG. 18B shows second examples of LCIDs. In each of FIG. 18A and FIG. 18B, the left columns comprise indices, and the right columns comprises corresponding LCID values for each index.

FIG. 18A shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate that a MAC CE associated with the MAC subheader is a long DRX command MAC CE.

FIG. 18B shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate that a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may stop the BWP inactivity timer associated with the activated SCell, for example, after or in response to the deactivating the activated SCell. The wireless device may deactivate any active BWP associated with the activated SCell, for example, after or in response to deactivating the activated SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 19A:
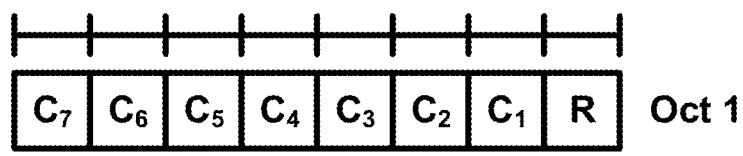
FIG. 19A and FIG. 19B show examples of secondary cell (SCell) Activation/Deactivation MAC CE.

FIG. 19A shows an example of an SCell activation/deactivation MAC CE that may comprise one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 19B:
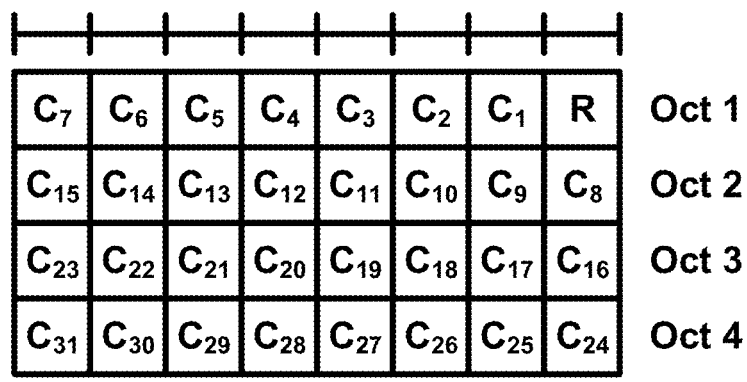

FIG. 19B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A wireless device may receive higher layer parameter TCI-States for PDCCH receptions. The higher layer parameter TCI-States may comprise a single TCI state (or a plurality of TCI states). The wireless device may determine (e.g., assume) that a DM-RS antenna port associated with the PDCCH receptions is quasi co-located with the one or more DL RS configured by the single TCI state, for example, after or in response to the higher layer parameter TCI-States comprising the single TCI state.

A base station may indicate, to a wireless device, a TCI state for PDCCH reception for a coreset of a serving cell, for example, by sending a TCI state indication for UE-specific PDCCH MAC CE. A MAC entity of the wireless device may indicate to lower layers (e.g., PHY) the information regarding a TCI state indication for the UE-specific PDCCH MAC CE, for example, if the MAC entity receives the TCI state indication for UE-specific PDCCH MAC CE on/for a serving cell.

A TCI state indication for UE-specific PDCCH MAC CE may be indicated (e.g., identified) by a MAC PDU subheader with LCID. The TCI state indication for wireless device-specific PDCCH MAC CE may have a fixed size of 16 bits (or any other quantity of bits) comprising one or more fields. The one or more fields may comprise a serving cell ID, a coreset ID, a TCI state ID, and a reserved bit.

The serving cell ID may indicate the identity of the serving cell for which the TCI state indication for the UE-specific PDCCH MAC CE applies. The length of the serving cell ID may be n bits (e.g., n=5 bits, or any other quantity of bits).

The coreset ID may indicate a control resource set (e.g., CORESET). The control resource set may be identified with a control resource set ID (e.g., ControlResourceSetId). The TCI State may be indicated to the control resource set ID. The length of the coreset ID may be n3 bits (e.g., n3=4 bits, or any other quantity of bits).

The TCI state ID may indicate the TCI state indicated (e.g., identified) by TCI-StateId. The TCI state may be applicable to the control resource set identified by the coreset ID. The length of the TCI state ID may be n4 bits (e.g., n4=6 bits, or any other quantity of bits).

Discontinuous reception (DRX) operation may be used by a wireless device, for example, to reduce power consumption, resource consumption (e.g., frequency and/or time resources), and/or improve battery lifetime of the wireless device. A wireless device may discontinuously monitor downlink control channel (e.g., PDCCH or EPDCCH), for example, if the wireless device is operating using DRX. The base station may configure DRX operation with a set of DRX parameters. The base station may configure the DRX operation using an RRC configuration. The set of DRX parameters may be selected (e.g., by the base station) based on a network use case. A wireless device may receive data packets over an extended delay, based on the configured DRX operation. The configured DRX may be used such that a base station may wait, at least until the wireless device transitions to a DRX ON state, to receive data packets. The wireless device may be in a DRX Sleep/OFF state, for example, if not receiving any data packets. The base station may select the DRX parameters, based on a consideration of a tradeoff between packet delay and power/resource conservation.

A wireless device that is configured with a DRX operation may power down at least some (or most) of its circuitry, for example, if there are no packets to be received. The wireless device may monitor PDCCH discontinuously, for example, if DRX operation is configured. The wireless device may monitor the PDCCH continuously, for example, if a DRX operation is not configured. The wireless device may listen to and/or monitor DL channels (e.g., PDCCHs) in a DRX active state, for example, if DRX is configured. The wireless device may not listen to and/or monitor the DL channels (e.g., the PDCCHs) in a DRX Sleep state, for example, if DRX is configured.

Figure 20:
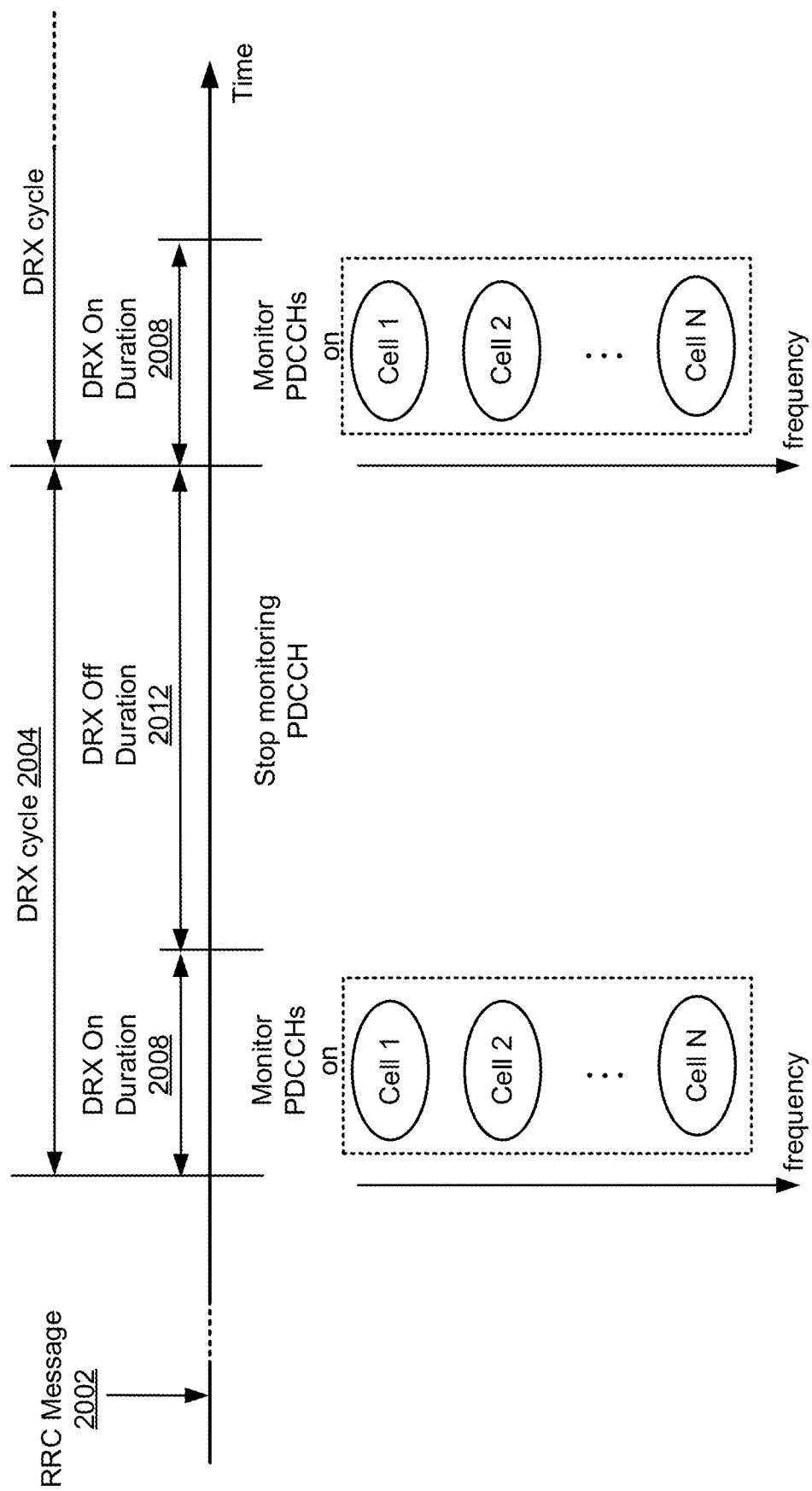
FIG. 20 shows an example of a discontinuous reception (DRX) operation.

FIG. 20 shows an example of a DRX operation. A base station (e.g., a gNB) may transmit an RRC message 2002 comprising, for example, one or more DRX parameters of a DRX cycle 2004. The RRC message may comprise: RRC connection reconfiguration message (e.g., RRCReconfiguration); RRC connection reestablishment message (e.g., RRCRestablishment); and/or RRC connection setup message (e.g., RRCSetup). The one or more parameters may comprise, for example, a first parameter and/or a second parameter. The first parameter may indicate a first time value of a DRX active state (e.g., DRX active/on duration 2008) of the DRX cycle 2004. The second parameter may indicate a second time of a DRX sleep state (e.g., DRX sleep/off duration 2012) of the DRX cycle 2004. The one or more parameters may further comprise, for example, a time duration of the DRX cycle 2004.

The wireless device may monitor PDCCHs, for detecting one or more DCIs on a serving cell, for example, if the wireless device is in the DRX active state. The wireless device may stop monitoring PDCCHs on the serving cell, for example, if the wireless device is in the DRX sleep state. The wireless device may monitor all PDCCHs on (or for) multiple cells that are in an active state, for example, if the wireless device is in the DRX active state. The wireless device may stop monitoring all PDCCH on (or for) the multiple cells, for example, if the wireless device is in the DRX sleep state. The wireless device may repeat the DRX operations according to the one or more DRX parameters.

DRX operation may be beneficial to a base station. A wireless device may transmit periodic CSI and/or SRS frequently (e.g., based on a configuration), for example, if DRX is not configured. The wireless device may not transmit periodic CSI and/or SRS in a DRX off period, for example, if DRX is not configured. The base station may assign resources, in DRX off period, that would otherwise be used for transmitting periodic CSI and/or SRS, to the other wireless devices, for example, to improve resource utilization efficiency.

A wireless device (e.g., a MAC entity of the wireless device) may be configured by RRC with a DRX functionality that controls downlink control channel (e.g., PDCCH) monitoring activity, of the wireless device, for a plurality of RNTIs for the wireless device. The plurality of RNTIs may comprise, for example, at least one of: C-RNTI, CS-RNTI, INT-RNTI, SP-CSI-RNTI, SFI-RNTI, TPC-PUCCH-RNTI, TPC-PUSCH-RNTI, Semi-Persistent Scheduling C-RNTI, eIMTA-RNTI, SL-RNTI, SL-V-RNTI, CC-RNTI, and/or SRS-TPC-RNTI. The wireless device (e.g., based on the wireless device being RRC_CONNECTED) may monitor the PDCCH discontinuously using a DRX operation, for example, if DRX is configured. The wireless device (e.g., the MAC entity of the wireless device) may monitor the PDCCH continuously, for example, if DRX is not configured.

RRC may control DRX operation, for example, by configuring a plurality of timers. The plurality of timers may comprise, for example: a DRX On duration timer (e.g., drx-onDurationTimer), a DRX inactivity timer (e.g., drx-InactivityTimer), a downlink DRX HARQ RTT timer (e.g., drx-HARQ-RTT-TimerDL), an uplink DRX HARQ RTT Timer (e.g., drx-HARQ-RTT-TimerUL), a downlink retransmission timer (e.g., drx-RetransmissionTimerDL), an uplink retransmission timer (e.g., drx-RetransmissionTimerUL), one or more parameters of a short DRX configuration (e.g., drx-ShortCycle and/or drx-ShortCycleTimer)), and/or one or more parameters of a long DRX configuration (e.g., drx-LongCycle). Time granularity for DRX timers may be defined in terms of PDCCH subframes (e.g., indicated as psf in DRX configurations), or in terms of milliseconds.

An active time of a DRX cycle may include a time duration/period in which at least one timer is running. The at least one timer may comprise drx-onDurationTimer, drx-InactivityTimer, drx-RetransmissionTimerDL, drx-RetransmissionTimerUL, or mac-ContentionResolutionTimer.

A drx-Inactivity-Timer may specify a time duration/period for which the wireless device may be active based on successfully decoding a PDCCH indicating a new transmission (UL or DL or SL). The drx-Inactivity-Timer may be restarted upon receiving PDCCH for a new transmission (UL or DL or SL). The wireless device may transition to a DRX mode (e.g., using a short DRX cycle or a long DRX cycle), for example, based on the expiry of the drx-Inactivity-Timer.

A drx-onDurationTimer may specify, for example, a time duration at the beginning of a DRX Cycle (e.g., DRX ON).

The drx-onDurationTimer may indicate, for example, a time duration before entering a sleep mode (e.g., DRX OFF).

An active time of a configured DRX cycle may comprise, for example, a time at which a scheduling request (e.g., sent on PUCCH) is pending. An active time of a configured DXR cycle may comprise, for example, a time in which an uplink grant for a pending HARQ retransmission may occur, and in which data is present in a corresponding HARQ buffer for a synchronous HARQ process. An active time of a configured DRX cycle may comprise, for example, a time in which a PDCCH indicating a new transmission, addressed to the C-RNTI of the wireless device (e.g., a MAC entity of the wireless device), has not been received at the wireless device (e.g., after a successful reception of an RA response at the wireless device). The RA response may correspond to, for example, a response to a preamble that is not selected by the wireless device, (e.g., the MAC entity of the wireless device).

DRX may be configured for a wireless device. drx-ShortCycleTimer may expire in a subframe. The MAC entity may use a long DRX cycle. A long DRX Command MAC control element may be received. The MAC entity may stop drx-ShortCycleTimer and may use the long DRX cycle.

Figure 21:
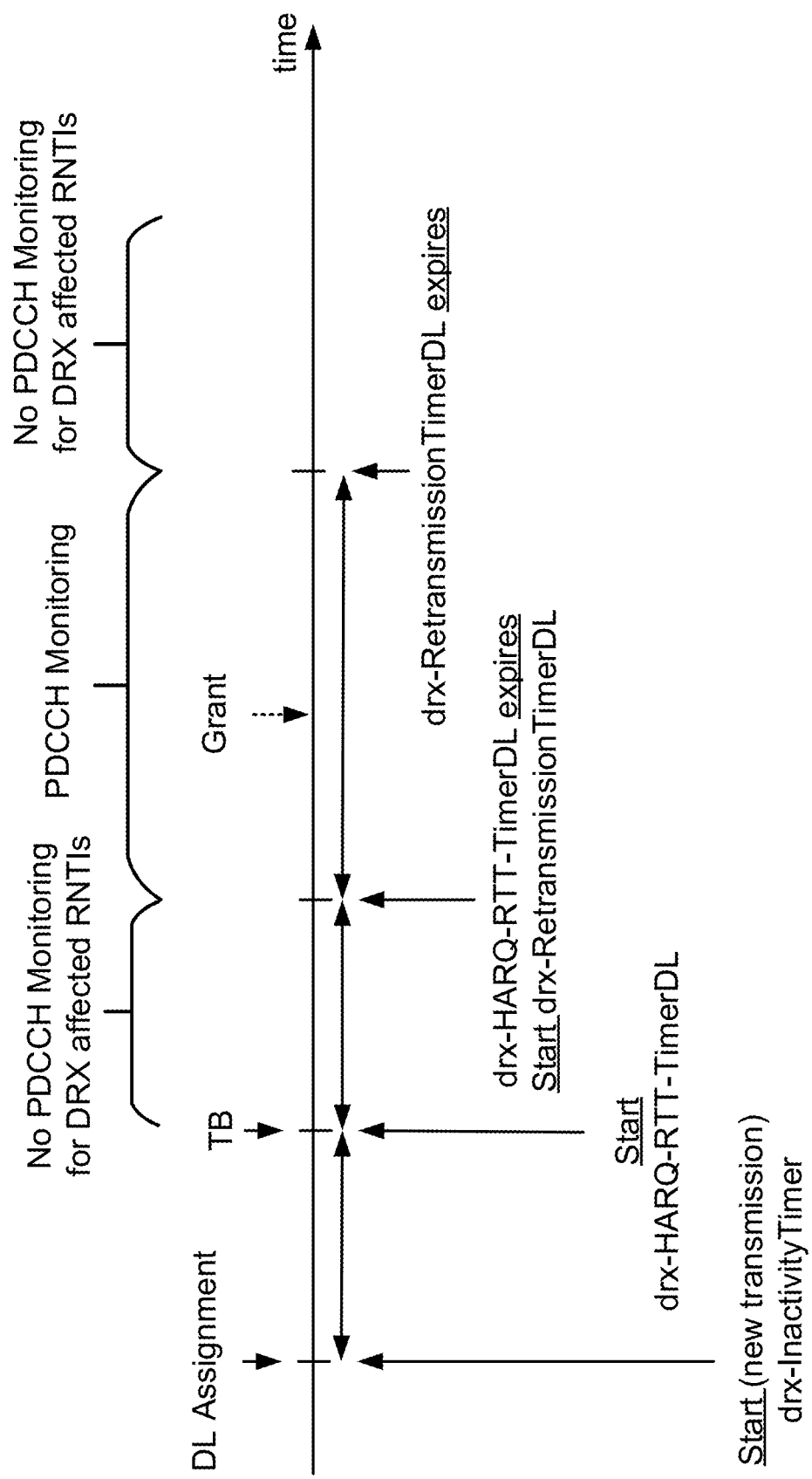
FIG. 21 shows an example of a DRX operation.

FIG. 21 shows an example of a DRX operation. A base station may send (e.g., transmit) an RRC message to a wireless device. The RRC message may comprise configuration parameters of a DRX operation. The base station may send (e.g., transmit), via a PDCCH, DCI for downlink resource allocation, to the wireless device. The wireless device may start a drx-InactivityTimer and may monitor the PDCCH. The wireless device may receive a transmission block (TB), for example, while the drx-InactivityTimer is running. The wireless device may start a HARQ RTT timer (e.g., drx-HARQ-RTT-TimerDL), and may stop monitoring the PDCCH, for example, based on receiving the TB. The wireless device may transmit a NACK to the base station, for example, if the wireless device fails to receive the TB. The wireless device may monitor the PDCCH and start a HARQ retransmission timer (e.g., drx-RetransmissionTimerDL), for example, based on an expiration of the HARQ RTT Timer. The wireless device may receive second DCI, for example, while the HARQ retransmission timer is running. The second DCI may indicate, for example, a DL grant for a retransmission of the TB. The wireless device may stop monitoring the PDCCH, for example, if the wireless device fails to receive a second DCI before an expiration of the HARQ retransmission timer.

A wireless device may trigger an SR for requesting a UL-SCH resource, for example, if the wireless device has data for a new transmission. A base station may send (e.g., transmit) to a wireless device at least one message comprising parameters indicating zero or one or more SR configurations. An SR configuration may comprise a set of PUCCH resources for sending an SR via one or more BWPs and/or one or more cells. On a BWP, a PUCCH resource for SR may be configured. One or more SR configurations may correspond to one or more logical channels. Each logical channel may be mapped to zero or one SR configuration configured by the at least one message. An SR configuration of a logical channel (LCH) that triggers a buffer status report (BSR) may be considered as a corresponding SR configuration for a triggered SR. Each SR configuration may correspond to one or more logical channels.

For each SR configuration, the at least one message may further comprise one or more parameters indicating at least one of: a SR prohibit timer; a maximum number of SR transmission; a parameter indicating a periodicity and offset of SR transmission; and/or a PUCCH resource. The SR prohibit timer may be associated with a duration during which the wireless device is not allowed to transmit the SR. The maximum quantity (e.g., number) of SR transmission may be a transmission number for which the wireless device is allowed to transmit the SR at most.

A PUCCH resource may be indicated (e.g., identified) by at least: a frequency location (e.g., a starting PRB); a PUCCH format associated with an initial cyclic shift of a base sequence; and a time domain location (e.g., a starting symbol index). A wireless device may maintain an SR transmission counter (e.g., SR_COUNTER) associated with an SR configuration. A wireless device may set the SR_COUNTER of the SR configuration to a first value (e.g., 0), for example, if an SR of an SR configuration is triggered and there are no other SRs pending corresponding to the same SR configuration. If an SR is triggered, a wireless device may consider the SR pending until it is cancelled. All pending SR(s) may be cancelled, for example, if one or more UL grants accommodate all pending data available for transmission.

A wireless device may determine one or more PUCCH resources on an active BWP as valid PUCCH resource(s) at a time of SR transmission occasion. A wireless device may send (e.g., transmit) a PUCCH via a PUCCH resource associated with an SR configuration, for example, if the wireless device transmits a positive SR. A wireless device may send (e.g., transmit) the PUCCH using PUCCH format 0, or PUCCH format 1, according to the PUCCH configuration.

A wireless device may receive one or more RRC messages comprising parameters of one or more SR configurations. For each of the one or more SR configurations, the parameters may indicate at least one of: an SR prohibit timer; a maximum number of SR transmission; a parameter indicating a periodicity and offset of SR transmission; and/or a PUCCH resource identified by a PUCCH resource index. A wireless device may set the SR_COUNTER to a first value (e.g., 0), for example, if there is no other pending SRs corresponding to the SR configuration and if an SR of an SR configuration is triggered and pending. The SR of the SR configuration may be triggered, for example, after or in response to a BSR being triggered on an LCH corresponding to the SR configuration.

A wireless device may determine whether there is at least one valid PUCCH resource for the pending SR, for example, at the time of SR transmission occasion. The wireless device may initiate a random access procedure via a PCell, for example, if there is no valid PUCCH resource for the pending SR. The wireless device may cancel the pending SR, for example, after or in response to determining that there is no valid PUCCH resource for the pending SR.

A wireless device may determine an SR transmission occasion on the at least one valid PUCCH resource based on the periodicity and the offset of SR transmission, for example, if there is at least one valid PUCCH resource for the pending SR. The wireless device may wait for another SR transmission occasion, for example, if the SR prohibit timer is running. The wireless device may increment the SR_COUNTER (e.g., by one), cause (e.g., instruct) the physical layer of the wireless device to signal the SR via the at least one valid PUCCH resource for the SR, for example, if the SR prohibit timer is not running; if the at least one valid PUCCH resource for the SR transmission occasion does not overlap with a measurement gap; if the at least one valid PUCCH resource for the SR transmission occasion does not overlap with an uplink shared channel (UL-SCH) resource; and/or if the SR_COUNTER is less than the maximum number of SR transmission. The physical layer of the wireless device may send (e.g., transmit) a PUCCH via the at least one valid PUCCH resource for the SR. The wireless device may monitor a PDCCH for detecting a DCI for an uplink grant, for example, after or in response to transmitting the PUCCH.

The wireless device may cancel the pending SR and/or stop the SR prohibit timer, for example, if the wireless device receives one or more uplink grants which accommodate all pending data available for transmission. The wireless device may repeat one or more actions, for example, if the wireless device does not receive one or more uplink grants which accommodate all pending data available for transmission. The one or more actions may comprise: determining the at least one valid PUCCH resource; checking whether the SR prohibit timer is running; checking whether the SR_COUNTER is equal or greater than the maximum number of SR transmission; incrementing the SR_COUNTER; transmitting the SR and starting the SR prohibit timer; and/or monitoring a PDCCH for uplink grant. A wireless device may release PUCCH for one or more serving cells, release SRS for the one or more serving cells, clear one or more configured downlink assignments and uplink grants, initiate a random access procedure on a PCell, and/or cancel all the pending SRs, for example, if the SR_COUNTER indicates a number equal to or greater than the maximum number of SR transmission.

A wireless device and/or a base station may trigger a beam failure recovery mechanism. A wireless device may trigger a beam failure recovery (BFR) procedure, for example, if at least a beam failure occurs. A beam failure may occur if a quality of beam pair link(s) of at least one PDCCH falls below a threshold. The threshold may comprise an RSRP value (e.g., −140 dbm, −110 dbm, or any other value) and/or a SINR value (e.g., −3 dB, −1 dB, or any other value), which may be configured in a RRC message.

Figure 22A:
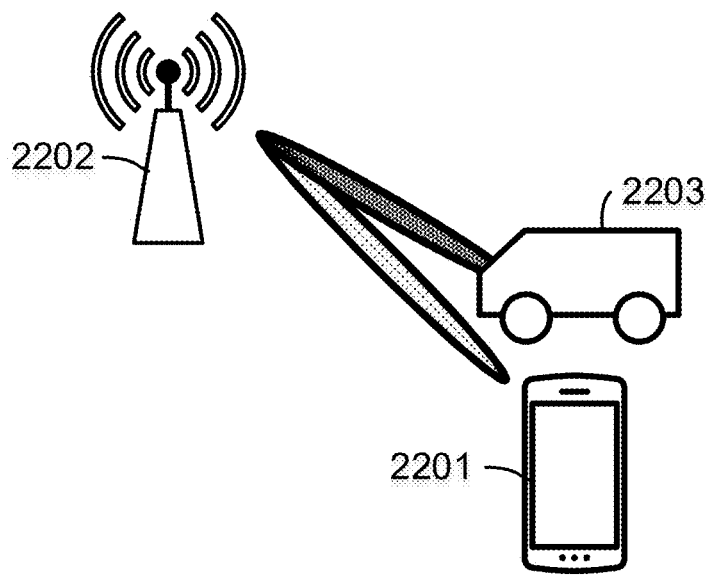
FIG. 22A and FIG. 22B shows examples of beam failure scenarios.

FIG. 22A shows an example of a first beam failure event (e.g., a downlink beam failure event). A base station 2202 may send (e.g., transmit) a PDCCH from a transmission (Tx) beam to a receiving (Rx) beam of a wireless device 2201 from a TRP. The base station 2202 and the wireless device 2201 may start a beam failure recovery procedure on the TRP, for example, if the PDCCH on the beam pair link (e.g., between the Tx beam of the base station 2202 and the Rx beam of the wireless device 2201) have a lower-than-threshold RSRP and/or SINR value due to the beam pair link being blocked (e.g., by a moving vehicle 2203, a building, or any other obstruction).

Figure 22B:
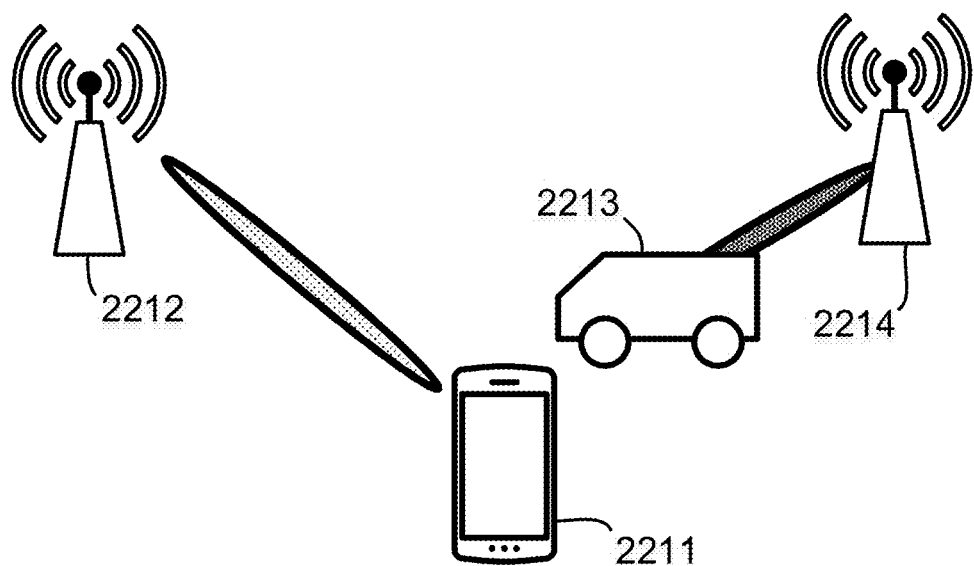

FIG. 22B shows an example of a second beam failure event (e.g., a downlink beam failure event). A base station may send (e.g., transmit) a PDCCH from a beam to a wireless device 2211 from a first TRP 2214. The base station and the wireless device 2211 may start a beam failure recovery procedure on a new beam on a second TRP 2212, for example, if the PDCCH on the beam is blocked (e.g., by a moving vehicle 2213, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if Doppler shift and/or Doppler shift of the channel from a transmission on an RS to a wireless device, and that from a transmission on a PDCCH to the wireless device, are the same.

A base station may send (e.g., transmit) one or more messages comprising configuration parameters of an uplink physical channel, or signal, for transmitting a beam failure recovery request. The uplink physical channel or signal may be based on one of: a contention-free PRACH (BFR-PRACH), which may be a resource orthogonal to resources of other PRACH transmissions; a PUCCH (e.g., BFR-PUCCH); and/or a contention-based PRACH resource (e.g., CF-PRACH).

Combinations of these candidate signals and/or channels may be configured by the base station. A wireless device may autonomously select a first resource for transmitting the BFR signal, for example, if the wireless device is configured with multiple resources for a BFR signal. The wireless device may select a BFR-PRACH resource for transmitting a BFR signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFR signal, for example, if the wireless device is configured with a BFR-PRACH resource, a BFR-PUCCH resource, and/or a CF-PRACH resource.

A wireless device may receive one or more RRC messages that comprise BFR parameters. The one or more RRC messages may comprise one or more of an RRC connection reconfiguration message, an RRC connection reestablishment message, and/or an RRC connection setup message.

The wireless device may detect at least one beam failure according to at least one of BFR parameters and trigger a BFR procedure. The wireless device may start a first timer, if configured, in response to detecting the at least one beam failure. The wireless device may select a beam (e.g., a selected beam) in response to detecting the at least one beam failure. The selected beam may be a beam with good channel quality (e.g., determined based on RSRP, SINR, or BLER, etc.) from a set of candidate beams. The set of candidate beams may be identified by a set of reference signals (e.g., SSBs, or CSI-RSs). The wireless device may transmit at least a first BFR signal to a base station in response to selecting the selected beam. The at least first BFR signal may be associated with the selected beam. The at least first BFR signal may be, for example, a preamble transmitted on a PRACH resource, or a beam failure recovery request (e.g., which may be similar to an SR) signal transmitted on a PUCCH resource, or a beam indication (e.g., BFR MAC CE) transmitted on a PUSCH resource. The wireless device may transmit the at least first BFR signal with a transmission beam corresponding to a receiving beam associated with the selected beam. The wireless device, may, for example, determine transmission beam by using the RF and/or digital beamforming parameters corresponding to the receiving beam. The wireless device may start a response window in response to transmitting the at least first BFR signal. The response window may be tracked using, for example, a timer with a value configured by the base station. The wireless device may monitor a PDCCH in a first CORESET (e.g., wireless device specific or dedicated to the wireless device) while the response window is running. The first CORESET may be associated with the BFR procedure. The wireless device may monitor the PDCCH in the first CORESET in condition of transmitting the at least first BFR signal. The wireless device may receive a first DCI via the PDCCH in the first CORESET while the response window is running. The wireless device may consider the BFR procedure successfully completed if the wireless device receives the first DCI via the PDCCH in the first CORESET before the response window expires. The wireless device may stop the first timer, if configured, if the BFR procedure is successfully completed.

Figure 23:
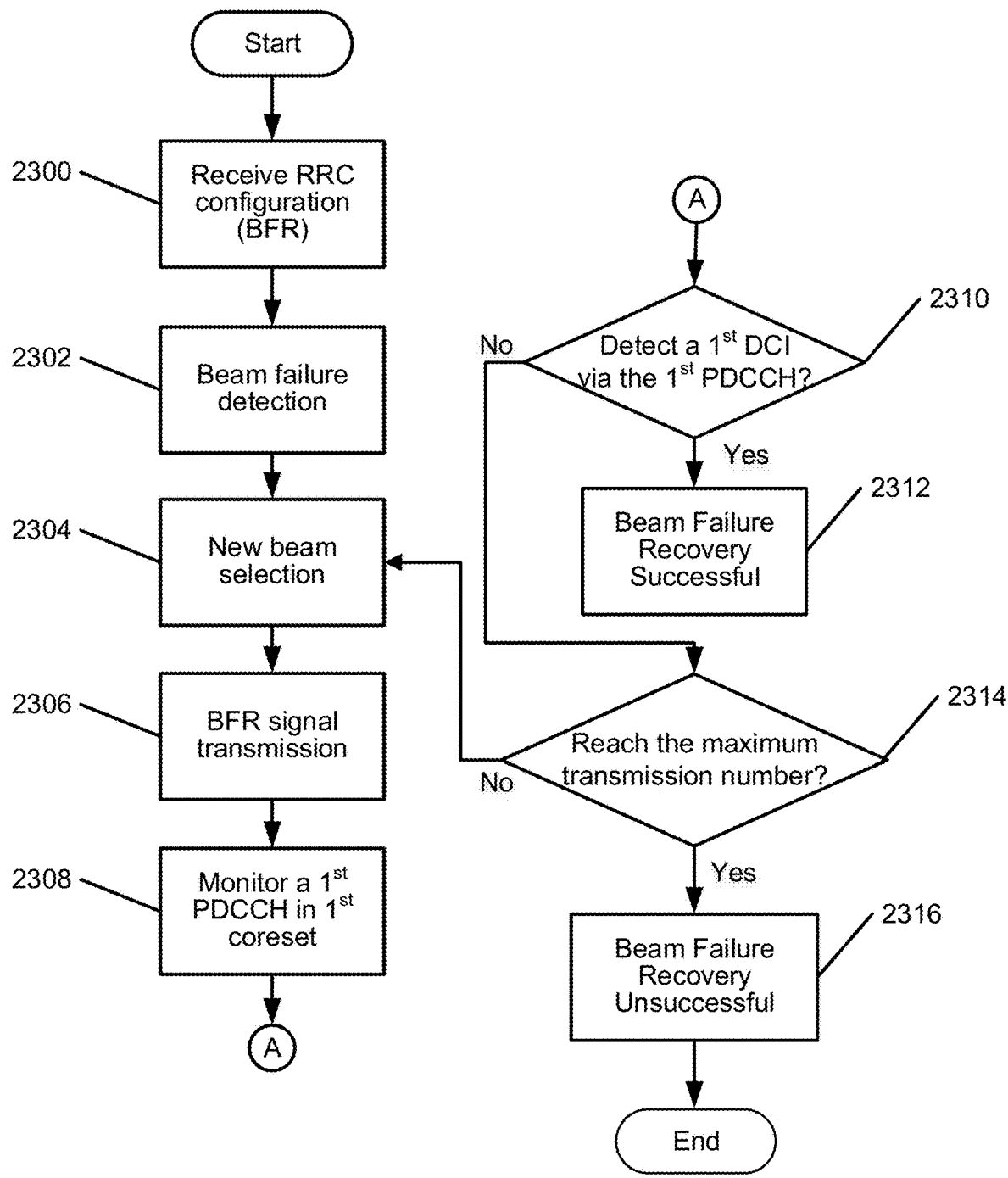
FIG. 23 shows an example of a beam failure recovery (BFR) procedure.

FIG. 23 shows an example of a BFR procedure (e.g., a downlink BFR procedure of a primary cell). In some communication systems, a wireless device may stop a BWP inactivity timer if a random access procedure is initiated, and/or the wireless device may restart the BWP inactivity timer if the random access procedure is successfully completed (e.g., based on or in response to receiving DCI addressed to a C-RNTI of the wireless device). At step 2300, a wireless device may receive one or more RRC messages comprising BFR parameters. At step 2302, the wireless device may detect at least one beam failure according to at least one BFR parameter. The wireless device may start a first timer, if configured, based on detecting the at least one beam failure. At step 2304, the wireless device may select a beam (e.g., a selected beam) based on detecting the at least one beam failure. The selected beam may be a beam with good channel quality (e.g., based on RSRP, SINR, and/or BLER) that may be selected from a set of candidate beams. The candidate beams may be indicated by a set of reference signals (e.g., SSBs, or CSI-RSs). At step 2306, the wireless device may send (e.g., transmit) at least a first BFR signal to a base station, for example, based on selecting the beam (e.g., selected beam). The at least first BFR signal may be associated with the selected beam. The wireless device may send (e.g., transmit) the at least first BFR signal with a transmission beam corresponding to a receiving beam associated with the selected beam. The at least first BFR signal may be a preamble sent (e.g., transmitted) via a PRACH resource, an SR signal sent (e.g., transmitted) via a PUCCH resource, a beam failure recovery signal sent (e.g., transmitted) via a PUCCH resource, and/or a beam report sent (e.g., transmitted) via a PUCCH and/or PUSCH resource. At step 2308, the wireless device may start a response window, for example, based on sending (e.g., transmitting) the at least first BFR signal. The response window may be associated with a timer with a value configured by the base station. The wireless device may monitor a PDCCH in a first CORESET, for example, if the response window is running. The first CORESET may be configured by the BFR parameters (e.g., RRC). The first CORESET may be associated with the BFR procedure. The wireless device may monitor the PDCCH in the first CORESET in condition of transmitting the at least first BFR signal.

At step 2310, the wireless device may detect (e.g., receive) a first DCI via the PDCCH in the first CORESET, for example, if the response window is running. At step 2312, the wireless device may determine that the BFR procedure has successfully completed, for example, if the wireless device receives the first DCI via the PDCCH in the first CORESET before the response window expires. The wireless device may stop the first timer, if configured, based on the BFR procedure successfully being completed. The wireless device may stop the response window, for example, based on the BFR procedure successfully being completed. If the response window expires, and the wireless device does not receive the DCI (e.g., at step 2310), the wireless device may, at step 2314, increment a transmission number. The transmission number may be initialized to a first number (e.g., 0) before the BFR procedure is triggered. At step 2314, if the transmission number indicates a number less than the configured maximum transmission number, the wireless device may repeat one or more actions (e.g., at step 2304). The one or more actions to be repeated may comprise at least one of a BFR signal transmission, starting the response window, monitoring the PDCCH, and/or incrementing the transmission number, for example, if no response received during the response window is running. At step 2316, if the transmission number indicates a number equal or greater than the configured maximum transmission number, the wireless device may declare the BFR procedure is unsuccessfully completed.

A MAC entity of a wireless device may be configured by an RRC message, for example, for a beam failure recovery procedure. The beam failure recovery procedure may be used for indicating to a serving base station of a new (e.g., candidate) synchronization signal block (SSB) and/or CSI-RS, for example, if a beam failure is detected. The beam failure may be detected on one or more serving SSB(s) and/or CSI-RS(s) of the serving base station. The beam failure may be detected by counting a beam failure instance indication from a lower layer of the wireless device (e.g., PHY layer) to the MAC entity.

An RRC message may configure a wireless device with one or more parameters (e.g., in BeamFailureRecoveryConfig) for a beam failure detection and recovery procedure. The one or more parameters may comprise one or more of: beamFailureInstanceMaxCount for a beam failure detection, beamFailureDetectionTimer for the beam failure detection, beamFailureRecoveryTimer for a beam failure recovery procedure, rsrp-ThresholdSSB, an RSRP threshold for a beam failure recovery, PowerRampingStep for the beam failure recovery, preambleReceivedTargetPower for the beam failure recovery, preambleTxMax for the beam failure recovery, and/or ra-ResponseWindow. The ra-ResponseWindow may be a time window to monitor one or more responses for the beam failure recovery using a contention-free RA preamble.

Figure 24:
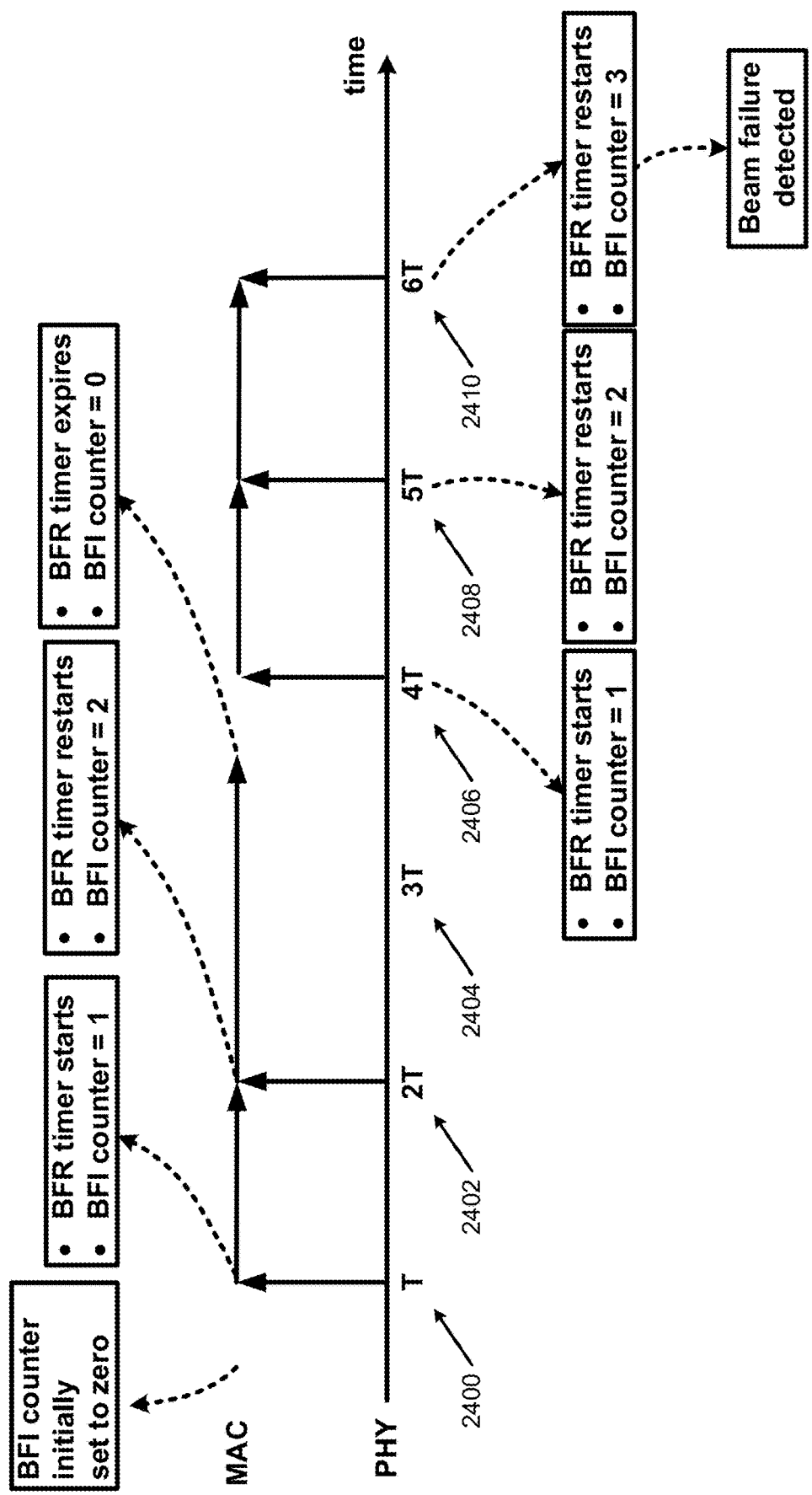
FIG. 24 shows an example of a beam failure instance indication.

FIG. 24 shows an example of beam failure instance (BFI) indication (e.g., a downlink BFI indication). A wireless device may use at least one wireless device variable for a beam failure detection. A BFI counter (e.g., BFI_COUNTER) may be one of the at least one wireless device variable. The BFI counter may be a counter for a beam failure instance indication. The BFI counter may be initially set to zero before time T 2400. The wireless device may start or restart a beam failure detection timer (e.g., beamFailureDetectionTimer) at time T 2400 and increment the BFI counter, for example, based on a MAC entity of a wireless device receiving a beam failure instance indication from a lower layer (e.g., PHY) of the wireless device. The wireless device may increment the BFI counter, for example, in addition to starting or restarting the beam failure detection timer (e.g., BFR timer in FIG. 24 at time T 2400, 2T 2402, 4T 2406, 5T 2408, 6T 2410, etc.). The wireless device may initiate a random access procedure such as for a beam failure recovery (e.g., on an SpCell) based on the BFI counter being greater than or equal to a value such as beamFailureInstanceMaxCount (e.g., at time T 2400, 2T 2402, 5T 2408 in FIG. 24), for example, if an active UL BWP is configured with BeamFailureRecoveryConfig. The wireless device may start a beam failure recovery timer (e.g., beamFailureRecoveryTimer, if configured), for example, based on the active UL BWP being configured with a beam failure recovery configuration (e.g., BeamFailureRecoveryConfig). The wireless device may start the beam failure recovery timer, for example, based on or in response to a BFI counter (e.g., BFI_COUNTER) being equal to or greater than a value such as beamFailureInstanceMaxCount. The wireless device may use the one or more parameters in the beam failure recover configuration (e.g., powerRampingStep, preambleReceivedTargetPower, and/or preambleTransMax), for example, based on or in response to the initiating the random access procedure. The wireless device may set the BFI counter to zero, for example, based on the beam failure detection timer expiring. The wireless device may determine that the beam failure recovery procedure has successfully completed, for example, based on the random access procedure being successfully completed. The random access procedure may be a contention-free random access procedure.

A wireless device may initiate a random access procedure (e.g., on an SpCell) for a beam failure recovery, for example, based on or in response to a BFI counter (e.g., BFI_COUNTER) being greater than or equal to a value such as beamFailureInstanceMaxCount and if the active UL BWP is not configured with BeamFailureRecoveryConfig. The random access procedure may be a contention-based random access procedure.

A wireless device may initiate a random access procedure at time 6T 2410, for example, if a first number (e.g., 3) is reached. The wireless device may set the BFI counter to zero (e.g., in FIG. 24, between time 3T 2404 and 4T 2406), for example, based on the beam failure detection timer (e.g., beamFailureDetectionTimer) expiring. The wireless device may set the BFI_COUNTER to zero, for example, based on the beamFailureDetectionTimer, the BFI_COUNTER, or any of the reference signals used for beam failure detection (e.g., RadioLinkMonitoring RS) being reconfigured by higher layers (e.g., RRC). The wireless device may determine that the beam failure recovery procedure has successfully completed, for example, based on the random access procedure (e.g., a contention-free random access or a contention-based random access) being successfully completed. The wireless device may stop the beam failure recovery timer (if configured), for example, based on the random access procedure (e.g., a contention-free random access) is successfully completed. The wireless device may reset the BFI_COUNTER to zero, for example, based on the random access procedure (e.g., contention-free random access) is successfully completed.

A MAC entity may start ra-ResponseWindow at a first PDCCH occasion from the end of the transmitting the contention-free random access preamble, for example, if a MAC entity of a wireless device sends (e.g., transmits) a contention-free random access preamble for a BFR procedure. The ra-ResponseWindow may be configured in BeamFailureRecoveryConfig. The wireless device may monitor at least one PDCCH (e.g., of an SpCell) for a response to the beam failure recovery request, for example, if the ra-ResponseWindow is running. The beam failure recovery request may be identified by a C-RNTI. The wireless device may determine that a random access procedure has successfully completed, for example, if a MAC entity of a wireless device receives, from a lower layer of the wireless device, a notification of a reception of at least one PDCCH transmission, and if the at least one PDCCH transmission is addressed to a C-RNTI, and/or if a contention-free random access preamble for a beam failure recovery request is transmitted by the MAC entity. The wireless device may determine that the beam failure recovery has successfully completed, for example, if a random access procedure of a beam failure recovery is successfully completed.

A wireless device may be configured (e.g., for a serving cell, a primary cell, and/or a secondary cell) with a first set of periodic CSI-RS resource configuration indexes by a higher layer parameter (e.g., Beam-Failure-Detection-RS-ResourceConfig, failureDetectionResources, etc.). The higher layer parameter Beam-Failure-Detection-RS-ResourceConfig may be configured on a downlink BWP (of the configured downlink BWPs) of the serving cell. The wireless device may be configured with a second set of CSI-RS resource configuration indexes and/or SS/PBCH block indexes by a higher layer parameter (e.g., Candidate-Beam-RS-List, candidateBeamRSList, etc.). The higher layer parameter Candidate-Beam-RS-List may be configured on an uplink BWP (of the configured uplink BWPs) of the serving cell. The first set of CSI-RS resource configuration indexes and/or SS/PBCH block indexes and/or the second set of CSI-RS resource configuration indexes and/or SS/PBCH block indexes may be used for radio link quality measurements on the serving cell. The wireless device may determine a first set to include SS/PBCH block indexes and/or periodic CSI-RS resource configuration indexes, for example, if a wireless device is not provided with higher layer parameter Beam-Failure-Detection-RS-ResourceConfig. The SS/PBCH block indexes and the periodic CSI-RS resource configuration indexes may comprise the same values as one or more RS indexes in one or more RS sets. The one or more RS indexes in the one or more RS sets may be indicated by one or more TCI states (e.g., via a higher layer parameter TCI-States). The one or more TCI states may be used for respective CORESETs for which the wireless device may be configured to monitor a PDCCH. The wireless device may expect the first set to include up to two RS indexes. The first set may include one or more RS indexes with QCL-TypeD configuration for the TCI state, for example, if there are two RS indexes in a TCI state. The wireless device may expect a single port RS in the first set.

A first threshold (e.g., Qout,LR) may correspond to a first default value of a first higher layer parameter (e.g., RLM-IS-OOS-thresholdConfig, rlmInSyncOutOfSyncThreshold, etc.). A second threshold (e.g., Qin,LR) may correspond to a second default value of a higher layer parameter (e.g., Beam-failure-candidate-beam-threshold, rsrp-Threshold-SSB, etc.). A physical layer in the wireless device may determine (or assess) a first radio link quality based on the first threshold. The wireless device may determine (or assess) the first radio link quality based on periodic CSI-RS resource configurations or SS/PBCH blocks. The periodic CSI-RS resource configurations and/or the SS/PBCH blocks may be associated (e.g., quasi co-located) with at least one DM-RS of a PDCCH that may be monitored by the wireless device. The wireless device may apply the second threshold to a first L1-RSRP measurement that may be obtained from one or more SS/PBCH blocks. The wireless device may apply the second threshold to a second L1-RSRP measurement that may be obtained from one or more periodic CSI-RS resources, for example after scaling a respective CSI-RS reception power with a value provided by a higher layer parameter (e.g., Pc_SS, powerControlOffsetSS, etc.).

A wireless device may assess the first radio link quality of a first set (e.g., of resources). A physical layer in the wireless device may provide an indication to higher layers (e.g., MAC), for example, if the first radio link quality for all corresponding resource configurations in the first set is less than the first threshold. The physical layer may inform the higher layers (e.g., MAC, RRC), for example, if the first radio link quality is less than the first threshold with a first periodicity. The first periodicity may be determined by the maximum of the shortest periodicity of periodic CSI-RS configurations or SS/PBCH blocks in the first set and a time value (e.g., 2 ms or any other duration). The wireless device may access the periodic CSI-RS configurations or the SS/PBCH blocks for the first radio link quality. Based on a request from higher layers (e.g., MAC layer), a wireless device may provide to higher layers the periodic CSI-RS configuration indexes and/or the SS/PBCH block indexes from the second set. The wireless device may provide, to higher layers, corresponding L1-RSRP measurements that may be greater than or equal to the second threshold.

A wireless device may be configured with one CORESET, for example, by a higher layer parameter (e.g., Beam-failure-Recovery-Response-CORESET) and/or via a link to a search space set (e.g., the CORESET may be wireless device specific or dedicated to the wireless device). The wireless device may be configured with an associated search space that may be provided by a higher layer parameter (e.g., search-space-config, recoverySearchSpaceId, etc.). The search space may be used for monitoring a PDCCH in the control resource set. The wireless device may not expect to be provided with a second search space set for monitoring PDCCH in the CORESET, for example, if the wireless device is provided by a higher layer parameter (e.g., recoverySearchSpaceId). The CORESET may be associated with the search space set provided by a higher layer parameter (e.g., recoverySearchSpaceId). The wireless device may receive from higher layers (e.g., MAC layer), by a parameter (e.g., PRACH-ResourceDedicatedBFR), a configuration for a PRACH transmission. For the PRACH transmission in slot n and based on antenna port quasi co-location parameters associated with periodic CSI-RS resource configuration or with SS/PBCH block associated with a first RS index provided by higher layers, the wireless device may monitor the PDCCH in a search space set (e.g., which may be provided by a higher layer parameter such as recoverySearchSpaceId) for detection of a DCI format starting from a slot (e.g., slot n+4) within a window. The window may be configured by a higher layer parameter (e.g., Beam-failure-recovery-request-window, BeamFailureRecoveryConfig, etc.). The DCI format may be CRC scrambled by a C-RNTI or MCS-C-RNTI. The first RS index may be provided by the higher layers. For a PDCCH monitoring and for a corresponding PDSCH reception, the wireless device may use the same antenna port quasi-collocation parameters associated with the first RS index (e.g., as for monitoring the PDCCH) until the wireless device receives, by higher layers, an activation for a TCI state or a parameter (e.g., any of parameters TCI-StatesPDCCH-ToAddlist, TCI-StatesPDCCH-ToReleaseList).

A wireless device may monitor downlink and/or control channel resources (e.g., PDCCH) candidates in a search space set. The wireless device may monitor the downlink and/or control channel resources (e.g., PDCCH) candidates in the search space set, for example, at least until the wireless device receives a MAC CE activation command for a TCI state or a higher layer parameter (e.g., TCI-StatesPDCCH-ToAddlist and/or TCI-StatesPDCCH-ToReleaseList), for example, after the wireless device detects the DCI format with CRC scrambled by the C-RNTI or the MCS-C-RNTI in the search space set (e.g., which may be by the higher layer parameter recoverySearchSpaceId). The wireless device may not initiate and/or perform a contention free random access procedure for a beam failure recovery, for example, based on or in response to not being provided with the higher layer parameter (e.g., recoverySearchSpaceId). A wireless device may initiate and/or perform a contention-based random access procedure for a beam failure recovery, for example, based on or in response to not being provided with the higher layer parameter (e.g., recoverySearchSpaceId).

A base station may configure a wireless device with uplink (UL) bandwidth parts (BWPs) and downlink (DL) BWPs, for example, to enable bandwidth adaptation (BA) for a PCell. The base station may configure the wireless device with at least DL BWP(s) (e.g., an SCell may not have UL BWPS) to enable BA for an SCell, for example, if CA is configured. For the PCell, a first initial BWP may be a first BWP used for initial access. For the SCell, a second initial BWP may be a second BWP configured for the wireless device to first operate on the SCell if the SCell is activated.

A wireless device may switch a first (e.g., active) DL BWP and a first (e.g., active) UL BWP independently, for example, in paired spectrum (e.g., FDD). A wireless device may switch a second (e.g., active) DL BWP and a second (e.g., active) UL BWP simultaneously, for example, in unpaired spectrum (e.g., TDD). Switching between configured BWPs may be based on DCI and/or an inactivity timer. An expiry of the inactivity timer associated with a cell may switch an active BWP to a default BWP, for example, if the inactivity timer is configured for a serving cell. The default BWP may be configured by the network.

One UL BWP for each uplink carrier and one DL BWP may be active at a time in an active serving cell, for example, in FDD systems configured with BA. One DL/UL BWP pair may be active at a time in an active serving cell, for example, in TDD systems. Operating on the one UL BWP and the one DL BWP (and/or the one DL/UL pair) may enable a wireless device to use a reasonable amount of power (e.g., reasonable battery consumption). BWPs other than the one UL BWP and the one DL BWP that the wireless device may be configured with may be deactivated. The wireless device may refrain from monitoring a PDCCH, and/or may refrain from transmitting via a PUCCH, PRACH and/or UL-SCH, for example, on deactivated BWPs.

A serving cell may be configured with a first number (e.g., four) of BWPs. A wireless device and/or a base station may have one active BWP at any point in time, for example, for an activated serving cell (e.g., PCell, SCell). A BWP switching for a serving cell may be used to activate an inactive BWP and/or deactivate an active BWP. The BWP switching may be controlled by a PDCCH indicating a downlink assignment or an uplink grant. The BWP switching may be controlled by an inactivity timer (e.g., bwpInactivityTimer). The BWP switching may be controlled by an RRC signaling. The BWP switching may be controlled by a MAC entity, for example, based on initiating a random access procedure. A DL BWP may be paired with an UL BWP, and/or BWP switching may be common for both UL and DL, for example, for unpaired spectrum (e.g., TDD).

The base station and/or the wireless device (e.g., a MAC entity of a base station and/or a wireless device) may start or restart the BWP inactivity timer (e.g., BWP-InactivityTimer) associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and an active DL BWP is not the initial DL BWP; and/or if one or more of the following occur: if a MAC-PDU is transmitted in a configured uplink grant or received in a configured downlink assignment, and/or if there is not an ongoing random access procedure associated with the activated serving cell.

The base station and/or the wireless device (e.g., a MAC entity of a base station and/or a wireless device) may stop the BWP inactivity timer (e.g., BWP-InactivityTimer) associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated on the activated serving cell. The MAC entity may stop a second BWP inactivity timer (e.g., BWP-InactivityTimer) associated with a second active DL BWP of an SpCell, for example, if the activated Serving Cell is an SCell (other than a PSCell).

The base station and/or the wireless device (e.g., a MAC entity of a base station and/or a wireless device) may perform BWP switching to a BWP indicated by the Default-DL-BWP, for example, if one or more of the following occur: if a BWP inactivity timer (e.g., BWP-InactivityTimer) is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be provided by a higher layer parameter (e.g., BWP-InactivityTimer). The higher layer parameter may indicate a timer with a timer value for a serving cell (e.g., primary cell, secondary cell). The wireless device may increment the timer every interval (e.g., every interval of 1 millisecond for frequency range 1, every 0.5 milliseconds for frequency range 2, or any other interval for any other frequency range), for example, based on the timer being configured, the timer running, and/or the wireless device not detecting a DCI format for PDSCH reception on the serving cell for paired spectrum operation. The wireless device may decrement the timer every interval (e.g., every interval of 1 millisecond for frequency range 1, every 0.5 milliseconds for frequency range 2, or any other interval for any other frequency range), for example, based on the timer being configured, the timer running, the wireless device not detecting a first DCI format for PDSCH reception and/or the wireless device not detecting a second DCI format for PUSCH transmission on the serving cell for unpaired spectrum operation during the interval.

A base station may configure a wireless device with one or more UL BWPs and one or more DL BWPs of a cell (e.g., PCell or SCell). A first UL BWP of the one or more UL BWPs may be indicated (e.g., identified) by a first UL BWP index. A first DL BWP of the one or more DL BWPs may be indicated (e.g., identified) by a first DL BWP index. The wireless device may operate on the first DL BWP and the first UL BWP. The first DL BWP may be an active downlink BWP. The first UL BWP may be an active uplink BWP.

The wireless device may switch the first DL BWP and the first UL BWP independently, for example, in a paired spectrum (e.g., FDD). The first UL BWP index and the first DL BWP index may be different.

The wireless device may switch the first DL BWP and the first UL BWP simultaneously (e.g., together), for example, in an unpaired spectrum (e.g., TDD). The first DL BWP index and the first UL BWP index may be the same, for example, in an unpaired spectrum (e.g., TDD). The first UL BWP and the first DL BWP may be linked (or paired), for example, after or in response to the switching the first DL BWP and the first UL BWP simultaneously.

Figure 25:
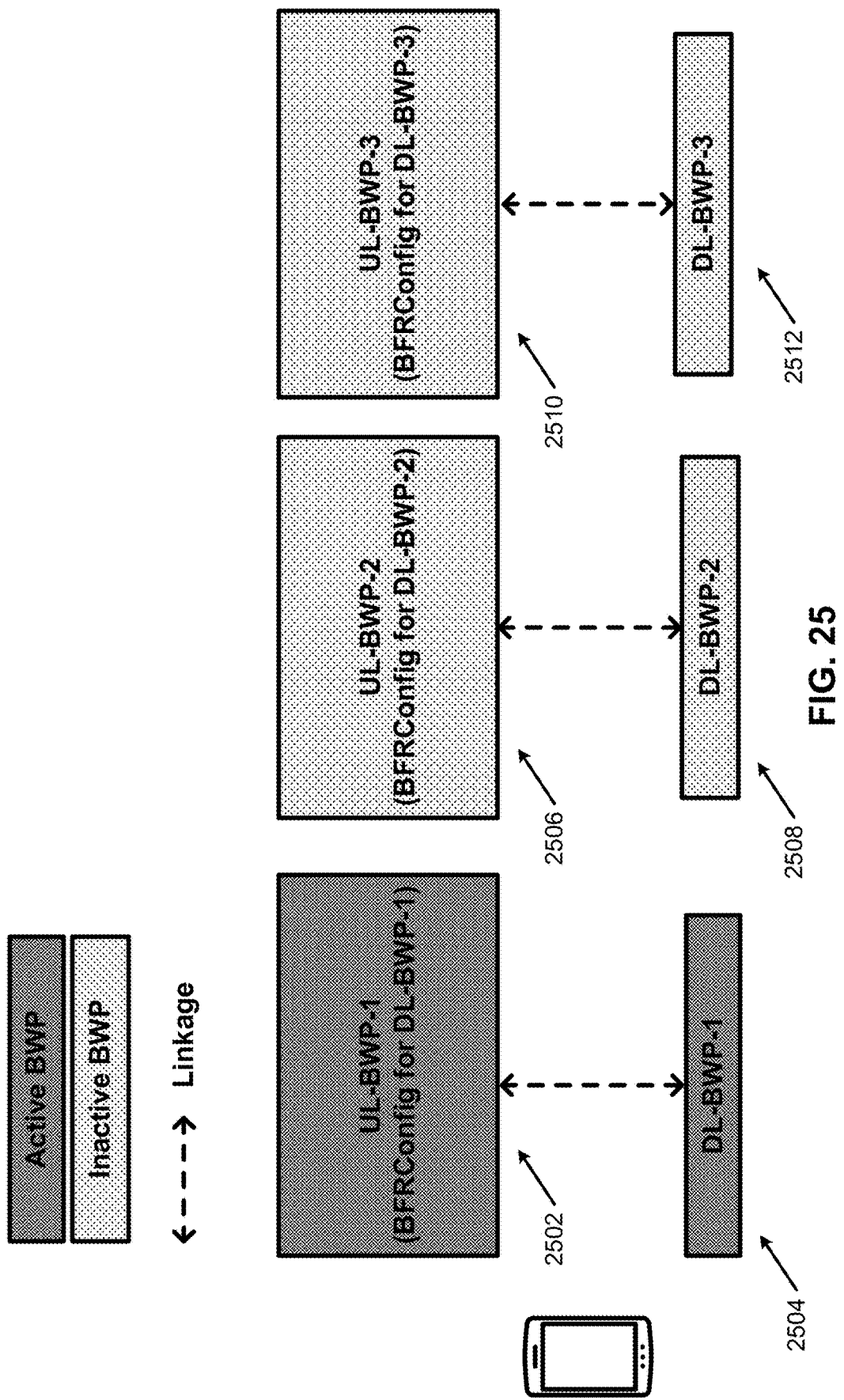
FIG. 25 shows an example of a BWP linkage in a beam failure recovery procedure.

FIG. 25 shows an example of a BWP linkage in a paired spectrum (e.g., FDD) for a beam failure recovery (BFR) procedure. The base station may configure the wireless device to use or make active an UL BWP (e.g., UL-BWP-1 2502) linked with a DL BWP (e.g., DL-BWP-1 2504). The wireless device may avoid a delay from BWP switching, for example, if the wireless device determines to perform a BFR procedure and/or a random access procedure.

A wireless device may receive one or more messages comprising configuration parameters of a cell from a base station. The configuration parameters may comprise BWP configuration parameters for a plurality of DL BWPs, for example, comprising DL-BWP-1 2504, DL-BWP-2 2508 and DL-BWP-3 2512 and for a plurality of UL BWPs comprising UL-BWP-1 2502, UL-BWP-2 2506 and UL-BWP-3 2510. UL-BWP-1 2502 and DL-BWP-1 2504 may be linked. UL-BWP-2 2506 and DL-BWP-2 2508 may be linked. UL-BWP-3 2510 and DL-BWP-3 2512 may be linked. The BWP configuration parameters may include an index of an uplink BWP and an index of a downlink BWP, which may or may not be linked and may or may not have different indexes.

The DL-BWP-1 2504, the DL-BWP-2 2508, and the DL-BWP-3 2512 may be indicated by a DL-BWP-1 index, DL-BWP-2 index, and DL-BWP-3 index (e.g., provided by a higher layer parameter BWP-ID), respectively. The UL-BWP-1 2502, the UL-BWP-2 2508, and the UL-BWP-3 2512 may be indicated by a UL-BWP-1 index, UL-BWP-2 index, and UL-BWP-3 index (e.g., provided by a higher layer parameter BWP-ID), respectively. The DL-BWP-1 index and the UL-BWP-1 index may be the same. The DL-BWP-2 index and the UL-BWP-2 index may be the same. The DL-BWP-3 index and the UL-BWP-3 index may be the same. The DL-BWP-1 index and the UL-BWP-1 index being the same may be an indicator of linked uplink and downlink BWPs.

The configuration parameters may comprise DL-BWP-specific BFR configuration parameters (e.g., RadioLinkMonitoringConfig) for at least one of the plurality of DL BWPs (e.g., DL-BWP-1 2504, DL-BWP-2 2508, DL-BWP-3 2512). The DL-BWP-specific BFR configuration parameters may be BWP specific. The DL-BWP-specific BFR configuration parameters may be BWP dedicated.

First DL-BWP-specific BFR configuration parameters for the DL-BWP-1 2504 may comprise one or more first RSs (e.g., RadioLinkMonitoringRS) of the DL-BWP-1 2504 and a first beam failure instance (BFI) counter (e.g., beamFailureInstanceMaxCount). The wireless device may assess the one or more first RSs (e.g., SSBs, CSI-RSs) to detect a beam failure of the DL-BWP-1 2504.

Second DL-BWP-specific BFR configuration parameters for the DL-BWP-2 2508 may comprise one or more second RSs (e.g., RadioLinkMonitoringRS) of the DL-BWP-2 2508 and a second BFI counter (e.g., beamFailureInstanceMaxCount). The wireless device may assess the one or more second RSs (e.g., SSBs, CSI-RSs) to detect a beam failure of the DL-BWP-2 2508.

Third DL-BWP-specific BFR configuration parameters for the DL-BWP-3 2512 may comprise one or more third RSs (e.g., RadioLinkMonitoringRS) of the DL-BWP-3 2512 and a second BFI counter (e.g., beamFailureInstanceMaxCount). The wireless device may assess the one or more third RSs (e.g., SSBs, CSI-RSs) to detect a beam failure of the DL-BWP-3 2512.

The configuration parameters may comprise UL-BWP-specific BFR configuration parameters (e.g., BeamFailureRecoveryConfig) for at least one of the plurality of UL BWPs (e.g., UL-BWP-1 2502, UL-BWP-2 2506, UL-BWP-3 2510). The UL-BWP-specific BFR configuration parameters may be BWP specific. The UL-BWP-specific BFR configuration parameters may be BWP dedicated.

First UL-BWP-specific BFR configuration parameters for the UL-BWP-1 2502 may comprise one or more first candidate RSs (e.g., candidateBeamRSList) of the DL-BWP-1 2502 and a first search space set (e.g., recoverySearchSpaceID) on the DL-BWP-1 2502 in response to the DL-BWP-1 index and the UL-BWP-1 index being the same. A second UL-BWP-specific BFR configuration parameters for the UL-BWP-2 2506 may comprise one or more second candidate RSs (e.g., candidateBeamRSList) of the DL-BWP-2 2506 and a second search space set on the DL-BWP-2 2506 in response to the DL-BWP-2 index and the UL-BWP-2 index being the same.

A third UL-BWP-specific BFR configuration parameters for the UL-BWP-3 2510 may comprise one or more third candidate RSs (e.g., candidateBeamRSList) of the DL-BWP-3 2510 and a second search space set on the DL-BWP-3 2510 in response to the DL-BWP-3 index and the UL-BWP-3 index being the same.

The UL-BWP-1 2502 and the DL-BWP-1 2504 may be linked/paired, for example, in a paired spectrum (e.g., FDD) and in response to the UL-BWP-1 2502 being configured with BFR parameters (e.g., the one or more first candidate RSs, the first search space set) of the DL-BWP-1 2504. The DL-BWP-1 index and the UL-BWP-1 index may be the same, for example, based on the DL-BWP-1 2504 and the UL-BWP-1 2502 being linked.

BWP switching may be common for the DL-BWP-1 and the UL-BWP-1, for example, based on the DL-BWP-1 and the UL-BWP-1 being linked. The wireless device may switch the DL-BWP-1 and the UL-BWP-1 simultaneously, in succession, in response to or based on the DL-BWP-1 2504 being linked/paired with the UL-BWP-1 2502. In FIG. 25, the DL-BWP-2 2508 and the UL-BWP-2 2506 may be linked/paired and the DL-BWP-3 2512 and the UL-BWP-3 2510 may be linked/paired.

One or more linked BWPs may comprise a first pair of the DL-BWP-1 2504 and the UL-BWP-1 2502; a second pair of the DL-BWP-2 2508 and the UL-BWP-2 2506; and a third pair of the DL-BWP-3 2512 and the UL-BWP-3 2510. The wireless device may operate on at least one of the one or more linked BWPs (e.g., DL-BWP-1 2504 and UL-BWP-1 2502, DL-BWP-2 2508 and UL-BWP-2 2506, or DL-BWP-3 2512 and UL-BWP-3 2510 in FIG. 25) simultaneously. The DL-BWP-1 2504 and the UL-BWP-1 2502 may be active, for example, at a first time (e.g., slot, subframe, frame) based on the DL-BWP-1 2504 being linked/paired with the UL-BWP-1 2502. The DL-BWP-2 2508 and the UL-BWP-2 2506 may be active, for example, at a second time based on the DL-BWP-2 2508 being linked/paired with the UL-BWP-2 2506. The DL-BWP-3 2512 and the UL-BWP-3 2510 may be active, for example, at a third time based on the DL-BWP-3 2512 being linked/paired with the UL-BWP-3 2510.

The DL-BWP-1 2504 and the UL-BWP-2 2506 may not be active, for example, at a first time (e.g., slot) based on the DL-BWP-1 2504 not being linked/paired with the UL-BWP-2 2506. The DL-BWP-2 2508 and the UL-BWP-1 2502 may not be active, for example, at a first time (e.g., slot) based on the DL-BWP-2 2508 not being linked/paired with the UL-BWP-1 2502.

The wireless device may operate on the DL-BWP-1 2504 and the UL-BWP-1 2502 simultaneously. The DL-BWP-1 2504 and the UL-BWP-1 2502 may be an active DL BWP and an active UL BWP, respectively, in response to the operating. The wireless device may switch the active UL BWP from the UL-BWP-1 2502 to the UL-BWP-2 2506, for example, in response to the DL-BWP-2 2508 being linked to the UL-BWP-2 2506 (e.g., based on the wireless device switching the active DL BWP from the DL-BWP-1 2504 to the DL-BWP-2 2508). The switching may be triggered, for example, in response to receiving a DCI indicating an index for the DL-BWP-2 2508, an expiry of BWP inactivity timer associated with the DL-BWP-1 2504, or receiving an RRC message indicating the index for DL-BWP-2 2508.

The wireless device may operate on the DL-BWP-1 2504 and the UL-BWP-1 2502 simultaneously. The DL-BWP-1 2504 and the UL-BWP-1 2502 may be an active DL BWP and an active UL BWP, respectively, in response to the operating. The wireless device may switch the active DL BWP from the DL-BWP-1 2504 to the DL-BWP-2 2508, for example, in response to the DL-BWP-2 2508 being linked to the UL-BWP-2 2506 (e.g., based on the wireless device switching the active UL BWP from the UL-BWP-1 2502 to the UL-BWP-2 2506). The switching may be triggered, for example, in response to receiving a DCI indicating an index for UL-BWP-2 2506 or receiving an RRC message indicating the index for UL-BWP-2 2506.

A wireless device may perform a BFR procedure on/for an SpCell (e.g., PCell or PSCell), for example, in at least some beam failure recovery (BFR) procedures. A base station may send (e.g., transmit), to a wireless device, one or more messages comprising configuration parameters of one or more cells. The one or more cells may comprise at least one PCell/PSCell and one or more SCells. An SpCell (e.g., PCell or PSCell) and one or more SCells may operate on different frequencies and/or different bands.

An SCell of the one or more SCells may support a multi-beam operation. A wireless device may perform one or more beam management procedures (e.g., a BFR procedure) on/for the SCell, for example, in the multi-beam operation. The wireless device may perform a BFR procedure for the SCell, for example, if at least one of one or more beam pair links between the SCell and the wireless device fails. Existing BFR procedures may result in inefficiencies, for example, if there is a beam failure for the SCell. At least some BFR procedures may be inefficient, for example, by causing a delay (e.g., take a long time in performing a BFR procedure for an SCell) or an increased battery power consumption.

BFR procedures may be improved to increase downlink radio efficiency and reduce uplink signaling overhead, for example, if there is a beam failure for one or more SCells. Downlink signaling processes may be enhanced for recovery of a beam failure for an SCell. Uplink signaling processes may be enhanced for a BFR procedure of the SCell.

Enhanced BFR procedures for an SCell may be implemented for a wireless device and/or a base station. A duration of the BFR procedure, and/or battery power consumption, may be reduced by the enhanced BFR procedures described herein.

A wireless device may be configured with an SCell (e.g., configured by a base station). The SCell may comprise an uplink resource (not shown) paired with a downlink resource. The SCell may not have uplink resources. The SCell may comprise downlink-only resources. The wireless device may not transmit an uplink signal (e.g., preamble) on the SCell for a BFR procedure of the SCell, for example, if the wireless device detects a beam failure on the SCell and the SCell does not have uplink resources. The wireless device may not perform a BFR procedure on the SCell. The base station may not be aware of the beam failure on the SCell, for example, if the wireless device does not perform the BFR procedure on the SCell. BFR procedures may be enhanced, for example, if an SCell comprises downlink-only resources.

An SCell may operate in a high frequency (e.g. 23 GHz, 60 GHz, 70 GHz, or any other frequency). An SpCell may operate in a low frequency (e.g. 2.4 GHz, 5 GHz, or any other frequency). The channel condition of the SCell may be different from the channel condition of the SpCell. The wireless device may use uplink resources of the SpCell to transmit a preamble for a beam failure recovery request for the SCell, for example, which may improve robustness of transmission of the preamble. Robustness of a transmission may refer to the likelihood at which a receiver may receive the transmission without errors. BFR procedures may be enhanced, for example, if an SCell operates in a frequency different from a frequency for the PCell. A BFR procedure of an SCell may be enhanced by using uplink resources (e.g., random access resources, uplink BWPs) of a PCell for the BFR procedure of the SCell.

Figure 26A:
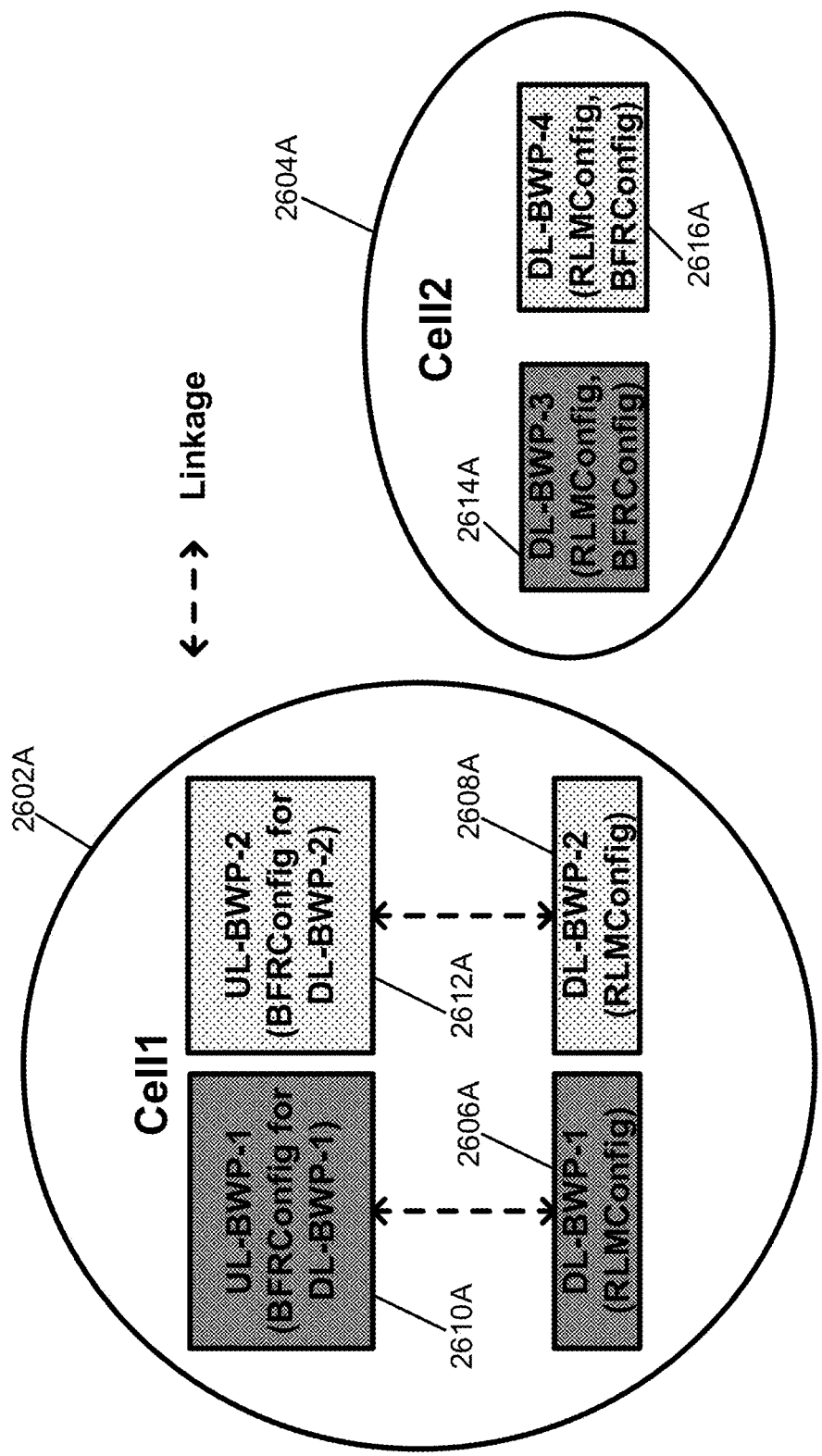
FIG. 26A shows an example of cell configurations in a beam failure recovery procedure for a secondary cell.

FIG. 26A shows an example of a BFR procedure. The BFR procedure may be a downlink BFR procedure of a secondary cell.

A wireless device may receive, from a base station, one or more messages comprising one or more configuration parameters for a first cell (e.g., PCell, PSCell, PUCCH SCell, SCell) and one or more secondary cells. The one or more secondary cells may comprise a second cell (e.g., SCell).

The one or more messages may comprise one or more RRC messages (e.g., an RRC connection reconfiguration message, an RRC connection reestablishment message, or an RRC connection setup message). The first cell may be Cell1 2602A in FIG. 26A and Cell1 2602B in FIG. 26B, and the second cell may be Cell2 2604A in FIG. 26A and Cell2 2604B in FIG. 26B.

The one or more configuration parameters may indicate cell-specific indices for the first cell and the one or more secondary cells (e.g., provided by a higher layer parameter, such as servCellIndex, in the one or more configuration parameters). The first cell, and/or each cell of the one or more secondary cells, may be indicated (e.g., identified) by a respective cell-specific index of the cell-specific indices. The first cell may be indicated (e.g., identified) by a first cell index. The second cell may be indicated (e.g., identified) by a second cell index.

The one or more configuration parameters may further comprise BWP configuration parameters for a plurality of BWPs. The plurality of BWPs may comprise: a first plurality of DL BWPs of the first cell, and/or a first plurality of UL BWPs of the first cell. The first plurality of DL BWPs (e.g., DL-BWP-1 2606A and DL-BWP-2 2608A) may comprise a first downlink BWP. The first downlink BWP may be the DL-BWP-1 2606A and/or the DL-BWP-2 2608A. The first plurality of UL BWPs (e.g., UL-BWP-1 2610A and UL- BWP-2 2612A) may comprise a first uplink BWP. The first uplink BWP may be the UL-BWP-1 2610A and/or the UL-BWP-2 2612A.

The plurality of BWPs may comprise a second plurality of DL BWPs of the second cell. The second plurality of DL BWPs (e.g., DL-BWP-3 2614A and DL-BWP-4 2616A) may comprise a second downlink BWP. The second downlink BWP may be the DL-BWP-3 2614A and/or DL-BWP-4 2616A.

The one or more configuration parameters may indicate BWP specific indices for the plurality of BWPs (e.g., provided by a higher layer parameter bwp-ID in the one or more configuration parameters). Each BWP of the plurality of BWPs may be indicated (e.g., identified) by a respective BWP specific index of the BWP specific indices. The first downlink BWP of the first plurality of DL BWPs may be indicated (e.g., identified) by a first downlink BWP index. The first uplink BWP of the first plurality of UL BWPs may be indicated (e.g., identified) by a first uplink BWP index. The second downlink BWP of the second plurality of DL BWPs may be indicated (e.g., identified) by a second downlink BWP index.

The one or more configuration parameters may indicate DL-BWP-specific BFR configuration parameters (e.g., RadioLinkMonitoringConfig or RLMConfig) for the first downlink BWP (e.g., DL-BWP-1 and/or DL-BWP-2) and/or the second downlink BWP (e.g., DL-BWP-3 and/or DL-BWP-4).

First DL-BWP-specific BFR configuration parameters for the first downlink BWP (e.g., DL-BWP-1) of the first cell (e.g., the Cell1 2602A) may comprise one or more of: first RSs (e.g., RadioLinkMonitoringRSs) of the first downlink BWP, and/or a first beam failure instance (BFI) counter (e.g., beamFailureInstanceMaxCount). The wireless device may assess (e.g., analyze, monitor, determine, etc.) the one or more first RSs (e.g., SSBs, periodic CSI-RSs) to detect a beam failure of the first downlink BWP.

Second DL-BWP-specific BFR configuration parameters for the second downlink BWP (e.g., DL-BWP-3) of the second cell (e.g., the Cell2 2604A) may comprise one or more of: second RSs (e.g., RadioLinkMonitoringRS) of the second downlink BWP, and/or a second BFI counter (e.g., beamFailureInstanceMaxCount). The wireless device may assess (e.g., analyze, monitor, determine, etc.) the one or more second RSs (e.g., SSBs, periodic CSI-RSs) to detect a beam failure of the second downlink BWP.

The configuration parameters may further comprise UL-BWP-specific BFR configuration parameters (e.g., BeamFailureRecoveryConfig or BFRConfig) for the first uplink BWP (e.g., UL-BWP-1 and/or UL-BWP-2) of the first cell. The UL-BWP-specific BFR configuration parameters for the first uplink BWP may comprise at least one of: one or more first candidate RSs (e.g., candidateBeamRSList), a first search space set (e.g., recoverySearchSpaceID), a first threshold (e.g., rsrp-ThresholdSSB), and a first BFR timer (e.g., beamFailureRecoveryTimer). The first downlink BWP index and the first uplink BWP index may be the same.

The wireless device may use the UL-BWP-specific BFR configuration parameters for a BFR procedure of the first downlink BWP, for example, if the first downlink BWP index and the first uplink BWP index are the same. The base station may configure the UL-BWP-specific BFR configuration parameters on the first uplink BWP, if the first downlink BWP index and the first uplink BWP index are the same. The wireless device may use the UL-BWP-specific BFR configuration parameters for a BFR procedure of the first downlink BWP. The first downlink BWP and the first uplink BWP may be linked/paired, for example, if the UL-BWP-specific BFR configuration parameters are configured on the first uplink BWP for the BFR procedure of the first downlink BWP.

As shown in FIG. 26A, UL-BWP-1 2610A and DL-BWP-1 2606A may be linked/paired, and UL-BWP-2 2612A and DL-BWP-2 2608A may be linked/paired. The one or more first candidate RSs (e.g., SSBs, periodic CSI-RSs, aperiodic CSI-RSs), and/or the first search space set, may be associated with (or configured on) the first downlink BWP of the first cell.

The wireless device may assess (e.g., analyze, monitor, determine, etc.) the one or more first candidate RSs to select a candidate beam (or a candidate RS) for a BFR procedure of the first downlink BWP. The wireless device may monitor the first search space set (e.g., linked to a coreset provided by the one or more configuration parameters) for a BFR procedure of the first downlink BWP. The wireless device may use the first search space set to monitor at least one PDCCH in the coreset.

The first cell may be a primary cell (e.g., a PCell). The first cell may be an SpCell or a PSCell. The base station may configure the UL-BWP-specific BFR configuration parameters on the first uplink BWP (e.g., the UL-BWP-1 and/or the UL-BWP-2) of the first cell, for example, if the first cell if the primary cell.

A wireless device may activate downlink BWP 1 and uplink BWP 1 simultaneously, and/or a wireless device may activate downlink BWP 2 and uplink BWP 2 simultaneously, for example, if there is a BWP linkage between the downlink BWP 1 and the uplink BWP 1, and/or a BWP linkage between the downlink BWP 2 and the uplink BWP 2, respectively. The wireless device may not be active on the downlink BWP 1 and the uplink BWP 2 at the same time, for example, because of the linkages. The wireless device may need to switch from the uplink BWP 1 to the uplink BWP 2, for example, if the wireless device switches from the downlink BWP 1 to the downlink BWP 2. The respective linkages may be formed, for example, if candidate beams of the downlink BWP 1 are configured on the uplink BWP 1 and candidate beams of the downlink BWP 2 are configured on the uplink BWP 2. The BWP linkages may limit the flexibility of BWP configurations. A base station may configure candidate beams of a downlink BWP of a secondary cell in the downlink BWP of the secondary cell (e.g., to increase the flexibility of BWP configurations), for example, if a wireless device uses uplink resources of a primary cell for a BFR procedure of the secondary cell. This configuration may reduce the BWP linkages for the secondary cell, for example, such that the wireless device may independently switch the uplink and downlink BWPs of the secondary cell. This configuration may increase flexibility for the base station to schedule resources for one or more wireless devices.

The second DL-BWP-specific BFR configuration parameters for the second downlink BWP (e.g., the DL-BWP-3) of the second cell may comprise BWP-specific BFR configuration parameters (e.g., BeamFailureRecoveryConfig or BFRConfig). The BWP-specific BFR configuration parameters may comprise at least one of: one or more second candidate RSs (e.g., candidateBeamRSList), a second threshold (e.g., rsrp-ThresholdSSB), and/or a second BFR timer (e.g., beamFailureRecoveryTimer).

The wireless device may assess the one or more second candidate RSs (e.g., SSBs, periodic CSI-RSs) to select a candidate beam (or a candidate RS) for a BFR procedure of the second downlink BWP. The wireless device may use the BWP-specific BFR configuration parameters for a BFR procedure of the second downlink BWP.

The second cell may be a secondary cell (e.g., an SCell). The base station may configure the BWP-specific BFR configuration parameters in the second downlink BWP of the second cell, for example, if the second cell is a secondary cell.

The second downlink BWP and the first uplink BWP may not be linked/paired, for example, after or in response to configuring the BWP-specific BFR configuration parameters for the second downlink BWP of the second cell (e.g., instead of configuring the BWP-specific BFR configuration parameters for the first uplink BWP of the first plurality of UL BWPs of the first cell). The second downlink BWP and the first uplink BWP may operate independently, for example, if the second downlink BWP and the first uplink BWP are not being linked/paired. This may result in increased flexibility for the base station to schedule the wireless device and/or a reduction in power consumption at the wireless device and base station.

The one or more configuration parameters of the second cell may indicate a third threshold (e.g., rlmInSyncOutOfSyncThreshold), for example, if the second cell is a secondary cell. The wireless device may use the third threshold for detecting a beam failure of a downlink BWP (e.g., the second downlink BWP) of the second cell. The wireless device (e.g., a physical layer of the wireless device) may assess (e.g., analyze, monitor, determine, etc.) a radio link quality of (or according to) the one or more second RSs (e.g., RadioLinkMonitoringRS) of the second downlink BWP. The radio link quality (e.g., all of the one or more second RSs) may not satisfy, or may be worse (e.g., higher BLER, lower SINR, lower L1-RSRP) than, the third threshold. The wireless device (e.g., the physical layer of the wireless device) may provide a BFI indication to a higher layer (e.g., a MAC layer, a MAC entity, etc.) of the wireless device, for example, if the radio link quality does not satisfy, or is worse than, the third threshold. The third threshold (e.g., Qout, LR) may correspond to a default value of higher layer parameter RLM-IS-OOS-thresholdConfig (e.g., rlmInSyncOutOfSyncThreshold).

The wireless device (e.g., the higher layer of the wireless device, such as a MAC layer, a MAC entity, etc.) may increment the BFI_COUNTER by one, for example, after or in response to the physical layer providing the BFI indication (e.g., at time T, 2T, 5T in FIG. 24). The BFI_COUNTER may be a counter for counting BFI indications provided by the physical layer. The BFI_COUNTER may be initially set to zero.

The BFI_COUNTER may be equal to or greater than the second BFI counter (e.g., beamFailureInstanceMaxCount). The base station may configure the BWP-specific BFR configuration parameters (e.g., BeamFailureRecoveryConfig or BFRConfig) for the second downlink BWP. The second downlink BWP may be an active downlink BWP of the second cell.

The BWP-specific BFR configuration parameters may comprise the one or more second candidate RSs (e.g., candidateBeamRSList). The wireless device may start the second BFR timer (if configured), for example, if the BFI_COUNTER is equal to or greater than the second BFI counter and the BWP-specific BFR configuration parameters are configured for the second downlink BWP of the second cell.

The BWP-specific BFR configuration parameters (e.g., BeamFailureRecoveryConfig or BFRConfig) may not be configured for the second downlink BWP. The second downlink BWP may be an active downlink BWP of the second cell. The wireless device may not start the second BFR timer (if configured), for example, if the BFI_COUNTER is equal to or greater than the second BFI counter and the BWP-specific BFR configuration parameters are not configured for the second downlink BWP of the second cell.

The wireless device may detect a beam failure of the second downlink BWP of the second cell, for example, if the BFI_COUNTER is equal to or greater than the second BFI counter. The wireless device may initiate a BFR procedure for the second downlink BWP, for example, after or in response to detecting the beam failure of the second downlink BWP.

The one or more configuration parameters may indicate one or more uplink physical channels on the first cell for a BFR procedure of at least one secondary cell (e.g., the Cell2 2604A) of the one or more secondary cells. The one or more uplink physical channels may comprise a physical random access channel (PRACH), a physical uplink control channel (PUCCH), or a physical uplink shared channel (PUSCH).

The one or more uplink physical channels may be dedicated to the BFR procedure of the second cell. The base station may be informed of initiation of the BFR procedure of the second cell, for example, if the one or more uplink physical channels are dedicated to the BFR procedure of the second cell, and if the base station receives an uplink signal (e.g., a preamble via a PRACH, a BFR request (BFRQ) transmission via a PUCCH, a scheduling request (SR) via a PUCCH, a MAC CE via a PUSCH) via at least one uplink physical channel (e.g., a BFR-PRACH or a BFR-PUCCH) of the one or more uplink physical channels.

The one or more uplink physical channels may not be dedicated to the BFR procedure of the second cell. The uplink signal may be a scheduling request (SR). The base station may not distinguish whether the SR is transmitted for a BFR procedure of the second cell or for requesting uplink shared channel (UL-SCH) resources for an uplink transmission, for example, if the base station receives the uplink signal (e.g., the SR) via at least one uplink physical channel (e.g., PUCCH) of the one or more uplink physical channels.

The wireless device may send (e.g., transmit) an uplink signal (e.g., a preamble via a PRACH, a BFRQ transmission via a PUCCH, a scheduling request (SR) via a PUCCH, a MAC CE via a PUSCH) via at least one uplink physical channel of the one or more uplink physical channels, for example, after or in response to initiating a BFR procedure for the second cell.

The one or more configuration parameters may indicate at least one uplink physical channel of the one or more uplink physical channels for the first uplink BWP of the first cell. The one or more uplink physical channels may be dedicated to a BFR procedure of the second cell. The first uplink BWP may be an active uplink BWP of the first cell, for example, if the wireless device initiates the BFR procedure for (or associated with) the second cell. The wireless device may start the second BFR timer (if configured), for example, if the BFI_COUNTER is equal to or greater than the second BFI counter and the at least one uplink physical channel of the one or more uplink physical channels is configured (by the one or more configuration parameters) for the first uplink BWP.

The one or more configuration parameters may not indicate at least one uplink physical channel of the one or more uplink physical channels for the first uplink BWP of the first cell. The one or more uplink physical channels may be dedicated to a BFR procedure of the second cell. The first uplink BWP may be an active uplink BWP of the first cell, for example, if the wireless device initiates the BFR procedure of the second cell. The wireless device may not start the second BFR timer (if configured), for example, if the BFI_COUNTER is equal to or greater than the second BFI counter and the at least one uplink physical channel of the one or more uplink physical channels is not configured (e.g., by the one or more configuration parameters) for the first uplink BWP.

The one or more configuration parameters may indicate at least one uplink physical channel of the one or more uplink physical channels for the first uplink BWP of the first cell. The one or more uplink physical channels may not be dedicated to a BFR procedure of the second cell. The first uplink BWP may be an active uplink BWP of the first cell, for example, if the wireless device initiates the BFR procedure of the second cell. The wireless device may not start the second BFR timer (if configured), for example, if the BFI_COUNTER is equal to or greater than the second BFI counter and the at least one uplink physical channel of the one or more uplink physical channels for the first uplink BWP is not dedicated to the BFR procedure of the second cell.

The wireless device may detect a beam failure of the second downlink BWP of the second cell, for example, if the BFI_COUNTER is equal to or greater than the second BFI counter. The wireless device may initiate a BFR procedure for the second downlink BWP, for example, after or in response to the detecting the beam failure of the second downlink BWP. The wireless device may start the second BFR timer (if configured), for example, after or in response to initiating the BFR procedure. The wireless device may send (e.g., transmit) an uplink signal (e.g., a preamble via a PRACH, a BFRQ transmission via a PUCCH, a BFR MAC CE via a PUSCH) via at least one uplink physical channel (e.g., a BFR-PRACH or a BFR-PUCCH or a PUSCH or a PUCCH) of the one or more uplink physical channels of the first cell, for example, after or in response to initiating the BFR procedure for the second downlink BWP of the second cell. The one or more uplink physical channels may be dedicated to a BFR procedure of the second cell. The second BFR timer may expire during the BFR procedure for the second downlink BWP of the second cell. The second BFR timer may expire during an ongoing BFR procedure for the second downlink BWP of the second cell.

The wireless device may stop transmitting the uplink signal via the at least one uplink physical channel, for example, if the second BFR timer expires during the BFR procedure for the second downlink BWP. The wireless device may not transmit the uplink signal via the at least one uplink physical channel, for example, if the second BFR timer expires during the BFR procedure for the second downlink BWP.

The one or more configuration parameters may indicate one or more PUCCH resources (on the first cell and/or the one or more secondary cells) for requesting uplink shared channel (UL-SCH) resources for an uplink transmission. The one or more PUCCH resources may be used for sending a scheduling request (SR). The wireless device may fall back to transmission of a second uplink signal via an uplink PUCCH resource of the one or more PUCCH resources for the BFR procedure of the second downlink BWP, for example, if the second BFR timer expires. The fallback to the transmission of the second uplink signal may be performed, for example, after or in response to the stopping transmitting the uplink signal via the at least one uplink physical channel.

The wireless device may fall back to a random access procedure (e.g., a contention-based random access procedure) for the BFR procedure of the second downlink BWP, for example, if the second BFR timer expires. The fallback to the random access procedure may be performed, for example, after or in response to the stopping the uplink signal via the at least one uplink physical channel. The fallback to the random access procedure (e.g., contention-based random access procedure) may comprise initiating the random access procedure by transmitting a random access preamble via a PRACH resource of the first cell for the BFR procedure of the second downlink BWP.

The one or more configuration parameters may indicate a first BWP inactivity timer for the first cell. The one or more configuration parameters may indicate a second BWP inactivity timer for the second cell. The wireless device may stop the first BWP inactivity timer and the second BWP inactivity timer, for example, after or in response to the initiating random access procedure for the BFR procedure of the second downlink BWP.

The stopping the second BWP inactivity timer of the second cell may prevent a BWP switching during the BFR procedure for the second downlink BWP. The wireless device may not switch from the second downlink BWP to a third downlink BWP of the second plurality of DL BWPs of the second cell, for example, after or in response to the stopping the second BWP inactivity timer.

The one or more configuration parameters may indicate at least one uplink physical channel of the one or more uplink physical channels for the first uplink BWP (e.g., UL-BWP-1) of the first cell. The one or more configuration parameters may not indicate at least one second uplink physical channel of the one or more uplink physical channels for a second uplink BWP (e.g., UL-BWP-2) of the first plurality of UL BWPs of the first cell. The one or more uplink physical channels may be dedicated to a BFR procedure of the second cell. The wireless device may initiate a BFR procedure for the second downlink BWP of the second cell. The wireless device may start the second BFR timer, for example, after or in response to the initiating the BFR procedure. The first uplink BWP of the first cell may be an active uplink BWP of the first cell, for example, if the wireless device initiates the BFR procedure. The wireless device may switch the active uplink BWP of the first cell from the first uplink BWP to the second uplink BWP during the BFR procedure. The wireless device may stop the second BFR timer, for example, if the wireless device switches the active uplink BWP from the first uplink BWP to the second uplink BWP during the BFR procedure. The wireless device may stop the second BFR timer, for example, if the at least one uplink physical channel of the one or more uplink physical channels is configured for the first uplink BWP and the at least one second uplink physical channel of the one or more uplink physical channels is not configured for the second uplink BWP. The switching may be performed, for example, after or in response to receiving a DCI indicating a BWP switch, an RRC message indicating a BWP switch, or an expiry of the first BWP inactivity timer.

The wireless device may initiate a BFR procedure for the second downlink BWP of the second cell, for example, if the BFI_COUNTER is equal to or greater than the second BFI counter. The wireless device may stop the second BWP inactivity timer of the second cell, for example, after or in response to the initiating BFR procedure for the second downlink BWP of the second cell.

The initiating the BFR procedure for the second downlink BWP of the second cell may comprise transmitting an uplink signal (e.g., a preamble via a PRACH, a BFRQ transmission via a PUCCH, a BFR MAC CE via a PUSCH) via at least one uplink physical channel (e.g., a BFR-PRACH or a BFR-PUCCH or a PUSCH) of the one or more uplink physical channels of the first cell.

The wireless device may restart the second BWP inactivity timer of the second cell, for example, after or in response to completing (e.g., successfully completing) the BFR procedure for the second downlink BWP of the second cell.

The stopping the second BWP inactivity timer of the second cell may prevent BWP switching during the BFR procedure for the second downlink BWP. The wireless device may not switch from the second downlink BWP to a third downlink BWP of the second plurality of DL BWPs of the second cell, for example, after or in response to the stopping the second BWP inactivity timer.

The wireless device may not stop the second BWP inactivity timer of the second cell, for example, after or in response to the initiating BFR procedure for the second downlink BWP of the second cell. The second BWP inactivity timer may expire during the BFR procedure for the second downlink BWP. The wireless device may switch from the second downlink BWP to a third downlink BWP (e.g., a default downlink BWP, an initial downlink BWP) of the second plurality of DL BWPs of the second cell, for example, after or in response to the expiry of the second BWP inactivity timer. The wireless device may abort the BFR procedure for the second downlink BWP, for example, after or in response to the switching from the second downlink BWP to the third downlink BWP. The wireless device may reset stop and/or reset the second BFR timer and/or reset the BFI_COUNTER to zero, for example, after or in response to the aborting the BFR procedure for the second downlink BWP.

The one or more configuration parameters may indicate a timer and a counter for a BFR procedure of at least one secondary cell (e.g., the second cell) of the one or more secondary cells. The wireless device may send (e.g., transmit) an uplink signal (e.g., a BFRQ) via at least one uplink physical channel (e.g., a PUCCH) of the one or more uplink physical channels of the first cell, for example, after or in response to the initiating the BFR procedure for the second downlink BWP of the second cell.

The wireless device may start the timer (e.g., ra-responseWindow, sr-prohibit timer, bfrq-prohibit timer) for a BFR response from the base station, for example, after or in response to the transmitting the uplink signal. The wireless device may monitor, for the BFR response from the base station, at least one downlink control channel (e.g., of the first cell) if (e.g., while) the timer is running. The BFR response may comprise a DCI indicating an uplink grant (e.g., for the second cell). The BFR response may comprise a DCI indicating a downlink assignment (e.g., for the second cell). The wireless device may stop and/or reset the timer, for example, after or in response to the aborting the BFR procedure for the second downlink BWP.

The wireless device may increment the counter (e.g., preamble_transmission_counter, sr-counter, bfrq-counter) for a BFR response from the base station, for example, after or in response to the transmitting an uplink signal. The wireless device may retransmit the uplink signal until the counter reaches to a maximum transmission counter value (e.g., sr-TransMax, bfrq-TransMax).

The one or more configuration parameters may indicate the maximum transmission counter. The wireless device may reset the counter, for example, after or in response to the aborting the BFR procedure for the second downlink BWP.

The second downlink BWP and the third downlink BWP may share one or more serving beams associated with one or more second RSs. The wireless device may monitor a first PDCCH on the second downlink BWP of the second cell. A first DMRS antenna port for a reception of the first PDCCH may be associated (e.g., QCL-TypeD) with the one or more second RSs. The wireless device may monitor a second PDCCH on the third downlink BWP of the second cell. A second DMRS antenna port for a reception of the second PDCCH may be associated (e.g., QCL-TypeD) with the one or more second RSs. The wireless device may detect the beam failure for the third downlink BWP, for example, if the wireless device detects a beam failure for the second downlink BWP. The wireless device may detect the beam failure for the second downlink BWP, for example, after or in response to the sharing the one or more serving beams.

The wireless device may abort the BFR procedure for the second downlink BWP, for example, after or in response to the switching from the second downlink BWP to the third downlink BWP.

The wireless device may initiate a second BFR procedure for the second downlink BWP on the third downlink BWP, for example, after or in response to the switching from the second downlink BWP to the third downlink BWP.

The wireless device may initiate a second BFR procedure for the second downlink BWP on the third downlink BWP, for example, if the wireless device switches from the second downlink BWP to the third downlink BWP. The wireless device may initiate the second BFR procedure for the second downlink BWP on the third downlink BWP, for example, after or in response to the second downlink BWP and the third downlink BWP sharing the one or more serving beams associated with one or more second RSs.

The initiating the BFR procedure for the second downlink BWP may comprise triggering a BFRQ for the BFR procedure for the second downlink BWP. The BFRQ may be pending after the BFRQ is triggered, for example, if (or at least until) the wireless device cancels the BFRQ. The wireless device may cancel the BFRQ, for example, if the wireless device transmits a MAC PDU comprising a BFR MAC CE.

The wireless device may detect a beam failure of the second downlink BWP of the second cell, for example, if the BFI_COUNTER is equal to or greater than the second BFI counter. The wireless device may trigger a BFRQ for a BFR procedure for the second downlink BWP, for example, after or in response to the detecting the beam failure of the second downlink BWP.

The wireless device may send (e.g., transmit) the BFRQ via at least one uplink physical channel (e.g., a PUCCH) of the one or more uplink physical channels for the BFR procedure for the second downlink BWP, for example, after or in response to the BFRQ being pending. The wireless device may cancel the BFRQ, for example, after or in response to the aborting the BFR procedure for the second downlink BWP. The wireless device may stop transmitting the BFRQ via the at least one uplink physical channel, for example, after or in response to the cancelling the BFRQ.

A wireless device may detect a beam failure of a downlink BWP of a cell. The one or more configuration parameters may indicate a cell index of the cell (e.g., provided by a higher layer parameter servCellIndex). The downlink BWP may be identified by a downlink BWP index (e.g., provided by a higher layer parameter bwp-ID in the one or more configuration parameters). The wireless device may select and/or indicate (e.g., identify) a candidate RS associated with a candidate RS index (e.g., provided by a higher layer parameter in the one or more configuration parameters), for example, after or in response to detecting the beam failure. The wireless device may select and/or indicate (e.g., identify) the candidate RS through a candidate beam selection.

The wireless device may send (e.g., transmit) a BFR MAC CE (BFR MAC CE) for a BFR procedure of the downlink BWP of the cell. The BFR MAC CE may comprise one or more fields.

The one or more fields may comprise at least one of: a first field indicating the cell index of the cell, a second field indicating the candidate RS index, and/or a third field indicating the downlink BWP index. The base station may determine (e.g., may be informed of) the BFR procedure of the downlink BWP of the cell and the candidate RS, for example, based on the BFR MAC CE. The base station may reconfigure (e.g., by a higher layer TCI parameter (e.g., TCI-StatesPDCCH-ToAddlist and/or TCI-StatesPDCCH-ToReleaseList or UE-specific PDCCH MAC CE)) downlink control channels of the downlink BWP of the cell.

The third field indicating the downlink BWP index may be necessary, for example, if the multiple downlink BWPs of the second cell are active (e.g., at the same time, simultaneously). The base station may not distinguish which downlink BWP of the multiple downlink BWPs has a beam failure, for example, if the BFR MAC CE does not comprise the third field. The third field indicating the downlink BWP index may not be necessary, for example, if a single downlink BWP of the second cell is active (e.g., at the time of generating and/or transmitting the BFR MAC CE).

The BFR MAC CE may not comprise the third field, for example, if a single downlink BWP is configured to be active at a time.

Figure 26B:
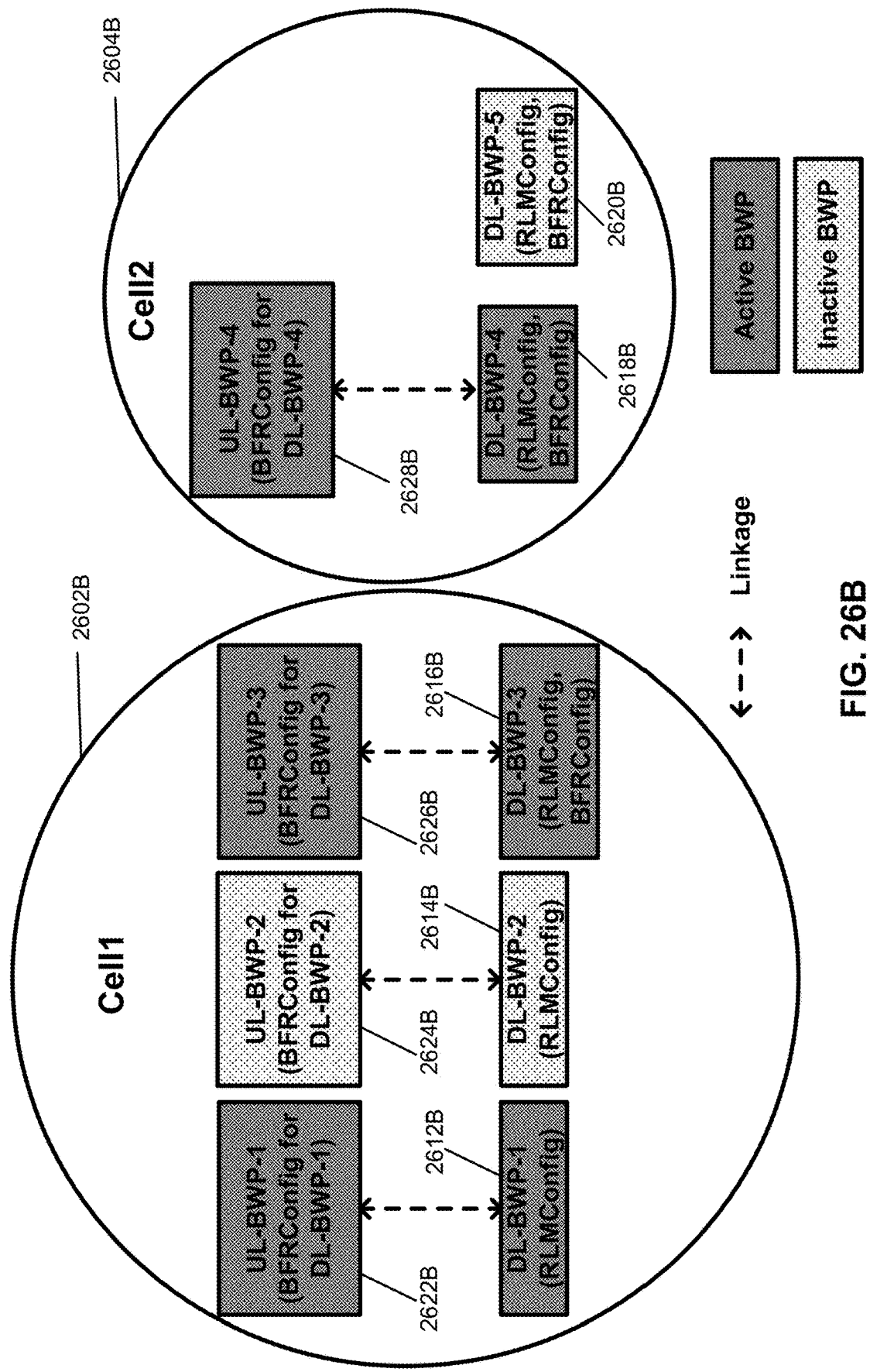
FIG. 26B shows an example of cell configurations in a beam failure recovery procedure.

FIG. 26B shows an example of cell configurations in a BFR procedure. The Cell1 2602B shown in FIG. 26B may be operated similar to one or more operations of the Cell1 2602A shown in FIG. 26A. The cell 2604B shown in FIG. 26B may be operated similar to one or more operations of the Cell2 2604A shown in FIG. 26A. The Cell1 2602B may be a first cell (e.g., PCell, PSCell, PUCCH SCell, SCell). The Cell2 2604B may be a second cell (e.g., an SCell). At least one of the Cell1 2602B and the Cell2 2604B may have a plurality of active BWPs. A base station may send, to a wireless device, one or more messages (e.g., one or more RRC messages) comprising one or more configuration parameters. The Cell1 2602B may comprise a plurality of uplink BWPs (e.g., UL-BWP-1 2622B, UL-BWP-2 2624B, UL-BWP-3 2626B) and/or a plurality of downlink BWPs (e.g., DL-BWP-1 2612B, DL-BWP-2 2614B, DL-BWP-3 2616B). The Cell2 2604B may comprise a plurality of uplink BWPs (e.g., UL-BWP-4 2628B) and/or a plurality of downlink BWPs (e.g., DL-BWP-4 2618B, DL-BWP-5 2620B).

A plurality of BWPs may be active simultaneously in a cell. The UL-BWP-1 2622B and the UL-BWP-3 2626B may be active BWPs in Cell1 2602B. The DL-BWP-1 2612B and the DL-BWP-3 2616B may be active BWPs in Cell1 2602B. The UL-BWP-1 2622B and the DL-BWP-1 2612B may be primary BWPs, initial BWPs, default BWPs, etc. A BFR procedure for the DL-BWP-1 2612B may be performed, such as the BFR procedure described with respect to FIG. 23. The first downlink BWP index (e.g., an index for the DL-BWP-1 2612B) and the first uplink BWP index (e.g., an index for the UL-BWP-1 2622B) may be the same. The UL-BWP-3 2626B and the DL-BWP-3 2616B may be secondary BWPs (e.g., BWPs activated after activating the primary BWPs). A BFR procedure for the DL-BWP-3 2616B may be performed, such as the BFR procedure described with respect to FIG. 23. The configuration parameters may further comprise UL-BWP-specific BFR configuration parameters (e.g., BeamFailureRecoveryConfig or BFRConfig) for the first uplink BWP (e.g., UL-BWP-1 2622B, UL-BWP-2 2624B, and/or UL-BWP-3 2626B) of the first cell (e.g., Cell1 2602B). The UL-BWP-specific BFR configuration parameters for the first uplink BWP may comprise at least one of: one or more first candidate RSs (e.g., candidateBeamRSList), a first search space set (e.g., recoverySearchSpaceID), a first threshold (e.g., rsrp-ThresholdSSB), and/or a first BFR timer (e.g., beamFailureRecoveryTimer). The first downlink BWP index (e.g., an index for the DL-BWP-3 2616B) and the first uplink BWP index (e.g., an index for the UL-BWP-1 2626B) may be the same.

The UL-BWP-3 2626B and the DL-BWP-3 2616B may be secondary BWPs (e.g., BWPs activated after activating the primary BWPs). A BFR procedure for the DL-BWP-3 2616B may be performed, such as the BFR procedure described below with respect to FIG. 28A and/or FIG. 28B. A wireless device may send (e.g., transmit), to a base station via a physical uplink shared channel (e.g., a PUSCH), a BFR MAC CE for the BFR procedure for the DL-BWP-3 2616B. The base station may configure one or more BFR configuration parameters (e.g., the BFRConfig for DL-BWP-3, such as candidate beams of the DL-BWP-3 2616B, etc.) on the UL-BWP-3 2626B for the BFR procedure for the DL-BWP-3 2616B, for example, if the UL-BWP-3 2626B and the DL-BWP-3 2616B are linked (or supposed to be linked) to each other. The base station may configure one or more BFR configuration parameters (e.g., the BFRConfig on DL-BWP-3 2616B) on the DL-BWP-3 2616B for the BFR procedure for the DL-BWP-3 2616B, for example, if the UL-BWP-3 2626B and the DL-BWP-3 2616B are not linked (e.g., not supposed to be linked) to each other.

Figure 27A:
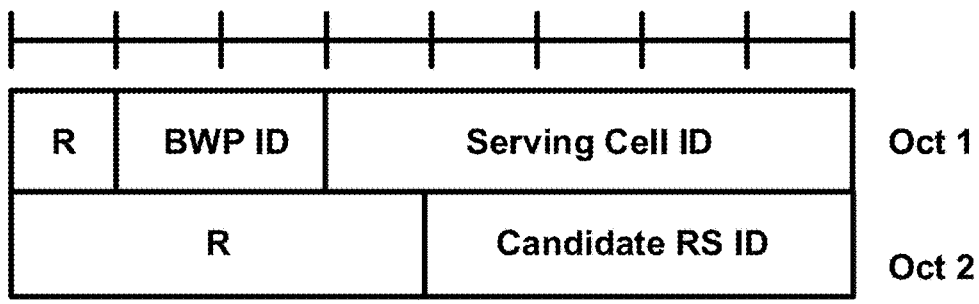
FIG. 27A, FIG. 27B, and FIG. 27C show examples of a beam failure recovery MAC CE (BFR MAC CE) for a beam failure recovery procedure.
Figure 27B:
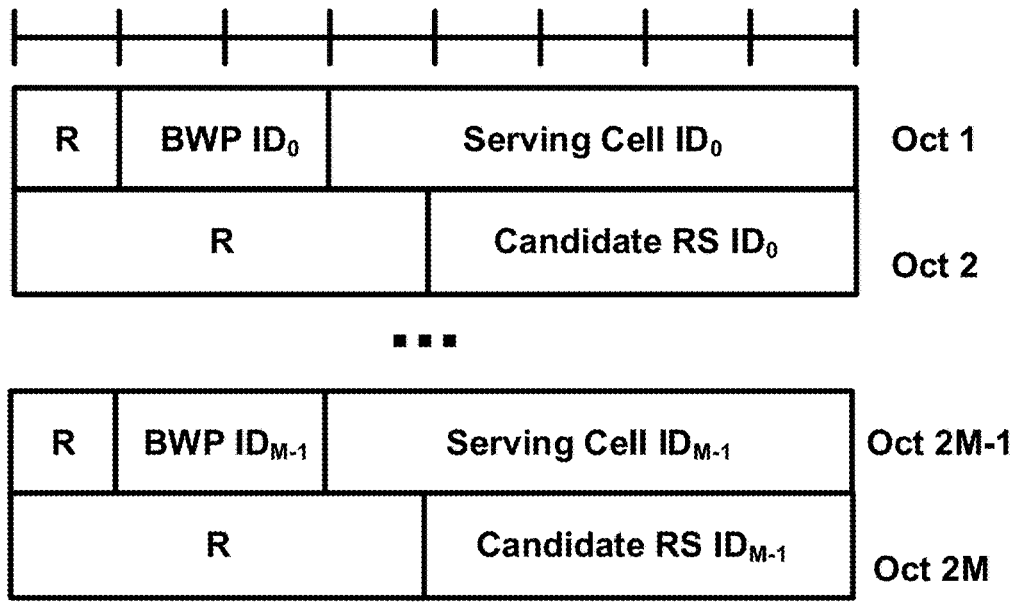
Figure 27C:
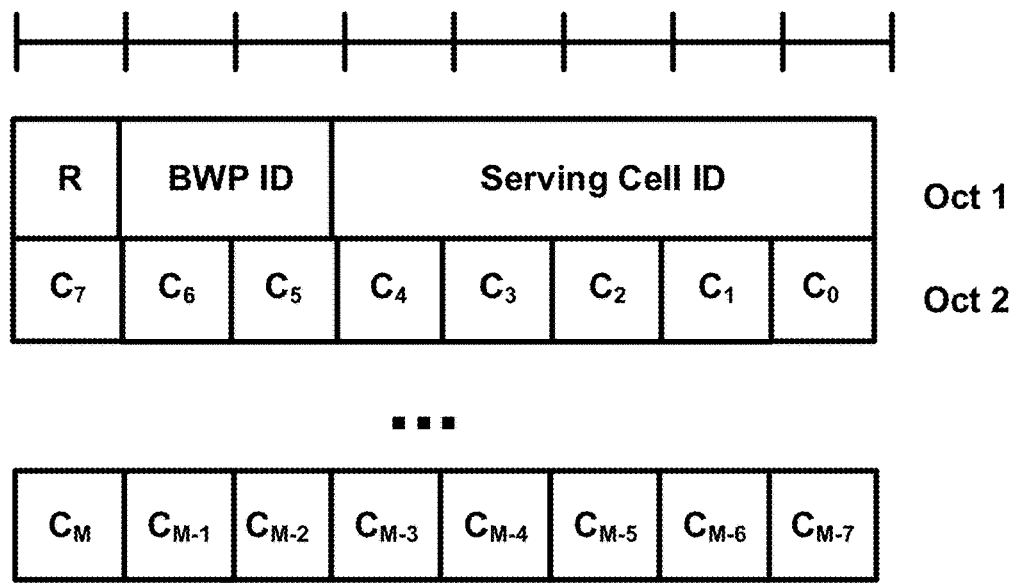

FIG. 27A, FIG. 27B and FIG. 27C show examples of a BFR MAC CE. The BFR MAC CE may comprise one or more fields comprising at least one of: a first field, a second field, a third field, and a fourth field.

As shown in FIG. 27A, FIG. 27B, and FIG. 27C, for example, the first field may indicate (e.g., an identity of) a serving cell (e.g., Serving Cell ID). A wireless device may apply one or more actions for the serving cell according to the BFR MAC CE, for example, if the first field is set to indicate (e.g., the identity of) the serving cell. A first length of the first field may be a first value (e.g., 5 bits).

As shown in FIG. 27A and FIG. 27B, for example, the second field may indicate a candidate RS index (e.g., Candidate RS ID) associated with a candidate RS. A second length of the second field may be a second value (e.g., 4 bits). The wireless device may select the candidate RS in a candidate beam selection.

As shown in FIG. 27C, for example, the second field may comprise one or more C-fields (e.g., C_0, . . . C_M). A C_i field of the one or more C-fields may indicate a candidate RS for an index i (if configured) of one or more second candidate RSs. The quantity (e.g., number) of the one or more second candidate RSs may be M+1. It may be indicated that the wireless device has selected the candidate RS i in the candidate beam selection, for example, if the C_i field is set to one. The candidate RS i may have a second radio link quality satisfying, or better (e.g., lower BLER or higher L1-RSRP or higher SINR) than, a second threshold. It may be indicated that the wireless device has not selected the candidate RS i in the candidate beam selection, for example, if the C_i field is set to zero. The candidate RS i may have a second radio link quality not satisfying, or worse (e.g., higher BLER or lower L1-RSRP or lower SINR) than, the second threshold. A candidate RS of the one or more second candidate RSs may be associated with an index i, a candidate RS index (e.g., i=0, 1, . . . M+1). The one or more configuration parameters may indicate the candidate RS index. The one or more configuration parameters may indicate an association between the candidate RS index and the candidate RS.

As shown in FIG. 27A, FIG. 27B, and FIG. 27C, for example, the third field may indicate a BWP index (e.g., BWP ID) of a BWP (e.g., a downlink BWP). The BFR MAC CE may indicate that the BFR MAC CE is for the BWP, for example, if the third field indicates the BWP index of the BWP. A third length of the third field may be a third value (e.g., 2 bits, or any other quantity of bits).

As shown in FIG. 27A, FIG. 27B, and FIG. 27C, for example, the fourth field may indicate a reserved field, such as an R field. The reserved field (e.g., R field) may indicate a reserved bit. The reserved field (e.g., R field) may be set to zero.

It may be possible that at least two secondary cells of the one or more secondary cells may have a beam failure. A first secondary cell of the one or more secondary cells may have a first beam failure, and a second secondary cell of the one or more secondary cells may have a second beam failure. The BFR MAC CE may comprise information for the beam failure of the at least two secondary cells (e.g., the first beam failure and the second beam failure). As shown in FIG. 27B, for example, the BFR MAC CE may have a variable size. M secondary cells have a BFR procedure (e.g., simultaneously). Candidate RS ID_0 may indicate a first candidate RS index associated with a first candidate RS of the first secondary cell. Serving Cell ID_0 may indicate a first identity of the first secondary cell. Candidate RS ID_(M−1) may indicate an M-th RS index associated with an M-th candidate RS of an M-th secondary cell of the one or more secondary cells. Serving Cell ID_(M−1) may indicate an M-th identity of the M-th secondary cell.

The one or more uplink physical channels may be shared by a plurality of wireless devices. The one or more uplink physical channels may not be dedicated to a wireless device of the plurality of wireless devices. A BFR MAC CE may comprise a field indicating an identity of the wireless device (e.g., C-RNTI, CS-RNTI) or may be generated based on the identity of the wireless device (e.g., C-RNTI, CS-RNTI). A BFR MAC CE may be associated with (e.g., identified by) an LCID in a MAC subheader corresponding to the BFR MAC CE. The LCID may comprise a six digit binary number (e.g., 110011) in the MAC subheader and may indicate the BFR MAC CE. The LCID of the BFR MAC CE may be fixed and/or pre-configured.

Logical channels may be prioritized, for example, in accordance with the following order (highest priority listed first): BFR MAC CE, C-RNTI MAC CE or data from UL-CCCH, Configured Grant Confirmation MAC CE, and MAC CE for BSR, with exception of BSR included for padding. The wireless device may include (e.g., send) the BFR MAC CE first, C-RNTI MAC CE or data from UL-CCCH second, and/or Configured Grant Confirmation MAC CE third (e.g., to a MAC PDU), for example, after or in response to receiving and/or determining (e.g., having) an uplink grant for an uplink transmission (e.g., a MAC PDU transmission).

Logical channels may be prioritized, for example, in accordance with the following order (e.g., highest priority listed first): C-RNTI MAC CE or data from UL-CCCH, BFR MAC CE, Configured Grant Confirmation MAC CE, and MAC CE for BSR, with exception of BSR included for padding. The wireless device may include (e.g., send) C-RNTI MAC CE or data from UL-CCCH first, the BFR MAC CE second, and Configured Grant Confirmation MAC CE third (e.g., to a MAC PDU), for example, after or in response to receiving/having an uplink grant for an uplink transmission (e.g., a MAC PDU transmission).

Logical channels may be prioritized, for example, in accordance with the following order (e.g., highest priority listed first): C-RNTI MAC CE or data from UL-CCCH, Configured Grant Confirmation MAC CE, BFR MAC CE, and MAC CE for BSR, with exception of BSR included for padding. The wireless device may include (e.g., send) C-RNTI MAC CE or data from UL-CCCH first, Configured Grant Confirmation MAC CE second, and the BFR MAC CE third (e.g., to a MAC PDU), for example, after or in response to receiving/having an uplink grant for an uplink transmission (e.g., a MAC PDU transmission).

Logical channels may be prioritized, for example, in accordance with the following order (e.g., highest priority listed first): C-RNTI MAC CE or data from UL-CCCH, Configured Grant Confirmation MAC CE, MAC CE for BSR, with exception of BSR included for padding, and BFR MAC CE. The wireless device may include (e.g., send) C-RNTI MAC CE or data from UL-CCCH first, Configured Grant Confirmation MAC CE second, MAC CE for BSR, with exception of BSR included for padding, third, and the BFR MAC CE fourth (e.g., to a MAC PDU), for example, after or in response to receiving/having an uplink grant for an uplink transmission (e.g., a MAC PDU transmission).

Figure 28A:
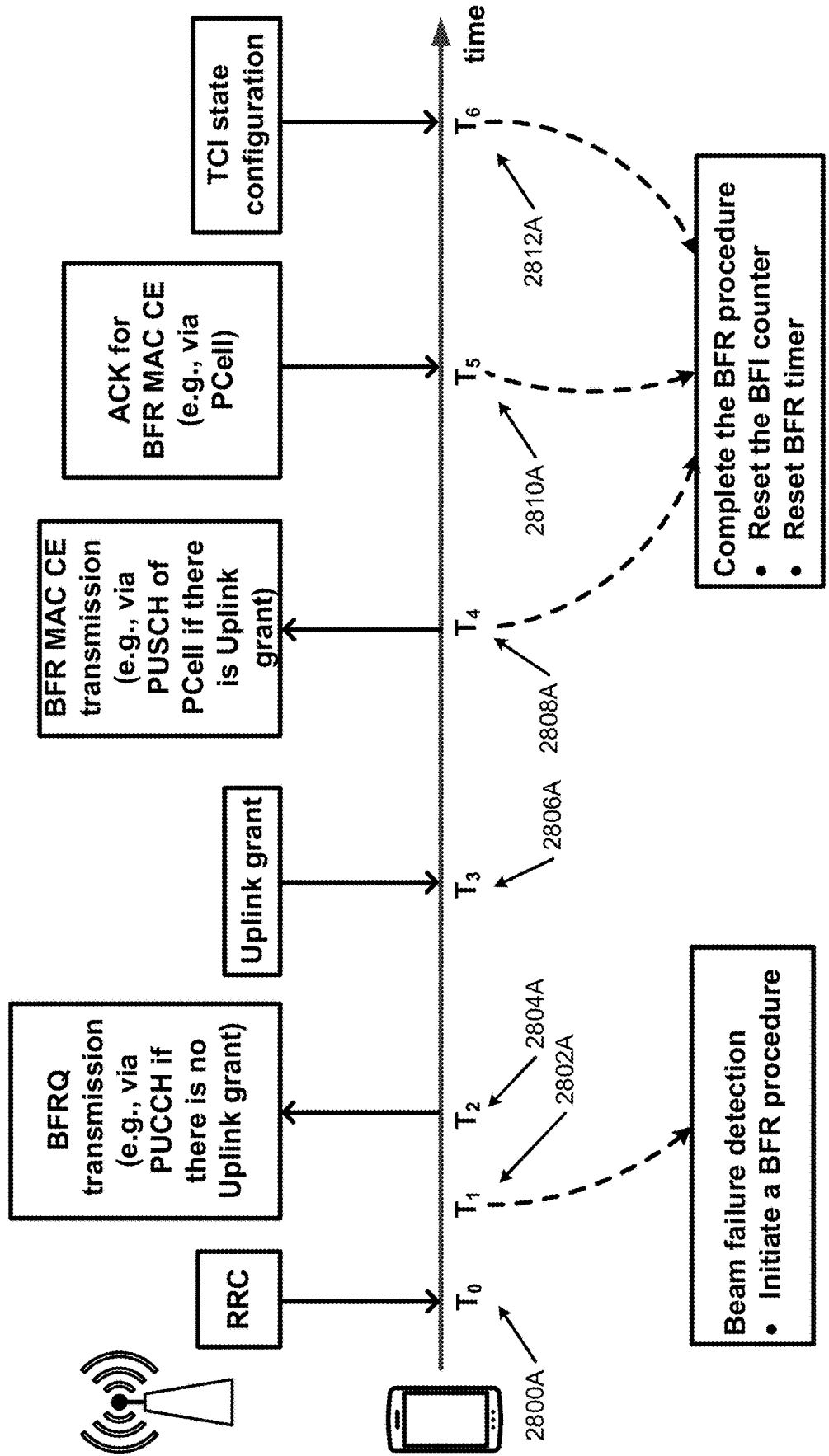
FIG. 28A shows an example of a beam failure recovery procedure using a BFR MAC CE.
Figure 28B:
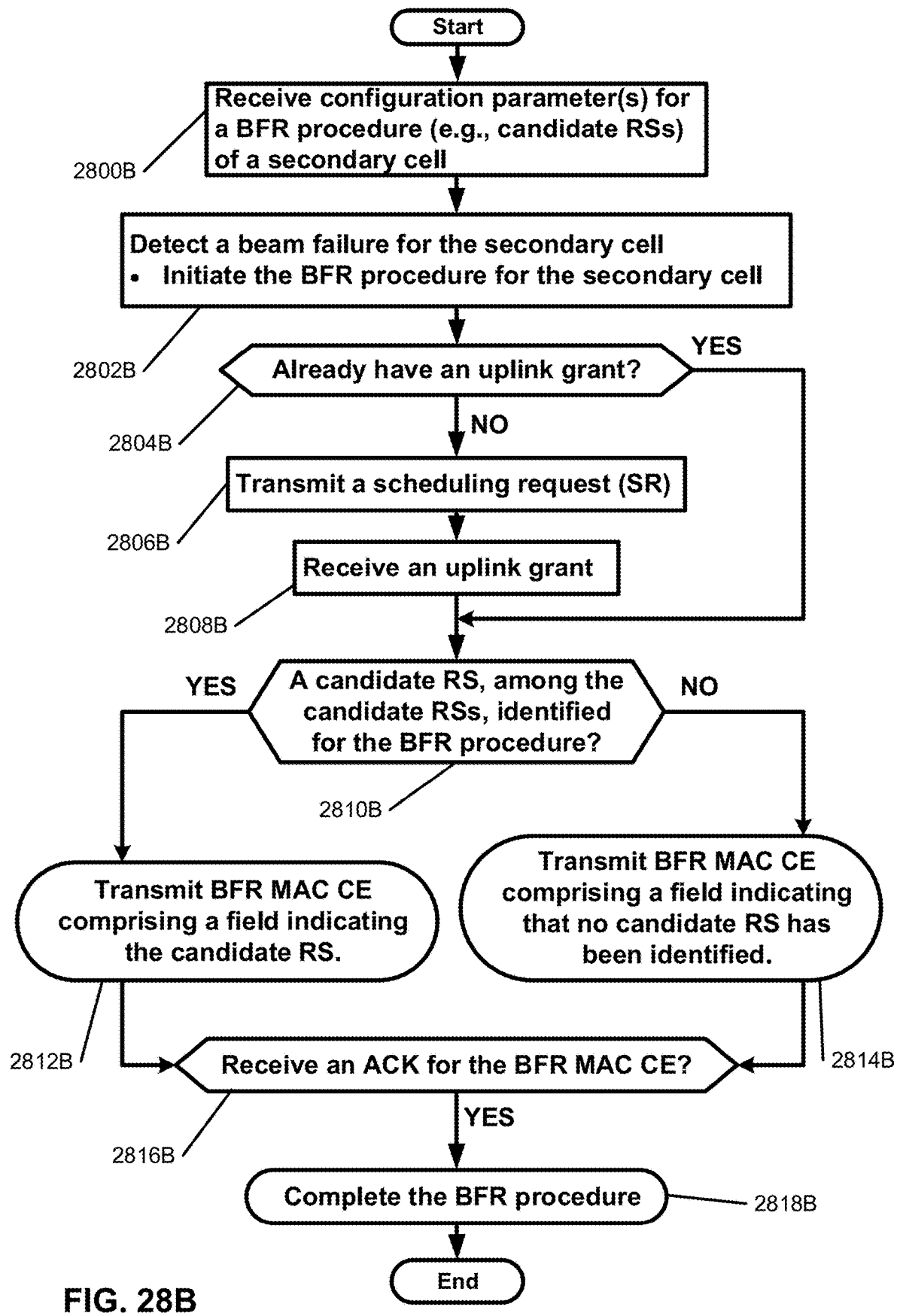
FIG. 28B shows an example method for a beam failure recovery procedure using a BFR MAC CE.

FIG. 28A shows an example of a BFR procedure (e.g., a downlink BFR procedure of a secondary cell) using a BFR MAC CE. FIG. 28B shows an example method for a BFR procedure (e.g., a downlink BFR procedure of a secondary cell) using a BFR MAC CE. A wireless device may receive one or more messages (e.g., one or more RRC messages) comprising one or more configuration parameters at time T0 2800A (e.g., at step 2800B). The wireless device may detect a beam failure of the second downlink BWP of the second cell at time T1 2802A (e.g., at step 2802B). The wireless device may initiate a BFR procedure for the second downlink BWP, for example, after or in response to the detecting the beam failure of the second downlink BWP (e.g., at step 2802B).

The wireless device may be configured (e.g., by the one or more configuration parameters) with the one or more second candidate RSs (e.g., candidateBeamRSList) for the second downlink BWP. The wireless device may initiate a candidate beam selection for the BFR procedure for the second downlink BWP, for example, based on the configuration of the one or more second candidate RSs. The candidate beam selection may comprise selecting and/or indicating (e.g., identifying) a candidate RS (e.g., CSI-RS, SS/PBCH blocks) in the one or more second candidate RSs (e.g., candidateBeamRSList) of the second downlink BWP. The candidate RS may be associated with a candidate RS index (e.g., periodic CSI-RS configuration indexes and/or the SSB indexes provided by the one or more configuration parameters).

A physical layer of the wireless device may assess (e.g., analyze, monitor, determine, etc.) a second radio link quality (e.g. BLER, L1-RSRP) of the one or more second candidate RSs, for example, for the candidate beam selection. At least one of the one or more second candidate RSs may have a second radio link quality satisfying, or better (e.g. lower BLER or higher L1-RSRP or higher SINR) than, the second threshold (e.g., rsrp-ThresholdSSB).

The physical layer of the wireless device may provide, to a higher layer (e.g., a MAC layer) of the wireless device, an index of the at least one of the one or more second candidate RSs and the second radio link quality (e.g., L1-RSRP) of the at least one of the one or more second candidate RSs. The one or more configuration parameters may indicate the index.

The wireless device (e.g., a higher layer (e.g., a MAC layer) of the wireless device) may select the candidate RS among the at least one of the one or more second candidate RSs, for example, after or in response to receiving: the index of the at least one of the one or more second candidate RSs, and/or the second radio link quality of the at least one of the one or more second candidate RSs.

The wireless device (e.g., a higher layer (e.g., a MAC layer) of the wireless device) may initiate the candidate beam selection, for example, if the BFI_COUNTER is equal to or greater than the second BFI counter. The initiating the candidate beam selection may comprise requesting, by the wireless device (e.g., by a higher layer (e.g., a MAC layer)), an index of at least one of the one or more second candidate RSs and a second radio link quality (e.g., L1-RSRP) of the at least one of the one or more second candidate RSs. The request may be sent to the physical layer of the wireless device. The second radio link quality may satisfy, or may be better (e.g. lower BLER or higher L1-RSRP or higher SINR) than, the second threshold (e.g., rsrp-ThresholdSSB).

A BFRQ may be triggered, for example, after or in response to the selecting and/or indicating (e.g., identifying) the candidate RS for the BFR procedure of the second downlink BWP of the second cell. The wireless device may determine whether an uplink grant have been received (e.g., at step 2804B). A BFRQ may be triggered, for example, after or in response to detecting the beam failure of the second downlink BWP of the second cell and not having a received uplink grant.

The wireless device may have received an uplink grant, for example, if the wireless device detects the beam failure. The wireless device may have received an uplink grant, for example, if the wireless device initiates the BFR procedure. The wireless device may have received an uplink grant, for example, if the BFRQ is triggered. The wireless device may have received an uplink grant, for example, if the wireless device selects and/or indicates (e.g., identifies) the candidate RS for the BFR procedure. The wireless device may receive an uplink grant from the base station at time T3 2806A.

The wireless device may send (e.g., transmit) a BFR MAC CE (e.g., having the format of the BFR MAC CE shown in FIG. 27A or FIG. 27B) to the base station for the BFR procedure for the second downlink BWP (at time T4 2808A), for example, after or in response to receiving the uplink grant. The wireless device may send (e.g., transmit) the BFR MAC CE via one or more PUSCH resources indicated by the uplink grant. The BFR MAC CE may comprise one or more fields. The one or more fields may comprise at least one of: a first field indicating the second cell index, a second field indicating the candidate RS index, and/or a third field indicating the second downlink BWP index. The wireless device may determine whether a candidate RS is indicated (e.g., identified) for the BFR procedure (e.g., at step 2810B), for example, if the wireless device determines that an uplink grant has been received (e.g., at step 2804B).

The wireless device may not have received an uplink grant, for example, at a time that the wireless device detects the beam failure. The wireless device may not have received an uplink grant, for example, at a time that the wireless device initiates the BFR procedure. The wireless device may not have received an uplink grant, for example, at a time that the BFRQ is triggered. The wireless device may not have received an uplink grant, for example, at a time that the wireless device selects and/or indicates (e.g., identifies) the candidate RS for the BFR procedure. The wireless device may not send (e.g., transmit) the BFR MAC CE to the base station, for example, if the wireless device has not received the uplink grant. The wireless device may send (e.g., transmit) the BFRQ to the base station for the BFR procedure at time T2 2804A, for example, if the wireless device has not received the uplink grant. The BFRQ may be pending, for example, after the BFRQ is triggered.

The wireless device may send (e.g., transmit) the BFRQ via at least one uplink physical channel of the one or more uplink physical channels. The one or more uplink physical channels may be configured by a BFRQ configuration.

At time T2 2804A, the wireless device may send (e.g., transmit) the BFRQ via at least one uplink physical channel (e.g., PUCCH) of the one or more uplink physical channels of the first cell, for example, after or in response to the initiating BFR procedure for the second downlink BWP of the second cell and/or selecting and/or indicating (e.g., identifying) the candidate RS (e.g., if the wireless device has not received an uplink grant).

At time T2 2804A, the wireless device may send (e.g., transmit) the BFRQ (e.g., if pending) via at least one uplink physical channel (e.g., PUCCH) of the one or more uplink physical channels of the first cell, for example, after or in response to the initiating BFR procedure for the second downlink BWP of the second cell and/or selecting and/or indicating (e.g., identifying) the candidate RS (e.g., if the wireless device has not received an uplink grant). The wireless device may send (e.g., transmit) the BFRQ comprising an SR (e.g., at step 2806B).

The at least one uplink physical channel (e.g., PUCCH) may be dedicated to a BFR of at least one secondary cell (e.g., the second cell) of the one or more secondary cells. The at least one uplink physical channel (e.g., PUCCH) may be an uplink resource for sending an SR. The at least one uplink physical channel may be used to request an uplink grant (e.g., UL-SCH resources) to transmit the BFR MAC CE. The at least one uplink physical channel (e.g., PUCCH) may be used for requesting UL-SCH resources for an uplink transmission.

The wireless device may receive an uplink grant from the base station at time T3 2806A (e.g., at step 2808B). The base station may send (e.g., transmit) an uplink grant to the wireless device, for example, after or in response to receiving the BFRQ via the at least one uplink physical channel.

The wireless device may send (e.g., transmit) a BFR MAC CE to the base station for the BFR procedure for the second downlink BWP (at time T4 2808A), for example, after or in response to the receiving the uplink grant. The wireless device may send (e.g., transmit) the BFR MAC CE via one or more PUSCH resources indicated by the uplink grant. The BFR MAC CE may comprise one or more fields. The one or more fields may comprise at least one of: a first field indicating the second cell index, a second field indicating the candidate RS index, and a third field indicating the second downlink BWP index. The wireless device may monitor for a BFR response from the base station, for example, after or in response to the transmitting the BFR MAC CE.

The wireless device may determine whether a candidate RS is indicated (e.g., identified) for the BFR procedure (e.g., at step 2810B). The wireless device may send (e.g., transmit) a BFR MAC CE comprising a field (e.g., the second field indicating the candidate RS index) indicating the candidate RS (e.g., at step 2812B), for example, if the candidate RS is indicated (e.g., identified) for the BFR procedure. The wireless device may send (e.g., transmit) a BFR MAC CE comprising a field indicating that no candidate RS has been determined (e.g., at step 2814B), for example, if no qualified candidate RS is indicated for the BFR procedure.

The wireless device may send (e.g., transmit) a MAC PDU at time T4 2808A, for example, after or in response to the receiving the uplink grant. The MAC PDU may comprise the BFR MAC CE for the BFR procedure for the second downlink BWP. The wireless device may cancel the BFRQ (e.g., if pending), for example, after or in response to the transmitting the MAC PDU comprising the BFR MAC CE. The wireless device may successfully complete the BFR procedure for the second downlink BWP of the second cell, for example, after or in response to the transmitting the MAC PDU comprising the BFR MAC CE (e.g., at time T4 2808A).

A wireless device may perform (e.g., determine a completion of) a BFR procedure for a primary cell, for example, based on receiving a BFR response (e.g., DCI) in a dedicated BFR control resource set (coreset). A base station may configure a dedicated BFR coreset for the BFR procedure of the primary cell. The wireless device may monitor the dedicated BFR coreset, for example, during the BFR procedure of the primary cell. A BFR MAC CE may be used for a BFR procedure for a secondary cell. A base station may configure a dedicated BFR coreset for the BFR procedure of the secondary cell, for example, after or in response to receiving the BFR MAC CE. The dedicated BFR coreset for the secondary cell may not be the best use of the limited coreset resources, for example, if a BFR MAC CE indicating a beam failure of the secondary cell is sent by the wireless device. The dedicated BFR coreset may increase resource overhead. Each BWP may have a maximum quantity of coresets (e.g., at most 3 coresets). Assigning one of the coresets (e.g., one of the 3 coresets) to the dedicated BFR coresets may limit the flexible use of the coreset resources. Monitoring a BFR response in the dedicated BFR coreset (e.g., after receiving an acknowledgment) may increase the latency of the BFR procedure. A BFR response (BFRR) that may be in response to the BFR MAC CE may be an acknowledgment that does not use the limited coreset resource. An acknowledgment mechanism for a MAC CE may be used. Receiving the acknowledgment may be determined to be an implicit BFR response. The base station may configure another wireless device specific coreset for a different service (e.g., a high-speed data service, low latency service, URLLC, eMBB, etc.), for example, by avoiding the use of the dedicated BFR coreset. The wireless device may receive an acknowledgement (ACK) for the BFR MAC CE as the BFR response at time T5 2810A (e.g., at step 2816B). The reception of the ACK for the BFR MAC CE may indicate that the base station has received the BFR MAC CE. The wireless device may complete (e.g., successfully complete) the BFR procedure for the second downlink BWP of the second cell, for example, after or in response to receiving the ACK for the BFR MAC CE (e.g., at time T5 2810A and step 2818B). The wireless device may resend (e.g., retransmit) the BFR MAC CE, for example, if the wireless device does not receive the ACK for the BFR MAC CE (e.g., for a period of time). The wireless device may receive an ACK for the BFR MAC CE, for example, after or in response to resending the BFR MAC CE. The wireless device may complete (e.g., successfully complete) the BFR procedure for the second downlink BWP of the second cell, for example, after or in response to receiving the ACK for the BFR MAC CE.

The BFR response may comprise a higher layer TCI parameter (e.g., TCI-StatesPDCCH-ToAddlist and/or TCI-StatesPDCCH-ToReleaseList). The wireless device may receive the higher layer TCI parameter for the second cell at time T6 2812A. The higher layer TCI parameter may comprise one or more TCI states for the second cell. The wireless device may successfully complete the BFR procedure for the second downlink BWP of the second cell, for example, after or in response to receiving the higher layer TCI parameter.

The wireless device may receive a MAC CE activation command (e.g., UE-specific PDCCH MAC CE) indicating a TCI state of the one or more TCI states for the second cell. The wireless device may successfully complete the BFR procedure for the second downlink BWP of the second cell, for example, after or in response to the receiving the MAC CE activation command.

The BFR response may be a MAC CE activation command (e.g., UE-specific PDCCH MAC CE) indicating a TCI state for the second cell. The wireless device may receive the MAC CE activation command for the second cell at time T6 2812A. The wireless device may successfully complete the BFR procedure for the second downlink BWP of the second cell, for example, after or in response to the receiving the MAC CE activation command.

The TCI state may be used for at least one PDCCH reception in a coreset of the second cell. The TCI state may indicate quasi co-location information of DM-RS antenna port for the at least one PDCCH reception in the coreset. The TCI state may indicate that the DM-RS antenna port for the at least one PDCCH reception in the coreset is quasi co-located (e.g., QCL-TypeD) with one or more downlink RSs (e.g., the candidate RS) indicated by the TCI state.

The wireless device may reset the BFI_COUNTER to zero, for example, after or in response to the completing the BFR procedure for the second downlink BWP of the second cell. The wireless device may reset the second BFR timer, for example, after or in response to the completing the BFR procedure for the second downlink BWP of the second cell.

A wireless device may not (or may wait to) send an uplink signal (e.g., a preamble) for a BFR procedure (e.g., for a BFR procedure of a primary cell) before finding a suitable candidate beam. To send an uplink signal for the BFR procedure, the wireless device may measure (e.g., continuously measure) the quality of candidate beams, for example, at least until it finds a suitable candidate beam with an acceptable signal quality (e.g., above a threshold value). The measurements of the quality of candidate beams at least until the wireless device finds a suitable candidate beam may delay (or increase the latency of) the BFR procedure, for example, for a BFR procedure for a secondary cell. A beam failure indication (e.g., by sending a BFR MAC CE) that indicates that there is no suitable candidate beams of a cell (e.g., a secondary cell) may promptly indicate a beam failure of the cell without delaying the report of the beam failure of the cell. The BFR MAC CE may not indicate a candidate beam, for example, if a suitable candidate beam is not found. The prompt beam failure indication may allow a base station to timely deactivate the cell configured for the wireless device, thereby enhancing resource utilization efficiencies. The prompt beam failure indication may allow the base station to timely initiate a beam management procedure for the cell to address the beam failure. The base station may control, via a primary cell, the operations on the cell with beam failure (e.g., deactivating the cell configured for the wireless device, initiating a beam management for the cell), for example, if the primary cell is properly functioning for the wireless device.

The wireless device may not select and/or determine a candidate RS in the one or more second candidate RSs (e.g., candidateBeamRSList) for the candidate beam selection. The candidate RS may not be selected and/or determined, for example, if at least one of the one or more second candidate RSs do not have a second radio link quality satisfying, or better (e.g. lower BLER or higher L1-RSRP or higher SINR) than, the second threshold (e.g., rsrp-ThresholdSSB). The candidate RS may not be selected and/or determined, for example, if each candidate RS of the one or more second candidate RSs has a second radio link quality not satisfying, or worse (e.g. higher BLER or lower L1-RSRP or lower SINR) than, the second threshold (e.g., rsrp-ThresholdSSB).

At least one of the one or more second candidate RSs may not have a second radio link quality satisfying, or better (e.g., lower BLER or higher L1-RSRP or higher SINR) than, the second threshold (e.g., rsrp-ThresholdSSB). The wireless device may not select/identify a candidate RS among the one or more second candidate RSs in the candidate beam selection, for example, based on the at least one of the one or more second candidate RSs not having the second radio link quality satisfying, or better than, the second threshold.

The wireless device may send (e.g., transmit) a BFR MAC CE for the BFR procedure of the second downlink BWP of the second cell. The second field of the BFR MAC CE may indicate a first value (e.g., step 2814B), for example, if the wireless device has not selected and/or determined the candidate RS in the candidate beam selection. The first value may be preconfigured, predefined, and/or fixed (e.g., 0000 or any other value). The base station may semi-statically configure the first value. The first value may indicate that no candidate beam has been determined. The BFR MAC CE may comprise a field that indicates whether a candidate beam has been determined (e.g., value '1' if a candidate beam is determined, value '0' if no candidate beam is determined).

The base station may be informed of the BFR procedure of the second cell and of the candidate RS in the candidate beam selection not being determined, for example, after or in response to receiving the BFR MAC CE with the second field indicating the first value. The base station may initiate a beam management procedure (e.g., aperiodic beam reporting) for the second cell, for example, after or in response to the receiving the BFR MAC CE with the second field indicating the first value. The first value may indicate, to the base station, that each candidate RS in the one or more second candidate RSs has a second radio link quality not satisfying, or worse (e.g. higher BLER or lower L1-RSRP or lower SINR) than, the second threshold.

The base station may initiate the beam management procedure to find a candidate RS for the second downlink BWP of the second cell. The BFR procedure of the second cell may be enhanced, for example, if the base station initiates the beam management procedure to find a candidate RS for the second downlink BWP of the second cell. This may expedite and/or facilitate the BFR procedure.

The one or more configuration parameters may comprise a BFRQ configuration (e.g., similar to an SR configuration). The BFRQ configuration may comprise a configuration of one or more uplink physical channels (e.g., PUCCH resources) on the first cell. The wireless device may use the one or more uplink physical channels for a BFR procedure of the second cell. The one or more uplink physical channels may be dedicated to the wireless device.

Figure 28C:
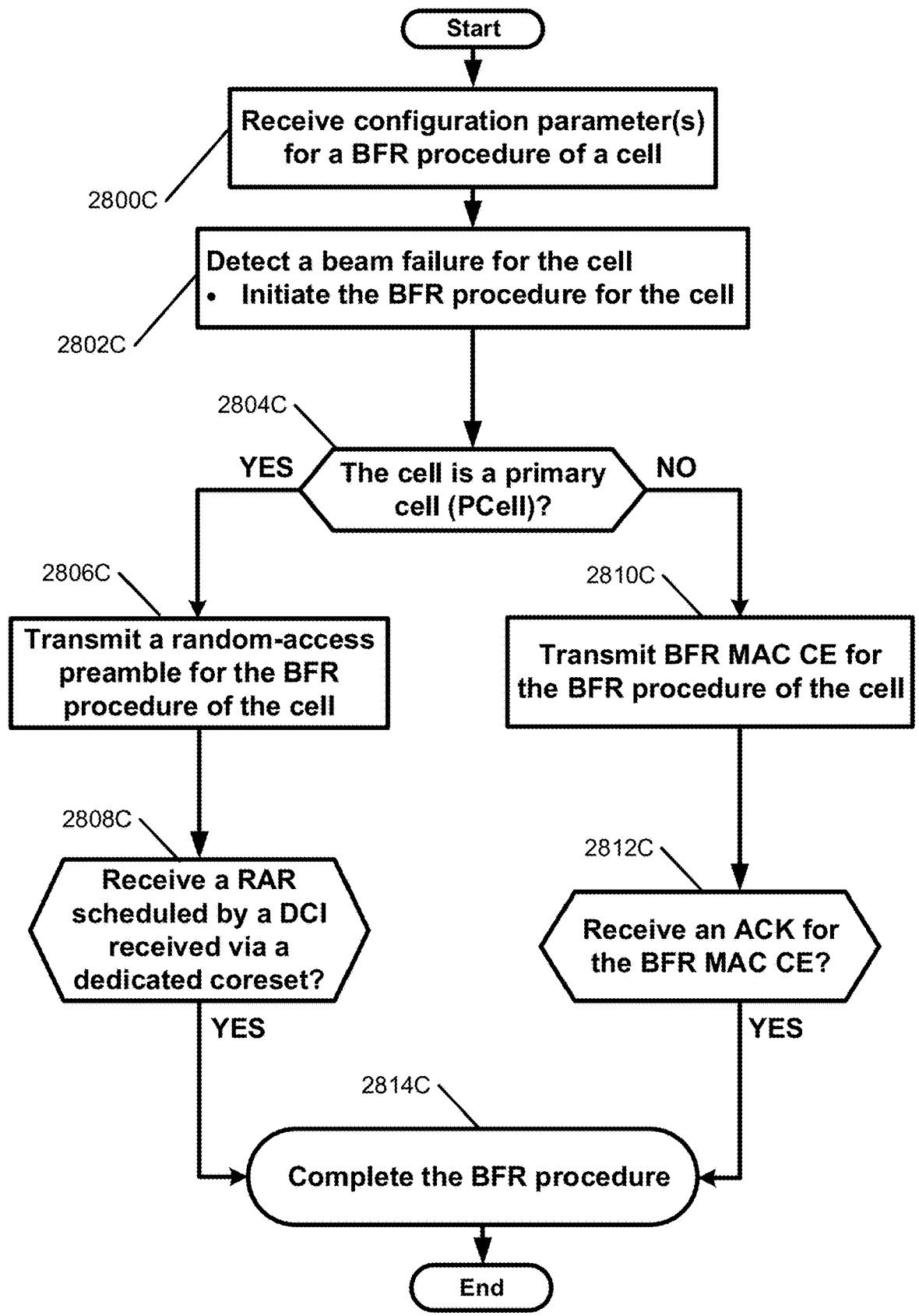
FIG. 28C shows an example method for a beam failure recovery procedure.

FIG. 28C shows an example method for a BFR procedure (e.g., a downlink BFR procedure of a primary cell and a secondary cell). At step 2800C, a wireless device may receive, from a base station, one or more configuration parameters for a BFR procedure of a cell (e.g., a PCell, a PsCell, an SCell, etc.). At step 2802C, the wireless device may detect a beam failure for the cell. The wireless device may initiate the BFR procedure for the cell, for example, after or in response to detecting the beam failure for the cell. At step 2804C, the wireless device may determine whether the cell is a primary cell. At step 2806C, the wireless device may send (e.g., transmit) a random access preamble for the BFR procedure of the cell, for example, if the cell is a primary cell. At step 2808C, the wireless device may receive a random access response scheduled by a DCI via a dedicated coreset. At step 2814C, the wireless device may complete the BFR procedure, for example, if the wireless device receives the random access response. One or more steps described with respect to FIG. 23 may be performed, for example, if the cell is a primary cell. The wireless device may determine that the BFR procedure of the cell has been successfully completed, for example, if the wireless device receives a DCI scheduling a random-access response. The DCI may be received via a coreset dedicated for the BFR procedure of the cell (e.g., a primary cell).

At step 2810C, the wireless device may send (e.g., transmit) a BFR MAC CE for the BFR procedure of the cell, for example, if the cell is a secondary cell. At step 2812C, the wireless device may receive an ACK for the BFR MAC CE. At step 2814C, the wireless device may complete the BFR procedure, for example, if the wireless device receives the ACK for the BFR MAC CE. One or more features and/or steps described with respect to FIG. 28A and FIG. 28B may be performed, for example, if the cell is a secondary cell. The ACK may be scheduled by a DCI received in a normal coreset (e.g., not dedicated for the BFR procedure). The ACK may be transmitted via a physical downlink channel (e.g., of a primary cell) identified by the DCI received in a normal coreset.

The BFRQ configuration may comprise one or more BFRQ transmission occasions. The one or more BFRQ transmission occasions may be periodic (e.g., the periodicity may be provided by the BFRQ configuration). The wireless device may send (e.g., transmit) a BFRQ based on the one or more BFRQ transmission occasions and the one or more uplink physical channels. The one or more BFRQ transmission occasions may comprise a first BFRQ transmission occasion. The wireless device may send (e.g., transmit) the BFRQ, if pending, via the at least one uplink physical channel resource (e.g., a PUCCH resource), for example, if the wireless device has the first BFRQ transmission occasion on at least one uplink physical channel resource (e.g., the PUCCH resource) of the one or more uplink physical channels. One or more resources for the at least one uplink physical channel may be one or more time resources and/or one or more frequency resources. The at least one uplink physical channel may be valid, for example, if the at least one uplink physical channel uses an active BWP. One or more uplink channel resources (e.g., PUCCH resources, PUSCH resources, etc.) on an active BWP at the time of an SR transmission occasion may be considered valid. The at least one uplink physical channel may be considered valid, for example, if it is configured on an active uplink BWP at the time of a BFRQ transmission.

The wireless device may be allowed to send (e.g., transmit) the BFRQ at the one or more BFRQ transmissions occasions. The wireless device (e.g., MAC entity of the wireless device) may have a BFRQ transmission occasion on at least one uplink physical channel resource (e.g., a PUCCH resource). The at least one uplink physical channel resource (e.g., a PUCCH resource) may be valid, for example, if it is configured on an active uplink BWP at the time of a BFRQ transmission. The wireless device may keep the BFRQ pending, for example, at least until the wireless device selects and/or indicates (e.g., identifies) the candidate RS in the candidate beam selection. The wireless device may not transmit the BFRQ via the at least one uplink physical channel resource (e.g., a PUCCH resource), for example, if the wireless device has not selected and/or indicated (e.g., identified) the candidate RS (e.g., until the BFRQ transmission occasion).

At least one uplink physical channel resource (e.g., a PUCCH resource) for the BFRQ transmission occasion may not overlap with a measurement gap. The at least one uplink physical channel resource (e.g., a PUCCH resource) for the BFRQ transmission occasion may not overlap with a UL-SCH resource.

The wireless device may determine (e.g., select, indicate, and/or identify) the candidate RS in the candidate beam selection. The BFRQ may be pending, for example, if the wireless device determines the candidate RS. The one or more BFRQ transmission occasions may comprise a second BFRQ transmission occasion. The wireless device (e.g., a MAC entity of the wireless device) may have the second BFRQ transmission occasion on at least one second uplink physical channel (e.g., a second PUCCH resource) of the one or more uplink physical channels. The wireless device may start transmitting the BFRQ, for example, after or in response to determining the candidate RS. The starting the BFRQ transmission may comprise starting to transmit the BFRQ via the at least one second uplink physical channel resource (e.g., a second PUCCH resource), for example, after or in response to determining the candidate RS.

The second BFRQ transmission occasion may occur (in time), for example, after the wireless device determines (e.g., selects, indicates, and/or identifies) the candidate RS. The second BFRQ transmission occasion may be a BFRQ transmission occasion first to occur (in time) after the wireless device determines the candidate RS. The at least one second uplink physical channel may be valid, for example, if it is configured on an active uplink BWP at the time of a BFRQ transmission.

The at least one second uplink physical channel for the second BFRQ transmission occasion may not overlap with a measurement gap. The at least one second uplink physical channel for the second BFRQ transmission occasion may not overlap with an UL-SCH resource.

Figure 29:
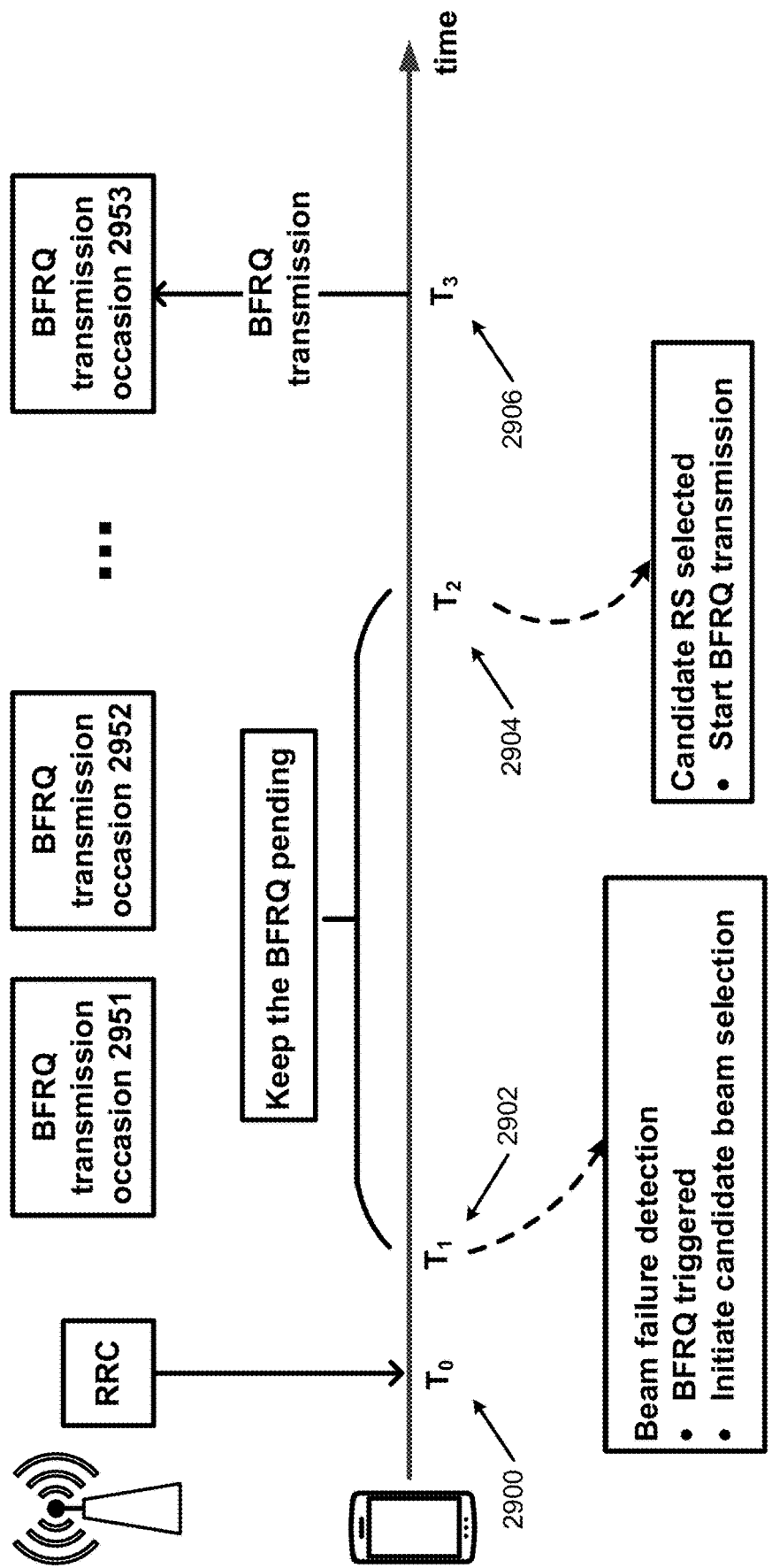
FIG. 29 shows an example of a beam failure recovery procedure.

FIG. 29 shows an example of a BFR procedure (e.g., a downlink BFR procedure of a secondary cell). The one or more BFRQ transmission occasions may comprise a BFRQ transmission occasion 2951, a BFRQ transmission occasion 2952, and a BFRQ transmission occasion 2953.

The wireless device may receive one or more messages (e.g., one or more RRC messages) comprising the one or more configuration parameters at time T0 2900. The one or more configuration parameters may comprise the BFRQ configuration. The BFRQ configuration may comprise one or more BFRQ transmission occasions for a BFR procedure for at least one secondary cell (e.g., the second cell) of the one or more secondary cells.

The wireless device may detect a beam failure of the second downlink BWP of the second cell at time T1 2902. A BFRQ may be triggered, for example, after or in response to detecting the beam failure of the second downlink BWP of the second cell. The wireless device may initiate a candidate beam selection for the BFR procedure of the second downlink BWP.

The wireless device (e.g., a MAC entity of the wireless device) may have at least one of the one or more BFRQ transmission occasions on at least one uplink physical channel resource (e.g., a PUCCH resource) of the one or more uplink physical channel resources during the candidate beam selection (e.g., between T1 2900 and T2 2902). The wireless device may have the BFRQ transmission occasion 2951 and the BFRQ transmission occasion 2952 to transmit the BFRQ during the candidate beam selection (e.g., while the wireless device is searching for a candidate RS). The wireless device may have the BFRQ transmission occasion 2951 and the BFRQ transmission occasion 2952 to send (e.g., transmit) the BFRQ before the wireless device determines (e.g., selects, indicates, and/or identifies) a candidate RS in the candidate beam selection at time T2 2904.

The wireless device (e.g., a MAC entity of the wireless device) may have at least one of the one or more BFRQ transmission occasions on at least one uplink physical channel resource (e.g., a PUCCH resource) of the one or more uplink physical channel resources, for example, until the wireless device determines the candidate RS in the candidate beam selection (e.g., between T1 2902 and T2 2904).

The wireless device may not determine (e.g., select, indicate, and/or identify) a candidate RS in the candidate beam selection at (or at least until) the BFRQ transmission occasion 2951 and the BFRQ transmission occasion 2952 to transmit the BFRQ. The wireless device may not send (e.g., transmit) the BFRQ via the at least one uplink physical channel resource (e.g., a PUCCH resource), for example, if the wireless device does not determine the candidate RS at a time that the wireless device (e.g., a MAC entity of the wireless device) has the at least one of the one or more BFRQ transmission occasions during the candidate beam selection. The wireless device may keep the BFRQ pending, for example, if the wireless device does not transmit the BFRQ.

The wireless device may not send (e.g., transmit) the BFRQ via the at least one uplink physical channel resource (e.g., a PUCCH resource), for example, if the wireless device does not determine (e.g., select, indicate, and/or identify) the candidate RS at (or at least until) the at least one of the one or more BFRQ transmission occasions during the candidate beam selection. The wireless device may keep the BFRQ pending, for example, if the wireless device does not transmit the BFRQ.

As shown in FIG. 29, for example, the wireless device may select a candidate RS at time T2 2904. The wireless device may not send (e.g., transmit) the BFRQ via the at least one uplink physical channel resource (e.g., a PUCCH resource) before time T2 2904, for example, if the wireless device determines (e.g., selects, indicates, and/or identifies) the candidate RS at time T2 2904. The wireless device may have the at least one of the one or more BFRQ transmission occasions (e.g., the BFRQ transmission occasion 2951, the BFRQ transmission occasion 2952) on the at least one uplink physical channel resource (e.g., a PUCCH resource) before time T2 2904.

The wireless device may keep the BFRQ pending, for example, until the wireless device determines (e.g., selects, indicates, and/or identifies) a candidate RS.

The wireless device may start sending (e.g., transmitting) the BFRQ, for example, after or in response to determining (e.g., selecting, indicating, and/or identifying) the candidate RS at time T2 2904. The one or more BFRQ transmission occasions may comprise a second BFRQ transmission occasion (e.g., the BFRQ transmission occasion 2953). The wireless device (e.g., a MAC entity of the wireless device) may have the second BFRQ transmission occasion on at least one second uplink physical channel resource (e.g., a second PUCCH resource) of the one or more uplink physical channels. The wireless device may send (e.g., transmit), if pending, the BFRQ via the at least one second uplink physical channel at time T3 2906. The second BFRQ transmission occasion may occur, for example, after the wireless device determines (e.g., selects, indicates, and/or identifies) the candidate RS.

The wireless device may not determine (e.g., select, indicate, and/or identify) a candidate RS in the candidate beam selection, for example, at least until the second BFR timer expires. The second BFR timer may expire during the candidate beam selection. The second BFR timer may expire at a time that the wireless device is performing the candidate beam selection. The second BFR timer may expire before the wireless device determines (e.g., selects, indicates, and/or identifies) a candidate RS.

The wireless device may have a BFRQ transmission occasion on at least one uplink physical channel resource (e.g., a PUCCH resource) of the one or more uplink physical channel resources. At least one uplink physical channel of the at least one uplink physical channel resource may be valid, for example, if it is configured on an active uplink BWP at the time of a BFRQ transmission. The wireless device may send (e.g., transmit) the BFRQ via the at least one uplink physical channel resource (e.g., a PUCCH resource) for the BFR of the second downlink BWP, for example, after or in response to the expiry of the second BFR timer.

The BFRQ transmission occasion may occur, for example, after the second BFR timer expires. The BFRQ transmission occasion may be a transmission occasion first to occur among the one or more BFRQ transmission occasions after the second BFR timer expires.

Figure 30:
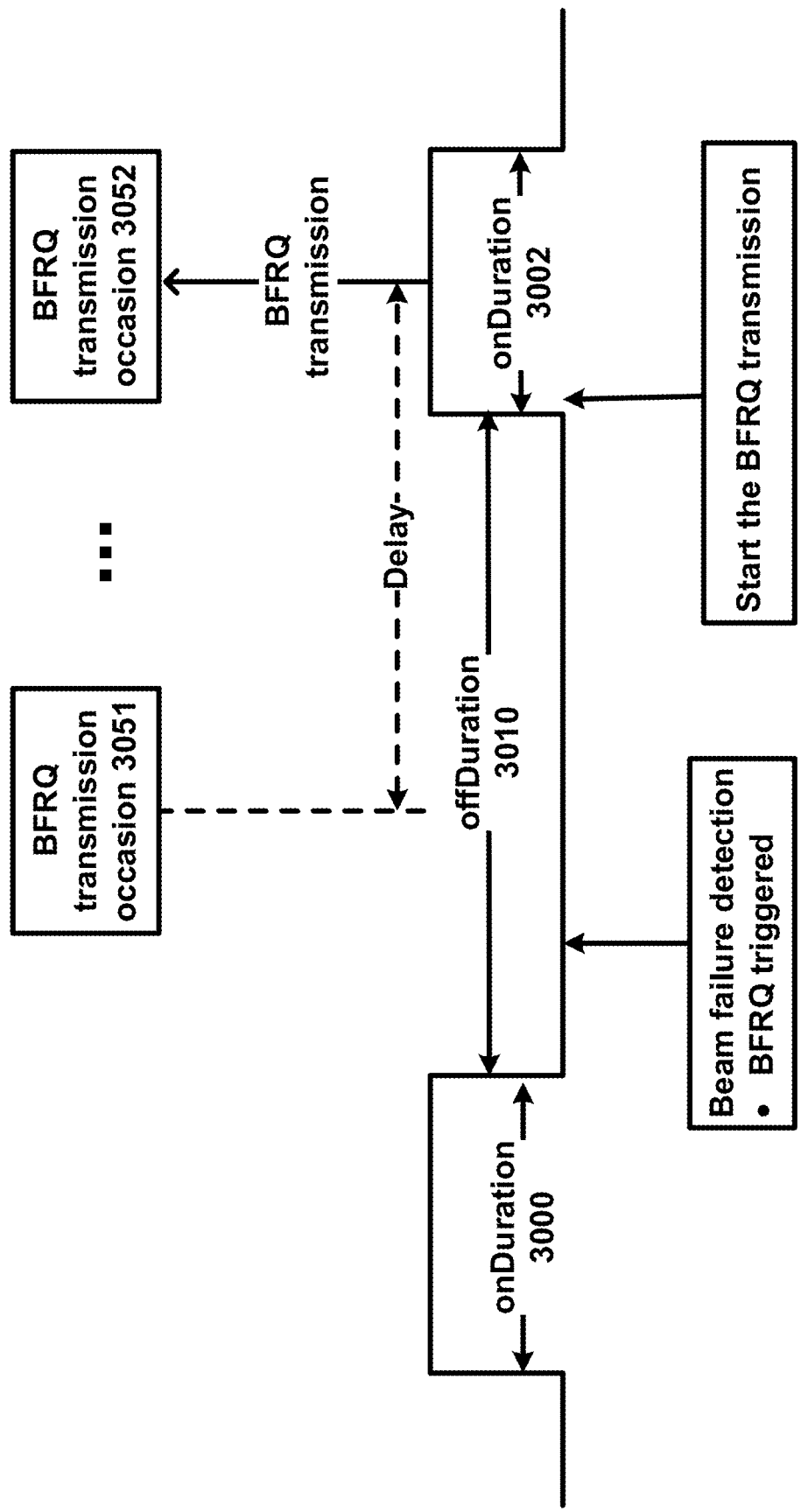
FIG. 30 shows an example of a beam failure recovery procedure.

FIG. 30 shows an example of a BFR procedure (e.g., a downlink BFR procedure of a secondary cell). The wireless device may be configured with a DRX cycle.

A wireless device may trigger an SR for an uplink grant, for example, if the wireless device has uplink data for transmission but does not have an uplink grant (and/or an uplink resource) to transmit the uplink data. The wireless device may transmit the SR via the first available PUCCH resource regardless of whether the wireless device is in an inactive state or an active state of a DRX cycle, for example, if an SR for an uplink data is triggered. The wireless device may wake up during the inactive state of the DRX cycle to transmit the SR, for example, if an SR is triggered during an inactive time (e.g., an inactive period) of the DRX cycle. A base station may configure dedicated SR (or PUCCH) resources for a BFR procedure of a secondary cell. A wireless device may send an uplink signal (e.g., an SR) via the dedicated SR resources to indicate the beam failure of the secondary cell. The wireless device may not wake up to transmit an SR, for example, if the wireless device initiates a BFR procedure for a secondary cell during an inactive time of the DRX cycle. Transitioning from the inactive state of the DRX cycle to the active state of the DRX cycle requires the wireless device to wake up to transmit the SR, which may cause inefficient power consumption. The power saving of the DRX operation may also be inefficient. The wireless device may not need to perform the BFR procedure for the secondary cell during the inactive time of the DRX cycle, for example, if the wireless device does not monitor a downlink control channels during the inactive time of the DRX cycle. The wireless device may delay the BFR procedure, for example, until an active time (e.g., an active period) of the DRX cycle begins. The wireless device may keep the SR triggered until the end of the inactive time of the DRX cycle, for example, if the SR is triggered for a BFR procedure of a secondary cell during the inactive time of the DRX cycle. The wireless device may send the SR, for example, via the first valid uplink control channel resource during an active time of the DRX cycle.

The wireless device may detect a beam failure of the second downlink BWP of the second cell, for example, if the wireless device is not in an active state (e.g., an onDuration 3000) of the DRX cycle. The wireless device (e.g., a MAC entity of the wireless device) may detect the beam failure during an inactive state (e.g., an offDuration 3010) of the DRX cycle. A MAC entity of the wireless device may determine the beam failure during the inactive state of the DRX cycle, for example, if a lower layer (e.g., a PHY layer) of the wireless device receives an RS associated with the second downlink BWP of the second cell during the onDuration 3000 and sends a report associated with the RS to the MAC entity during offDuration 3010.

The wireless device may detect a beam failure of the second downlink BWP of the second cell, for example, while the wireless device is in an active state of the DRX cycle (e.g., the onDuration 3000). The wireless device may send (e.g., transmit) a BFRQ during the onDuration 3000, for example, if there is a BFRQ transmission occasion, for the wireless device, in the onDuration 3000.

The wireless device may not send (e.g., transmit) a BFRQ during the onDuration 3000, for example, if there is no BFRQ transmission occasion, for the wireless device, in the onDuration 3000. The one or more BFRQ transmission occasions may comprise a first subset of the one or more BFRQ transmission occasions and a second subset of the one or more BFRQ transmission occasions. The first subset of the one or more BFRQ transmission occasions may occur during the active state (e.g., a BFRQ transmission occasion 3052). The second subset of the one or more BFRQ transmission occasions may occur during an inactive state (e.g., a BFRQ transmission occasion 3051). The inactive state may comprise a time duration in which the wireless device is not in an active state of the DRX cycle. The inactive state and the active state may not occur simultaneously.

A wireless device may have a BFRQ transmission occasion (e.g., the BFRQ transmission occasion 3052) of the first subset on at least one uplink physical channel. The wireless device may send (e.g., transmit) a BFRQ (if triggered) via the at least one uplink physical channel resource, for example, after or in response to the BFRQ transmission occasion occurring during an active state of the DRX cycle of the wireless device.

A wireless device may have a second BFRQ transmission occasion (e.g., the BFRQ transmission occasion 3051) of the second subset on at least one uplink physical channel resource. The wireless device may not send (e.g., transmit)

a BFRQ (if triggered) via the at least one uplink physical channel resource, for example, if the second BFRQ transmission occasion occurring in an inactive state of the DRX cycle of the wireless device. The wireless device may keep the BFRQ pending, for example, if the wireless device does not transmit the BFRQ.

A BFRQ may be triggered, for example, after or in response to detecting the beam failure of the second downlink BWP of the second cell. A first BFRQ transmission occasion (e.g., the first BFRQ transmission occasion that occurs for the first time after detecting the beam failure) that occurs while the BFRQ is pending may not be in an active state (e.g., an inactive state) of the DRX cycle of the wireless device. The wireless device (e.g., a MAC entity of the wireless device) may have a first BFRQ transmission occasion (e.g., the BFRQ transmission occasion 3051) on at least one uplink physical channel resource of the one or more uplink physical channel resources, for example, while the wireless device is not in an active state. The second subset of the one or more BFRQ transmission occasions may comprise the first BFRQ transmission occasion.

At least one uplink physical channel of the at least one uplink physical channel resource may be valid. The wireless device may not (re)transmit the BFRQ (e.g., even if triggered) via the at least one uplink physical channel resource, for example, if the wireless device has the first BFRQ transmission occasion at a time that the wireless device is not in the active state. The wireless device may keep the BFRQ pending, for example, if the wireless device does not transmit the BFRQ. The wireless device may delay the transmission of the BFRQ, for example, at least until the wireless device is in an active state.

The one or more BFRQ transmission occasions may comprise a second BFRQ transmission occasion (e.g., the BFRQ transmission occasion 3052). The second BFRQ transmission occasion that occurs while the BFRQ is pending may be in an active state of the DRX cycle of the wireless device. The wireless device (e.g., a MAC entity of the wireless device) may have the second BFRQ transmission occasion on at least one second uplink physical channel resource of the one or more uplink physical channel resources. The wireless device may be in an active state (e.g., a DRX Active State). The wireless device may start transmitting the BFRQ during the BFRQ transmission occasion 3052, for example, if the second BFRQ transmission occasion is in the active state. The wireless device may transmit the BFRQ via the at least one second uplink physical channel resource.

At least one second uplink physical channel of the at least one second uplink physical channel resource may be valid. The at least one second uplink physical channel resource for the second BFRQ transmission occasion may not overlap with a measurement gap. The at least one second uplink physical channel resource for the second BFRQ transmission occasion may not overlap with a UL-SCH resource. Power consumption of the wireless device may be reduced and/or may be more efficiently managed, for example, if the wireless device does not wake up, during an inactive state of the DRX cycle, for a BFRQ transmission and/or for receiving an uplink grant for certain resources (e.g., certain bandwidth resources, secondary cells, secondary BWPs, etc.) The wireless device may reduce power consumption, for example, by not transmitting the BFRQ during an inactive state of the DRX cycle.

Figure 31:
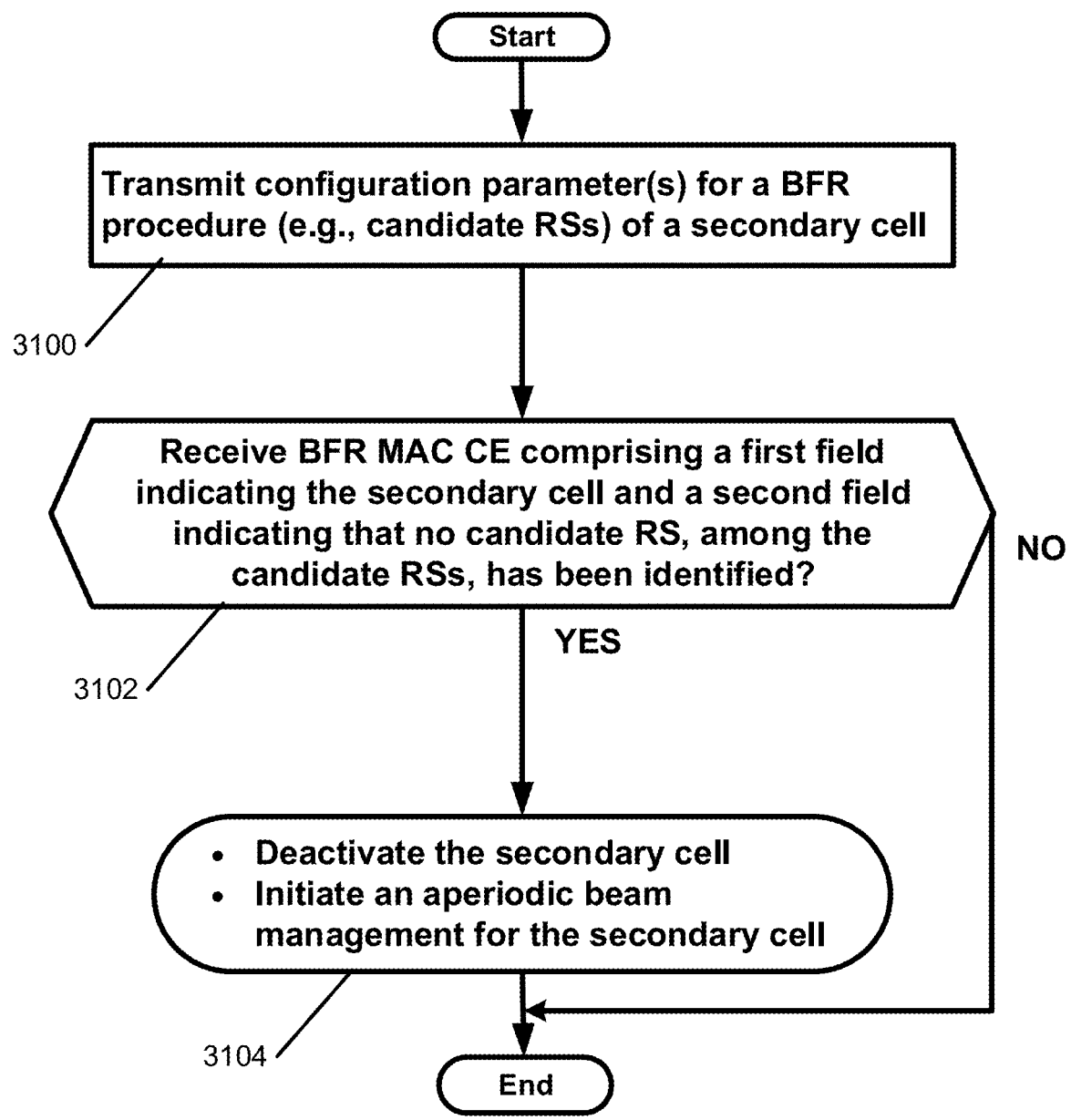
FIG. 31 shows an example method for a beam failure recovery procedure.

FIG. 31 shows an example method for a BFR procedure (e.g., a downlink BFR procedure of a secondary cell). At step 3100, a base station may send (e.g., transmit) one or more configuration parameters for a BFR procedure (e.g., candidate RSs, SCell deactivation parameters, etc.) of a secondary cell. A wireless device may receive one or more messages (e.g., one or more RRC messages) comprising the one or more configuration parameters. The one or more configuration parameters may indicate an SCell deactivation timer (e.g., sCellDeactivationTimer) for the second cell. The wireless device may deactivate the second cell during the BFR procedure for the second downlink BWP of the second cell. The wireless may deactivate the second cell, for example, after or in response to an expiry of the SCell deactivation timer.

At step 3102, the base station may receive, from the wireless device, a BFR MAC CE comprising a first field indicating the secondary cell and a second field indicating that no candidate RS has been identified. At step 3104, the base station may determine to deactivate the secondary cell, for example, after or in response to the receiving the BFR MAC CE comprising a first field indicating the secondary cell and a second field indicating that no candidate RS has been identified. The base station may initiate an aperiodic beam management (e.g., aperiodic beam reporting) for the secondary cell.

The base station may send, to the wireless device, one or more messages (e.g., a MAC CE) to deactivate the secondary cell. The wireless device may receive, from the base station, an SCell Activation/Deactivation MAC CE indicating a deactivation of the second cell. The deactivation of the second cell may be performed, for example, after or in response to the receiving the SCell Activation/Deactivation MAC CE indicating the deactivation of the second cell.

The base station may keep the second cell in an active state. The keeping the second cell in the active state may comprise transmitting a downlink assignment or an uplink grant on/for the second cell to keep the scell deactivation timer running and/or may comprise not configuring the scell deactivation timer. The base station may not keep the second cell in the active state, for example, if the wireless device detects a beam failure for the second cell. The wireless device may not receive the downlink assignment or the uplink grant on the second cell to keep the scell deactivation timer running. The wireless device may transmit and/or continue transmitting the BFRQ, via PUCCH resources on the first cell, for the BFR procedure of the second downlink BWP of the second cell, for example, after or in response to the deactivating the second cell.

The base station may not keep the second cell in the active state. The wireless device may stop transmitting the uplink signal (e.g., a preamble via a PRACH, a BFR request (BFRQ) transmission via a PUCCH, a scheduling request (SR) transmission via a PUCCH, a BFR MAC CE via a PUSCH), for the BFR procedure of the second downlink BWP of the second cell, via at least one uplink physical channel of the one or more uplink physical channels of the first cell, for example, after or in response to the deactivating the second cell.

The wireless device may stop transmitting the BFR MAC CE, via PUSCH resources on the first cell, for the BFR procedure of the second downlink BWP of the second cell, for example, after or in response to deactivating the second cell. The wireless device may stop transmitting the BFRQ, via PUCCH resources on the first cell, for the BFR procedure of the second downlink BWP of the second cell, for example, after or in response to deactivating the second cell. The wireless device may abort the BFR procedure, of the second downlink BWP of the second cell, initiated on the first cell, for example, after or in response to deactivating the second cell.

A base station may reconfigure (e.g., using one or more RRC messages) one or more uplink physical channels on a first cell, for example, during a BFR procedure of a second cell. The one or more uplink physical channels may be dedicated to the wireless device for a BFR procedure. The wireless device may use the one or more uplink physical channels for the BFR procedure of the second cell. The reconfiguring the one or more uplink physical channels may comprise changing (or replacing) at least one uplink physical channel of the one or more uplink physical channels with one or more second uplink physical channels.

The wireless device may continue the beam failure recovery procedure via the at least one uplink physical channel, for example, at least until the at least one uplink physical channel is changed with the one or more second uplink physical channels. The base station may not distinguish the beam failure recovery procedure of the wireless device, for example, after or in response to reconfiguring the one or more uplink physical channels. The base station may configure the at least one uplink physical channel to a second wireless device. The wireless device may continue to use the at least one uplink physical channel, for example, until the at least one uplink physical channel is configured to the second wireless device.

The wireless device may abort and/or stop the beam failure recovery procedure, for example, after or in response to the base station reconfiguring the one or more uplink physical channels. The wireless device may stop and/or reset a second beam failure recovery timer, and/or reset BFI_COUNTER to zero, for example, after or in response to aborting and/or stopping the beam failure recovery procedure. The wireless device may cancel the BFRQ, for example, after or in response to aborting and/or stopping the beam failure recovery procedure.

The wireless device may stop sending (e.g., transmitting) an uplink signal (e.g., a preamble via a PRACH, a beam failure recovery request (BFRQ) transmission via a PUCCH, a scheduling request (SR) transmission via a PUCCH, a BFR MAC CE via a PUSCH), for the beam failure recovery procedure of the second cell, via the at least one uplink physical channel, for example, after or in response to the base station reconfiguring the one or more uplink physical channels.

The wireless device may initiate a second BFR procedure of the second cell using (or with) the one or more second uplink physical channels, for example, after or in response to the aborting the BFR procedure.

The wireless device may not stop/reset a second BFR timer and/or reset BFI_COUNTER to zero, for example, after or in response to the initiating the second beam failure recovery procedure.

The wireless device may keep a second BFR timer running and/or keep incrementing BFI_COUNTER by one, for example, after or in response to the initiating the second beam failure recovery procedure.

A wireless device (e.g., a higher layer (e.g., an RRC layer) of a wireless device) may request a reset of a MAC entity of the wireless device, for example, during a BFR procedure. The wireless device (e.g., the MAC entity of the wireless device) may cancel, if triggered, a BFRQ for the beam failure recovery procedure, for example, if the MAC entity receives the request for the reset of the MAC entity. The wireless device (e.g., the MAC entity of the wireless device) may not perform the transmission of a BFRQ (e.g., via the first cell), for example, during a measurement gap.

Figure 32:
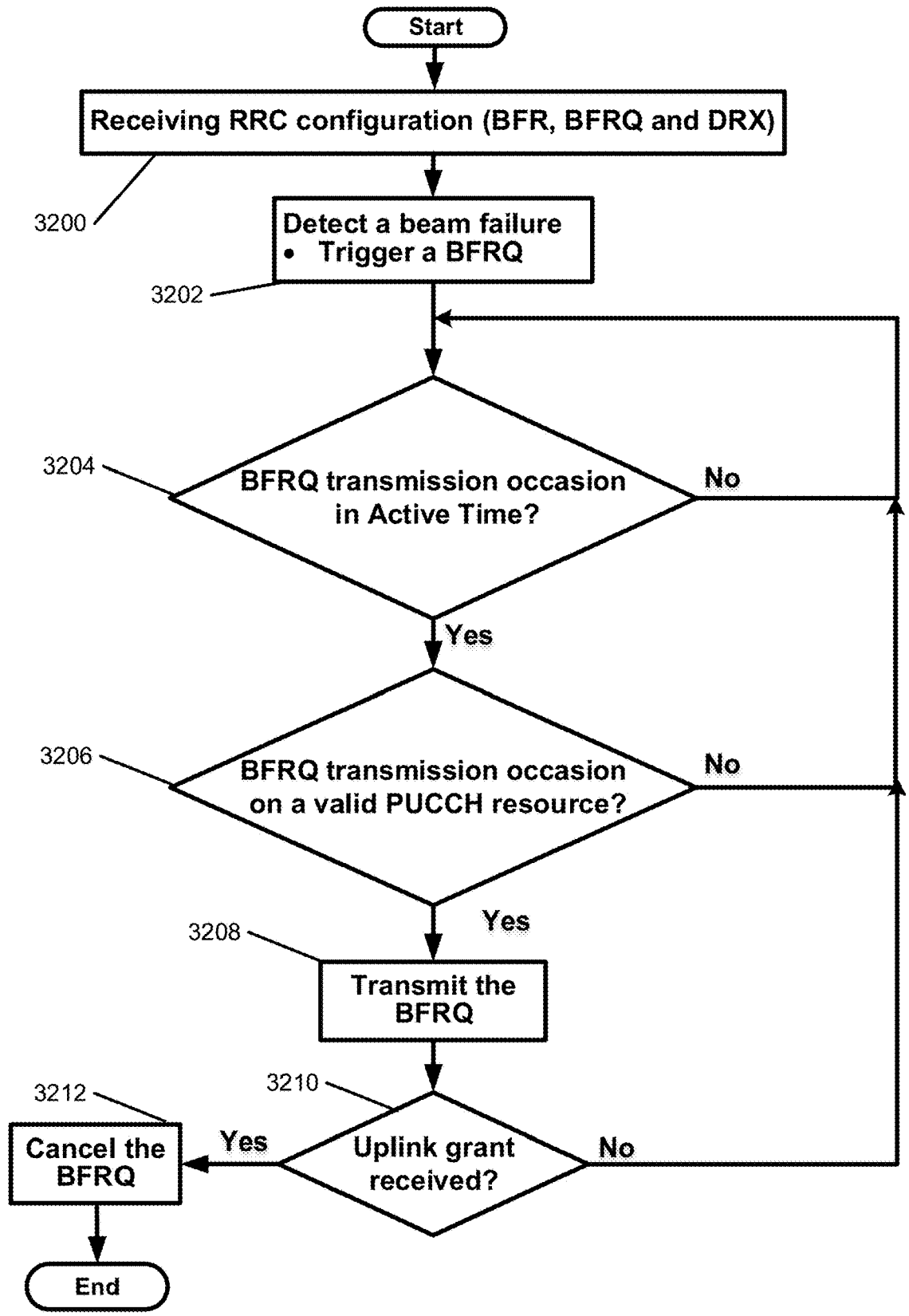
FIG. 32 shows an example method for a beam failure recovery procedure.

FIG. 32 shows an example method for a beam failure recovery procedure (e.g., a downlink beam failure recovery procedure of a secondary cell in DRX mode). A wireless device may receive one or more messages from a base station at step 3200. The one or more messages may comprise one or more configuration parameters of a first cell (e.g., PCell, SCell, PUCCH SCell, BWP of the cell) and a second cell (SCell). The one or more configuration parameters may indicate one or more reference signals (RSs) of the second cell. The one or more RSs may comprise one or more CSI-RSs and/or one or more SSB/PBCHs. The wireless device may assess (e.g., analyze, monitor, determine, etc.) the one or more RSs for a beam failure detection of the second cell.

The one or more configuration parameters may indicate a beam failure recovery request (BFRQ) configuration, for example, for a beam failure recovery procedure of the second cell. The BFRQ configuration may comprise one or more uplink physical control channel resources (e.g., PUCCH resources) on the first cell. The one or more configuration parameters may indicate one or more parameters of a DRX operation controlling an active time (and/or an active state) of the first cell and the second cell. The wireless device may monitor a first physical downlink control channel of the first cell and a second physical downlink control channel of the second cell, for example, during the active time. An inactive time may comprise a time duration in which the wireless device is not in the active state and/or a time duration not corresponding to the active time. The wireless device may not monitor a first physical downlink control channel of the first cell and a second physical downlink control channel of the second cell, for example, during the inactive time.

The one or more configuration parameters may indicate a beam failure instance counter (e.g., beamFailureInstanceMaxCount). The one or more configuration parameters may indicate a first threshold (e.g., rlmInSyncOutOfSyncThreshold) for the beam failure detection of the second cell.

The first threshold may be based on hypothetical BLER, or L1-RSRP, or RSRQ, or SINR.

The wireless device may detect a beam failure of the second cell, for example, based on the one or more RSs at step 3202. The wireless device may determine a quantity (e.g., number) of BFI indication(s) associated with the second cell satisfying (e.g., reaching) the beam failure instance counter. The BFI indication may comprise assessing (e.g., analyzing, monitoring, determining, etc.) the one or more RSs of the second cell comprising a radio quality less than the first threshold.

The wireless device may determine (e.g., detect) the beam failure of the second cell, for example, after or in response to determining the number of beam failure instance indication associated with the second cell satisfying the beam failure instance counter.

The wireless device may trigger a BFRQ for the BFR procedure of the second cell, for example, after or in response to the determining the beam failure of the second cell based on the one or more RSs. The wireless device may trigger the BFRQ, for example, if the wireless device is in the active state (e.g., during an active time of the DRX cycle). The wireless device may trigger the BFRQ, for example, if the wireless device is not in the active state (e.g., during an inactive time of the DRX cycle).

The wireless device may determine, for the BFRQ, BFRQ transmission occasions on the one or more uplink physical control channel resources. The BFRQ transmission occasions may comprise a first subset of the BFRQ transmission occasions and a second subset of the BFRQ transmission occasions. The first subset of the BFRQ transmission occasions may occur, for example, if the wireless device is in the active state (e.g., during an active time). The second subset of the BFRQ transmission occasions may occur, for example, if the wireless device is not in the active state (e.g., during an inactive time). At step 3202, the wireless device may determine one or more BFRQ transmission occasions occurring during an active time. At step 3204, the wireless device may determine whether the one or more BFRQ transmission occasions occurring during an active time are on a valid PUCCH resource.

At step 3208, the wireless device may start transmitting (or start transmissions of) the BFRQ in a BFRQ transmission occasion of the BFRQ transmission occasions that occurs first in the active time, for example, after or in response to the determining the BFRQ transmission occasions. The wireless device may have the BFRQ transmission occasion on at least one uplink physical channel resource of the one or more uplink physical channel resources. The wireless device may send (e.g., transmit) the BFRQ via the at least one uplink physical channel resource. The first subset of the BFRQ transmission occasions may comprise the BFRQ transmission occasion.

The wireless device may determine, for the BFRQ, BFRQ transmission occasions on the one or more uplink physical control channel resources. A first BFRQ transmission occasion of the BFRQ transmission occasions may not occur during the active time. A second BFRQ transmission occasion of the BFRQ transmission occasions may occur during the active time, for example, after the first BFRQ transmission occasion.

The wireless device may start transmitting (or start transmissions of) the BFRQ in the second BFRQ transmission occasion, for example, after the determining the BFRQ transmission occasions on the one or more uplink physical control channel resources. The wireless device may start transmitting (or start transmissions of) the BFRQ in the second BFRQ transmission occasion, for example, after or in response to the second BFRQ transmission occasion occurring in the active time. The wireless device may have the second BFRQ transmission occasion on at least one uplink physical channel resource of the one or more uplink physical channel resources. The wireless device may send (e.g., transmit) the BFRQ via the at least one uplink physical channel resource.

The wireless device may determine, for the BFRQ, a BFRQ transmission occasion on at least one uplink physical channel resource of the one or more uplink physical control channel resources not occurring during the active time. The wireless device may start transmitting the BFRQ, for example, after or in response to the determining and the wireless device changing status from the inactive state (e.g., an inactive state during an inactive time of the DRX cycle) to the active state.

A wireless device may receive one or more messages from a base station. The one or more messages may comprise one or more configuration parameters of a cell (e.g., PCell, SCell, PUCCH SCell, BWP of the cell). The one or more configuration parameters may indicate one or more first reference signals (RSs) of the cell. The one or more first RSs may comprise one or more first CSI-RSs and/or one or more first SSB/PBCHs. The wireless device may assess (e.g., analyze, monitor, determine, etc.) the one or more first RSs for a beam failure detection of the cell.

The one or more configuration parameters may indicate one or more second RSs of the cell. The one or more second RSs may comprise one or more second CSI-RSs and/or one or more second SSB/PBCHs. The wireless device may assess (e.g., analyze, monitor, determine, etc.) the one or more second RSs in a candidate beam selection for a beam failure recovery procedure of the cell.

The one or more configuration parameters may indicate a beam failure instance counter (e.g., beamFailureInstanceMaxCount). The one or more configuration parameters may indicate a first threshold (e.g., rlmInSyncOutOfSyncThreshold) for the beam failure detection of the cell. The first threshold may be based on hypothetical BLER, or L1-RSRP, or RSRQ, or SINR.

The one or more configuration parameters may indicate a second threshold (e.g., rsrp-ThresholdSSB) for the candidate beam selection for the beam failure recovery procedure of the cell. The second threshold may be based on hypothetical BLER, or L1-RSRP, or RSRQ, or SINR.

The wireless device may detect a beam failure of the cell, for example, based on the one or more first RSs. The wireless device may determine a quantity (e.g., number) of BFI indication(s) associated with the cell satisfying (e.g., reaching) the beam failure instance counter. The BFI indication may comprise assessing (e.g., analyzing, monitoring, determining, etc.) the one or more first RSs of the cell comprising a radio quality less (e.g., higher BLER, lower L1-RSRP) than the first threshold.

The wireless device may detect the beam failure of the cell, for example, in response to determining the quantity (e.g., number) of beam failure instance indication associated with the cell satisfying the beam failure instance counter. The wireless device may initiate the beam failure recovery procedure of the cell, for example, after or in response to the detecting the beam failure of the cell based on the one or more first RSs.

The wireless device may initiate a candidate beam selection for the beam failure recovery procedure of the cell. The wireless device may assess (e.g., analyze, monitor, determine, etc.) a radio link quality (e.g. BLER, L1-RSRP) of the one or more second RSs, for example, for the candidate beam selection. The wireless device may apply the second threshold to the one or more second RSs for the candidate beam selection.

The wireless device may determine that each of the one or more second RSs has a radio link quality less (e.g., lower L1-RSRP, higher BLER, lower SINR) than the second threshold. The wireless device may determine that each of the one or more second RSs has a radio link quality less than the second threshold based on the assessing (e.g., the one or more second RSs).

The wireless device may send (e.g., transmit) a BFR MAC CE, for example, after or in response to determining that each of the one or more second RSs has a radio link quality less than the second threshold. The BFR MAC CE may comprise one or more fields. The one or more fields may comprise a field with a first value indicating that each of the one or more second RSs has a radio link quality less than the second threshold. The first value may be preconfigured, predefined, and/or fixed (e.g., 0000 or any other value). The base station may semi-statically configure the first value.

At step 3210, the wireless device may determine whether an uplink grant is received. The uplink grant may be sent from the base station, for example, after or in response to transmitting the BFRQ. At step 3212, the wireless device may cancel the pending BFRQ, for example, if the wireless device successfully receives the uplink grant. The wireless device may cancel the pending BFRQ, for example, after sending the BFR MAC CE. The wireless device may cancel the pending BFRQ, for example, after receiving an ACK responsive to the BFR MAC CE.

A wireless device may perform a method comprising multiple operations. The wireless device may receive one or more messages comprising one or more configuration parameters for a candidate beam selection in a beam failure recovery (BFR) procedure of a cell. The one or more configuration parameters may indicate: one or more candidate reference signals (RSs); and a reference signal received power (RSRP) threshold. The wireless device may initiate, based on detecting a beam failure of the cell, a BFR procedure.

The wireless device may also perform one or more additional operations or include additional elements in conjunction with the described method. The wireless device may determine that each candidate RS of the one or more candidate RSs does not satisfy the RSRP threshold (e.g., the one or more candidate RSs has a quality lower than the RSRP threshold). The wireless device may transmit, based on the determining, a BFR medium access control (MAC) control element (CE) indicating that the wireless device has not selected a candidate beam. The BFR MAC CE may indicate that no candidate beam is selected for the cell. The wireless device may receive, after transmitting the BFR MAC CE, an acknowledgment for the BFR MAC CE. The wireless device may determine, based on receiving the acknowledgment for the BFR MAC CE, that the BFR procedure of the cell has successfully completed. The wireless device may receive the acknowledgment for the BFR MAC CE via a downlink physical channel (e.g., a downlink physical channel of a primary cell or a secondary cell.). The cell may be a secondary cell. The one or more messages (e.g., the one or more configuration parameters) may comprises: first configuration parameters of an uplink bandwidth part (BWP) of a primary cell. The first configuration parameters may be for a candidate beam selection of a first BFR procedure of the primary cell; and second configuration parameters of a downlink BWP of the cell. The second configuration parameters may be for a candidate beam selection of a second BFR procedure of the cell. The wireless device may initiate, based on detecting a beam failure of the downlink BWP of the cell and based on the second configuration parameters, the second BFR procedure of the cell. The wireless device may transmit the BFR MAC CE is via a physical uplink shared channel (e.g., of a primary cell or a secondary cell). The wireless device may determine, based on receiving an uplink grant and based on the cell being a secondary cell, the BFR MAC CE. The wireless device may compare a quality of each candidate RS of the one or more candidate RSs with the RSRP threshold. The wireless device may apply the RSRP threshold to the quality of each candidate RS of the one or more candidate RSs. The quality may comprise an RSRP. The wireless device may transmit, via an uplink physical channel of a primary cell, a scheduling request for the BFR procedure. The wireless device may transmit, via an uplink physical channel of a primary cell, a preamble for a random-access procedure of the BFR procedure. The wireless device may initiate the BFR procedure for an active downlink BWP of the cell based on detecting a beam failure of the active downlink BWP of the cell. The one or more configuration parameters may indicate the one or more candidate RSs for the active downlink BWP of the cell. The one or more configuration parameters may indicate a beam failure recovery timer. The wireless device may start the beam failure recovery timer based on initiating the BFR procedure. The wireless device may start the beam failure recovery timer based on: initiating the BFR procedure for the active downlink BWP of the cell; and the one or more configuration parameters indicating the one or more candidate RSs for the active downlink BWP of the cell. The one or more configuration parameters may indicate, for an active uplink BWP of a first cell (e.g., a primary cell) and for indicating the beam failure of the cell, at least one uplink physical channel for the BFR procedure of the cell. The wireless device may start a beam failure recovery timer based on: initiating the BFR procedure; and the one or more configuration parameters indicating the at least one uplink physical channel for the active uplink BWP of the first cell. The wireless device may transmit, via the at least one uplink physical channel, an uplink signal indicating the beam failure based on the initiating the BFR procedure. The wireless device may stop the transmitting of the uplink signal based on an expiry of a beam failure recovery timer.

The wireless device may initiate a random-access procedure for the BFR procedure based on the stopping the transmitting of the uplink signal. The wireless device may transmit, via at least one second uplink physical channel, a second uplink signal for the BFR procedure based on the stopping the transmitting the uplink signal. The one or more configuration parameters may indicate the at least one second uplink physical channel for requesting uplink shared channel resources. The wireless device may stop the beam failure recovery timer based on switching the active uplink BWP to an uplink BWP of the first cell during the BFR procedure. The one or more configuration parameters may not indicate, for the uplink BWP, at least one uplink physical channel indicating the beam failure of the cell. The wireless device may prioritize the MAC CE over a configured grant confirmation MAC CE. The wireless device may prioritize a cell radio network temporary identifier (C-RNTI) MAC CE over the MAC CE. The wireless device may complete the BFR procedure based on the transmitting the MAC CE. The wireless device may complete the BFR procedure based on receiving an acknowledgement for the MAC CE. The wireless device may complete the BFR procedure based on receiving a second MAC CE or a radio resource control (RRC) message indicating a transmission configuration indication (TCI) for the cell. The MAC CE may comprise that a value of the field in the MAC CE indicates that no candidate beam is selected/identified for the cell. The value may be preconfigured or predefined or fixed. The one or more configuration parameters may indicate the value. A base station may deactivate the cell based on receiving the MAC CE. The base station may initiate a beam management procedure for the cell based on receiving the MAC CE. The beam management procedure may comprise an aperiodic beam reporting. The MAC CE may comprise a field indicating a BWP index of the active downlink BWP of the cell. The prioritizing the MAC CE over the configured grant confirmation MAC CE may comprise including the MAC CE first and the configured grant confirmation MAC CE second in/to a medium access control protocol data unit (MAC PDU). The wireless device may transmit a MAC PDU comprising the MAC CE. The TCI state may indicate a quasi co-location information of demodulation reference signal (DM-RS) antenna port for a downlink control channel reception in a control resource set (coreset) of the cell.

A wireless device may perform a method comprising multiple operations. The wireless device may receive, one or more messages comprising one or more configuration parameters for a beam failure recovery (BFR) procedure of a cell. The wireless device may initiate, based on detecting a beam failure of the cell, a BFR procedure. The wireless device may transmit, for the BFR procedure, a BFR medium access control (MAC) control element (CE) indicating the beam failure of the cell. The wireless device may receive, after transmitting the BFR MAC CE, an acknowledgment for the BFR MAC CE. The wireless device may determine, based on receiving the acknowledgment for the BFR MAC CE, that the BFR procedure of the cell has successfully completed.

The wireless device may also perform one or more additional operations or include additional elements in conjunction with the described method. The one or more configuration parameters indicate: one or more candidate reference signals (RSs); and a reference signal received power (RSRP) threshold. The wireless device may determine that each candidate RS of the one or more candidate RSs does not satisfy the RSRP threshold. The transmitting the BFR MAC CE may be based on the determining that each candidate RS of the one or more candidate RSs does not satisfy the RSRP threshold. The BFR MAC CE may indicate that the wireless device has not selected a candidate beam. The wireless device may reset, based on receiving the acknowledgement for the BFR MAC CE, a beam failure instance counter. The cell may be a secondary cell. The transmitting the BFR MAC CE may be via a physical uplink shared channel of a primary cell. The one or more configuration parameters may comprise: first configuration parameters of an uplink bandwidth part (BWP) of a primary cell, wherein the first configuration parameters are for a candidate beam selection of a first BFR procedure of the primary cell; and second configuration parameters of a downlink BWP of the cell, wherein the second configuration parameters are for a candidate beam selection of a second BFR procedure of the cell. The wireless device may initiate, based on detecting a beam failure of the downlink BWP of the cell and based on the second configuration parameters, the second BFR procedure of the cell. The detecting the beam failure may be based on a beam failure instance counter reaching a value. The completing the BFR procedure may comprise resetting the beam failure instance counter. The wireless device may detect a beam failure of a cell based on a beam failure instance counter reaching a value. The wireless device may reset the beam failure instance counter based on receiving an acknowledgment for the MAC CE.

A wireless device may perform a method comprising multiple operations. The wireless device may receive one or more messages. The one or more messages may comprise first configuration parameters of an uplink bandwidth part (BWP) of a primary cell. The first configuration parameters may be for a candidate beam selection of a first beam failure recovery (BFR) procedure of a primary cell. The one or more messages may comprise second configuration parameters of a downlink BWP of a secondary cell. The second configuration parameters may be for a candidate beam selection of a second BFR procedure of the secondary cell. The wireless device may initiate, based on detecting a beam failure of the downlink BWP of the secondary cell and based on the second configuration parameters of the downlink BWP of the secondary cell, the second BFR procedure. The wireless device may transmit, for the second BFR procedure, a BFR medium access control (MAC) control element (CE) indicating the beam failure of the secondary cell.

The wireless device may also perform one or more additional operations or include additional elements in conjunction with the described method. The wireless device may initiate, based on detecting a beam failure of a downlink BWP of the primary cell and based on the first configuration parameters of the uplink BWP, the first BFR procedure. The uplink BWP of the primary cell may be linked to the downlink BWP of the primary cell. The first configuration parameters may indicate one or more first candidate reference signals (RSs) and a first reference signal received power (RSRP) threshold. The wireless device may perform the first BFR procedure based on the first configuration parameters and may assess the one or more candidate first RSs against the first RSRP threshold. The second configuration parameters may indicate one or more candidate reference signals (RSs) (e.g., one or more second candidate RSs); and a reference signal received power (RSRP) threshold (e.g., a second RSRP threshold). The wireless device may determine that each candidate RS of the one or more candidate RSs does not satisfy the RSRP threshold. The wireless device may transmit the BFR MAC CE based on determining that the wireless device has not selected a candidate beam. The wireless device may receive, via a downlink physical channel and after transmitting the BFR MAC CE, an acknowledgment for the BFR MAC CE. The wireless device may determine, based on receiving the acknowledgment for the BFR MAC CE, that the second BFR procedure of the second cell has successfully completed. The wireless device may perform the second BFR procedure based on the second configuration parameters and may assess the one or more candidate second RSs against the second RSRP threshold.

A wireless device may perform a method comprising multiple operations. The wireless device may receive one or more messages comprising one or more configuration parameters of a cell. The one or more configuration parameters may indicate: one or more uplink control channel resources for a beam failure recovery (BFR) procedure of the cell; and one or more parameters of a discontinuous reception (DRX) cycle controlling an active time of the cell. The wireless device may initiate the BFR procedure based on detecting a beam failure of the cell. The wireless device may determine, for the BFR procedure, one or more transmission occasions on the one or more uplink control channel resources. The wireless device may transmit (e.g., start to transmit) an uplink signal for the BFR procedure in a transmission occasion, of the one or more transmission occasions, that occurs first in an upcoming active time of the DRX cycle.

The wireless device may also perform one or more additional operations or include additional elements in conjunction with the described method. The wireless device may detect the beam failure during an active time of the DRX cycle. The wireless device may detect the beam failure during an inactive time of the DRX cycle. The wireless device may delay the transmitting of the uplink signal for the BFR procedure during an inactive time of the DRX cycle. The starting transmission of the uplink signal for the BFR procedure may comprise transmitting the uplink signal in a transmission occasion. The transmitting the uplink signal may be via at least one uplink control channel resource of the uplink control channel resources. The wireless device may avoid transmitting of the uplink signal in a second transmission occasion, of the one or more transmission occasions, that occurs in an inactive time of the DRX cycle. The wireless device may trigger a scheduling request based on the detecting the beam failure. The uplink signal may comprise the scheduling request. The wireless device may keep the scheduling request pending until the transmitting the uplink signal. The wireless device may keep the scheduling request pending until the upcoming active time of the DRX cycle. The wireless device may delay the transmitting of the uplink signal until the transmission occasion begins. The wireless device may delay the transmitting of the uplink signal until the upcoming active time of the DRX cycle begins. The at least one uplink control channel resource may comprise a physical uplink control channel (PUCCH).

Figure 33:
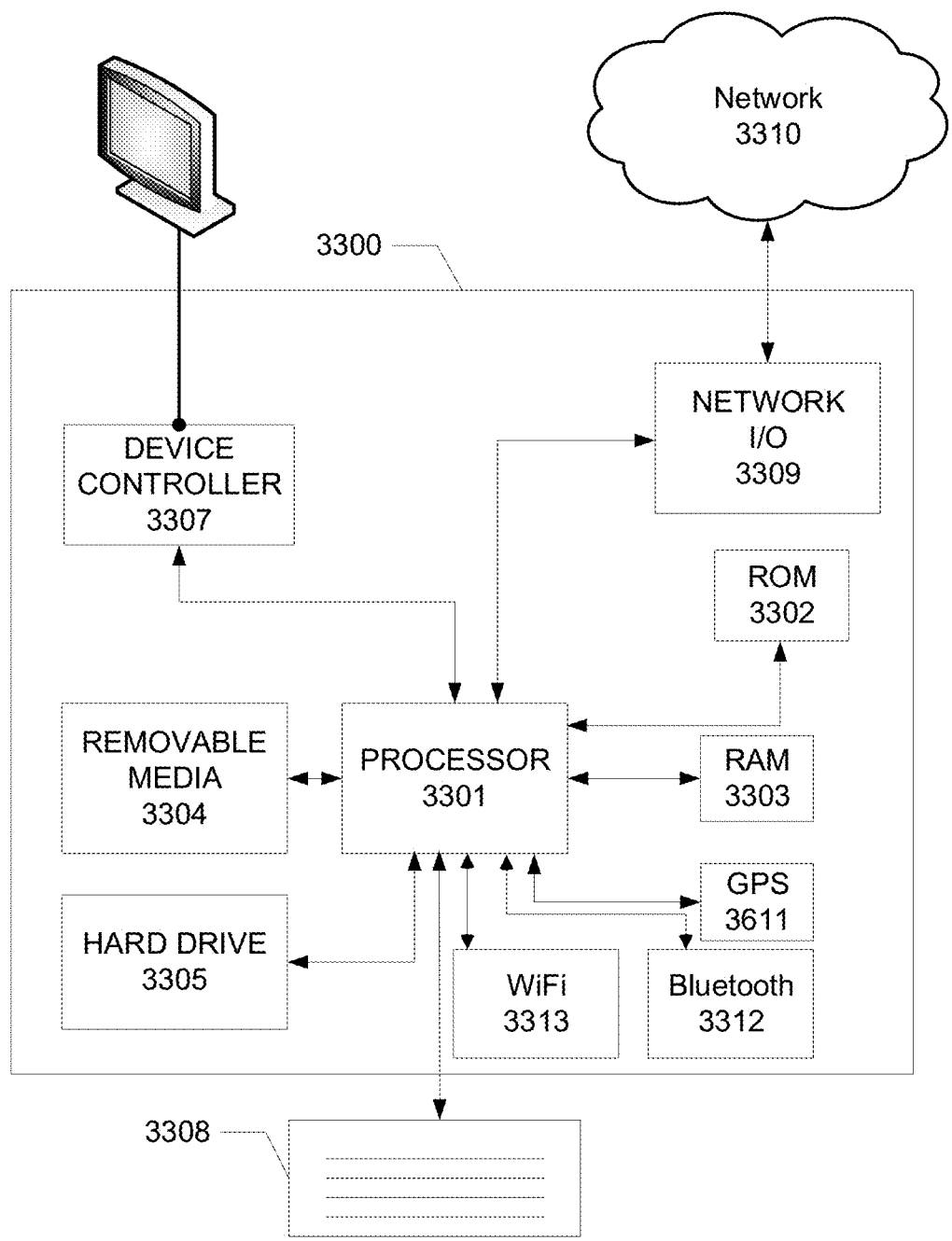
FIG. 33 shows example elements of a computing device.

FIG. 33 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3300 may include one or more processors 3301, which may execute instructions stored in the random-access memory (RAM) 4103, the removable media 3304 (such as a Universal Serial Bus (USB) drive, compact disk (CD) or digital versatile disk (DVD), or floppy disk drive), or any other desired storage medium. Instructions may also be stored in an attached (or internal) hard drive 3305. The computing device 3300 may also include a security processor (not shown), which may execute instructions of one or more computer programs to monitor the processes executing on the processor 3301 and any process that requests access to any hardware and/or software components of the computing device 3300 (e.g., ROM 3302, RAM 3303, the removable media 3304, the hard drive 3305, the device controller 3307, a network interface 3309, a GPS 3311, a Bluetooth interface 3312, a WiFi interface 3313, etc.). The computing device 3300 may include one or more output devices, such as the display 3306 (e.g., a screen, a display device, a monitor, a television, etc.), and may include one or more output device controllers 3307, such as a video processor. There may also be one or more user input devices 3308, such as a remote control, keyboard, mouse, touch screen, microphone, etc. The computing device 3300 may also include one or more network interfaces, such as a network interface 3309, which may be a wired interface, a wireless interface, or a combination of the two. The network interface 3309 may provide an interface for the computing device 3300 to communicate with a network 3310 (e.g., a RAN, or any other network). The network interface 3309 may include a modem (e.g., a cable modem), and the external network 3310 may include communication links, an external network, an in-home network, a provider's wireless, coaxial, fiber, or hybrid fiber/coaxial distribution system (e.g., a DOCSIS network), or any other desired network. Additionally, the computing device 3300 may include a location-detecting device, such as a global positioning system (GPS) microprocessor 3311, which may be configured to receive and process global positioning signals and determine, with possible assistance from an external server and antenna, a geographic position of the computing device 3300.

The example in FIG. 33 may be a hardware configuration, although the components shown may be implemented as software as well. Modifications may be made to add, remove, combine, divide, etc. components of the computing device 3300 as desired. Additionally, the components may be implemented using basic computing devices and components, and the same components (e.g., processor 3301, ROM storage 3302, display 3306, etc.) may be used to implement any of the other computing devices and components described herein. For example, the various components described herein may be implemented using computing devices having components such as a processor executing computer-executable instructions stored on a computer-readable medium, as shown in FIG. 33. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
receiving, by a wireless device, at least one configuration parameter for a beam failure recovery (BFR) procedure of a plurality of cells, wherein the at least one configuration parameter indicates:
first candidate reference signals (RSs) for a first cell of the plurality of cells; and
second candidate reference signals (RSs) for a second cell of the plurality of cells; and
based on detection of beam failure of the plurality of cells, transmitting a BFR medium access control (MAC) control element (CE) indicating the detection of the beam failure of the plurality of cells, wherein the BFR MAC CE comprises:
a first field associated with a candidate RS identifier (ID) indication, wherein the first field is for the first cell of the plurality of cells, and wherein a first value for the first field has a value of zero that indicates no candidate RS, among the first candidate RSs, has a reference signal received power (RSRP) equal to or higher than a first RSRP threshold; and
a second field associated with a candidate RS ID indication, wherein the second field is for a second cell of the plurality of cells, and wherein a second value for the second field is configured to indicate information associated with a candidate RS, among the second candidate RSs, with an RSRP above a second RSRP threshold.

2. The method of claim 1, wherein the transmitting the BFR MAC CE comprises:
transmitting a MAC protocol data unit (PDU) comprising:
a MAC subheader associated with the BFR MAC CE, wherein based on the BFR MAC CE being a variable-sized MAC CE, the MAC subheader comprises a length (L) field indicating a non-zero value; and
the BFR MAC CE.

3. The method of claim 1, wherein the at least one configuration parameter further indicates:
the first RSRP threshold; and
the second RSRP threshold.

4. A wireless device comprising:
one or more processors; and
memory storing instructions that, when executed by the one or more processors, cause the wireless device to:
receive one or more radio resource control (RRC) messages comprising configuration parameters of a primary cell (PCell) and a secondary cell (SCell), wherein the configuration parameters comprise:
uplink bandwidth part (BWP) configuration parameters for an uplink BWP of the PCell, wherein the uplink BWP configuration parameters comprise, for a beam failure recovery (BFR) of the PCell:
a first candidate beam reference signal (RS) list parameter indicating one or more first candidate RSs; and
a first reference signal received power (RSRP) threshold parameter indicating a first threshold;
downlink BWP configuration parameters for a downlink BWP of the SCell, wherein the downlink BWP configuration parameters comprise, for a BFR of the SCell:
a second candidate beam RS list parameter indicating one or more second candidate RSs; and
a second RSRP threshold parameter indicating a second threshold; and
transmit a BFR medium access control (MAC) control element (CE) with a variable size determined based on a number of SCells detected to have beam failure, wherein the BFR MAC CE comprises:
a first field indicating the SCell; and
a second field with a value of zero, wherein the value of zero indicates that no candidate RS among the one or more second candidate RSs has an RSRP equal to or higher than the second threshold of the SCell.

5. The wireless device of claim 4, wherein the instructions further cause the wireless device to:
trigger, based on not having uplink shared channel (UL-SCH) resources to transmit the BFR MAC CE, a scheduling request (SR); and
receive a downlink control information (DCI) indicating an uplink grant, wherein the BFR MAC CE is transmitted via one or more UL-SCH resources indicated by the uplink grant.

6. The wireless device of claim 5, wherein the instructions further cause the wireless device to cancel, if pending, the SR based on a MAC protocol data unit (PDU) comprising the BFR MAC CE being transmitted.

7. The wireless device of claim 6, wherein a logical channel of the BFR MAC CE has:
a higher priority than a logical channel of a configured grant confirmation MAC CE, and a logical channel of buffer status reporting (BSR) MAC CE; and
a lower priority than a logical channel of a cell radio network temporary identifier (C-RNTI) MAC CE or data from uplink common control channel (UL-CCCH).

8. The wireless device of claim 7, wherein the instructions further cause the wireless device to:
receive, after transmitting the BFR MAC CE, an acknowledgment for the BFR MAC CE; and
complete a BFR of the SCell based on receiving the acknowledgment for the BFR MAC CE.

9. The wireless device of claim 8, wherein the second field with the value of zero indicates that the wireless device has not identified a candidate RS for the BFR of the SCell.

10. The wireless device of claim 7, wherein the BFR MAC CE further comprises:
a third field indicating a second SCell; and
a fourth field indicating a candidate RS of the second SCell, wherein an RSRP of the candidate RS of the second SCell is equal to or higher than a third threshold of the second SCell.

11. The wireless device of claim 7, wherein the BFR MAC CE further comprises:
a third field indicating a second SCell; and
a fourth field with a value of zero.

12. The wireless device of claim 11, wherein the fourth field with the value of zero indicates that no candidate RS among one or more third candidate RSs of the second SCell has an RSRP equal to or higher than a third threshold of the second SCell.

13. The wireless device of claim 11, wherein the fourth field with the value of zero indicates that the wireless device has not identified a candidate RS for a BFR of the second SCell.

14. The wireless device of claim 5, wherein, based on the SCell being deactivated, the instructions further cause the wireless device to:
stop transmission of the SR; and
abort a BFR of the SCell.

15. The wireless device of claim 14, wherein a logical channel of the BFR MAC CE has:
a higher priority than a logical channel of a configured grant confirmation MAC CE, and a logical channel of buffer status reporting (BSR) MAC CE; and
a lower priority than a logical channel of a cell radio network temporary identifier (C-RNTI) MAC CE or data from uplink common control channel (UL-CCCH).

16. The wireless device of claim 5, wherein the instructions further cause the wireless device to cancel, based on a request of a reset of a MAC entity of the wireless device, the SR.

17. The wireless device of claim 16, wherein a logical channel of the BFR MAC CE has:
a higher priority than a logical channel of a configured grant confirmation MAC CE, and a logical channel of buffer status reporting (BSR) MAC CE; and
a lower priority than a logical channel of a cell radio network temporary identifier (C-RNTI) MAC CE or data from uplink common control channel (UL-CCCH).

18. The wireless device of claim 4, wherein the BFR MAC CE further comprises:
a third field indicating a second SCell; and
a fourth field indicating a candidate RS of the second SCell, wherein an RSRP of the candidate RS of the second SCell is equal to or higher than a third threshold of the second SCell.

19. The wireless device of claim 18, wherein the instructions further cause the wireless device to:
trigger, based on not having uplink shared channel (UL-SCH) resources to transmit the BFR MAC CE, a scheduling request (SR); and
receive a downlink control information (DCI) indicating an uplink grant, wherein the BFR MAC CE is transmitted via one or more UL-SCH resources indicated by the uplink grant.

20. The wireless device of claim 19, wherein a logical channel of the BFR MAC CE has:
a higher priority than a logical channel of a configured grant confirmation MAC CE, and a logical channel of buffer status reporting (BSR) MAC CE; and
a lower priority than a logical channel of a cell radio network temporary identifier (C-RNTI) MAC CE or data from uplink common control channel (UL-CCCH).

21. The wireless device of claim 20, wherein the instructions further cause the wireless device to:
receive, after transmitting the BFR MAC CE, an acknowledgment for the BFR MAC CE;
complete a BFR of the SCell based on receiving the acknowledgment for the BFR MAC CE; and
cancel, if pending, the SR based on a MAC protocol data unit (PDU) comprising the BFR MAC CE being transmitted.

22. The wireless device of claim 4, wherein a logical channel of the BFR MAC CE has:
a higher priority than a logical channel of a configured grant confirmation MAC CE, and a logical channel of buffer status reporting (BSR) MAC CE; and
a lower priority than a logical channel of a cell radio network temporary identifier (C-RNTI) MAC CE or data from uplink common control channel (UL-CCCH).

23. The wireless device of claim 22, wherein the instructions further cause the wireless device to:

trigger, based on not having uplink shared channel (UL-SCH) resources to transmit the BFR MAC CE, a scheduling request (SR); and receive a downlink control information (DCI) indicating an uplink grant, wherein the BFR MAC CE is transmitted via one or more UL-SCH resources indicated by the uplink grant.

24. The wireless device of claim 23, wherein the second field with the value of zero indicates that the wireless device has not identified a candidate RS for the BFR of the secondary cell.

25. The wireless device of claim 23, wherein the BFR MAC CE further comprises:
a third field indicating a second SCell; and
a fourth field indicating a candidate RS of the second SCell, wherein an RSRP of the candidate RS of the second SCell is equal to or higher than a third threshold of the second SCell.

26. The wireless device of claim 23, wherein the BFR MAC CE further comprises:
a third field indicating a second SCell; and
a fourth field with a value of zero.

27. The wireless device of claim 26, wherein the fourth field with the value of zero indicates that no candidate RS among one or more third candidate RSs of the second SCell has an RSRP equal to or higher than a third threshold of the second SCell.

28. The wireless device of claim 26, wherein the fourth field with the value of zero indicates that the wireless device has not identified a candidate RS for a BFR of the second SCell.

29. The wireless device of claim 4, wherein the instructions further cause the wireless device to cancel, based on a request of a reset of a MAC entity of the wireless device, a scheduling request (SR) triggered based on not having uplink shared channel (UL-SCH) resources to transmit the BFR MAC CE.

30. The wireless device of claim 29, wherein the second field with the value of zero indicates that the wireless device has not identified a candidate RS for the BFR of the secondary cell.

31. The wireless device of claim 30, wherein the instructions further cause the wireless device to:
trigger, based on not having the UL-SCH resources to transmit the BFR MAC CE, the SR; and
receive a downlink control information (DCI) indicating an uplink grant, wherein the the BFR MAC CE is transmitted via one or more UL-SCH resources indicated by the uplink grant.

32. The wireless device of claim 31, wherein the instructions further cause the wireless device to cancel, if pending, the SR based on a MAC protocol data unit (PDU) comprising the BFR MAC CE being transmitted.

33. The wireless device of claim 4, wherein the instructions further cause the wireless device to cancel, if pending, a scheduling request (SR) based on a MAC protocol data unit (PDU) comprising the BFR MAC CE being transmitted.

34. The wireless device of claim 33, wherein a logical channel of the BFR MAC CE has:
a higher priority than a logical channel of a configured grant confirmation MAC CE, and a logical channel of buffer status reporting (BSR) MAC CE; and
a lower priority than a logical channel of a cell radio network temporary identifier (C-RNTI) MAC CE or data from uplink common control channel (UL-CCCH).

35. The wireless device of claim 34, wherein the instructions further cause the wireless device to:
receive, after transmitting the BFR MAC CE, an acknowledgment for the BFR MAC CE; and
complete a BFR of the SCell based on receiving the acknowledgment for the BFR MAC CE.

36. The wireless device of claim 35, wherein the second field with the value of zero indicates that the wireless device has not identified a candidate RS for the BFR of the secondary cell.

37. The wireless device of claim 35, wherein the BFR MAC CE further comprises:
a third field indicating a second SCell; and
a fourth field indicating a candidate RS of the second SCell, wherein an RSRP of the candidate RS of the second SCell is equal to or higher than a third threshold of the second SCell.

38. The wireless device of claim 35, wherein the BFR MAC CE further comprises:
a third field indicating a second SCell; and
a fourth field with a value of zero.

39. The wireless device of claim 38, wherein the fourth field with the value of zero indicates that no candidate RS among one or more third candidate RSs of the second SCell has an RSRP equal to or higher than a third threshold of the second SCell.

40. The wireless device of claim 38, wherein the fourth field with the value of zero indicates that the wireless device has not identified a candidate RS for a BFR of the second SCell.

* * * * *